United States Patent
Ai et al.

(10) Patent No.: US 12,406,225 B1
(45) Date of Patent: Sep. 2, 2025

(54) DEVICES FOR MONITORING INVENTORY WITHIN ENCLOSURES

(71) Applicant: Amazon Technologies, Inc., Seattle, WA (US)

(72) Inventors: Jun Ai, Seattle, WA (US); Rani Awale, Bothell, WA (US); Andre David Brown, Issaquah, WA (US); Kavitha Lingamoorthy, Shoreline, WA (US); Ajay Kumar Ponnuswamy, Seattle, WA (US); Gopi Prashanth Gopal, Redmond, WA (US); Sudheer Ramoji, Sammamish, WA (US); Edwin Thorne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 767 days.

(21) Appl. No.: 17/177,902

(22) Filed: Feb. 17, 2021

(51) Int. Cl.
  *F25D 29/00* (2006.01)
  *F25D 27/00* (2006.01)
  (Continued)

(52) U.S. Cl.
  CPC ......... *G06Q 10/087* (2013.01); *F25D 27/005* (2013.01); *F25D 29/00* (2013.01);
  (Continued)

(58) Field of Classification Search
  None
  See application file for complete search history.

(56) References Cited

U.S. PATENT DOCUMENTS

| | | | |
|---|---|---|---|
| 7,225,980 B2 | 6/2007 | Ku et al. | |
| 7,644,017 B2 * | 1/2010 | Pippia | F25D 29/00 235/382 |

(Continued)

FOREIGN PATENT DOCUMENTS

| | | |
|---|---|---|
| CN | 105222506 A | 1/2016 |
| DE | 10060629 A1 | 6/2002 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Fateh M Obaid
(74) *Attorney, Agent, or Firm* — Athorus, PLLC

(57) ABSTRACT

Inventory monitoring systems are configured for mounting within enclosures such as refrigerators, cabinets, closets or sets of shelves. The inventory monitoring systems include cameras, illuminators and processors provided within housings that are formed from plastics and mounted within an enclosure. The cameras capture images of items entering or departing the enclosure, and other data regarding conditions within the enclosure. The images or data are interpreted by either the inventory monitoring system processors or an external computer system to identify an item depicted therein, to determine whether the item has entered or departed the enclosure, or to otherwise identify conditions within the enclosure. A record of inventory or other conditions within the enclosure may be updated to reflect the entry or departure of the item accordingly, and information regarding the inventory or the conditions within the enclosure, as (Continued)

US 12,406,225 B1

Page 2 determined by the inventory monitoring systems, may be utilized for any purpose.

12 Claims, 38 Drawing Sheets

(51) Int. Cl.
*G06N 3/08* (2023.01)
*G06Q 10/087* (2023.01)
*G06V 10/20* (2022.01)
*G06V 20/52* (2022.01)
*H04W 4/80* (2018.01)

(52) U.S. Cl.
CPC ............. *G06N 3/08* (2013.01); *G06V 10/255* (2022.01); *G06V 20/52* (2022.01); *H04W 4/80* (2018.02); *F25D 2700/02* (2013.01)

(56) References Cited

U.S. PATENT DOCUMENTS

| | | | |
|---|---|---|---|
| 7,861,542 B2* | 1/2011 | Rozendaal | F25D 29/00 62/157 |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,473,747 B2 | 10/2016 | Kobres et al. | |
| 10,281,200 B2 | 5/2019 | Johnston | |
| 10,373,472 B2 | 8/2019 | Johnston | |
| 11,410,122 B1* | 8/2022 | DesJardien | G06V 10/82 |
| 2003/0002712 A1 | 1/2003 | Steenburgh et al. | |
| 2004/0181467 A1 | 9/2004 | Raiyani et al. | |
| 2006/0130498 A1 | 6/2006 | Joshi et al. | |
| 2007/0150381 A1* | 6/2007 | Pippia | G06Q 10/0875 705/28 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2010/0295435 A1 | 11/2010 | Kendall et al. | |
| 2011/0011936 A1 | 1/2011 | Morandi et al. | |
| 2012/0023971 A1 | 2/2012 | Min et al. | |
| 2012/0107191 A1 | 5/2012 | Strahle et al. | |
| 2012/0284132 A1 | 11/2012 | Kim et al. | |
| 2013/0015753 A1 | 1/2013 | Son et al. | |
| 2013/0047630 A1 | 2/2013 | Lu | |
| 2013/0076898 A1 | 3/2013 | Philippe et al. | |
| 2013/0253700 A1 | 9/2013 | Carson et al. | |
| 2014/0279294 A1 | 9/2014 | Field-Darragh et al. | |
| 2014/0320647 A1 | 10/2014 | Seo et al. | |
| 2014/0360213 A1 | 12/2014 | Son et al. | |
| 2015/0019391 A1 | 1/2015 | Kumar et al. | |
| 2015/0067554 A1 | 3/2015 | Lee et al. | |
| 2015/0073907 A1 | 3/2015 | Purves et al. | |
| 2015/0178654 A1 | 6/2015 | Glasgow et al. | |
| 2015/0377791 A1 | 12/2015 | Jung et al. | |
| 2016/0018338 A1 | 1/2016 | Song et al. | |
| 2016/0084569 A1 | 3/2016 | Kocaturk et al. | |
| 2016/0116207 A1* | 4/2016 | Yamato | F25D 29/00 312/405 |
| 2016/0162715 A1 | 6/2016 | Luk et al. | |
| 2016/0203591 A1 | 7/2016 | Justaniah et al. | |
| 2016/0252297 A1 | 9/2016 | Jeong et al. | |
| 2017/0123389 A1 | 5/2017 | Baez et al. | |
| 2017/0160005 A1 | 6/2017 | Park et al. | |
| 2017/0184342 A1 | 6/2017 | Tae et al. | |
| 2017/0219279 A1 | 8/2017 | Chae et al. | |
| 2017/0262973 A1 | 9/2017 | Johnston | |
| 2017/0263100 A1 | 9/2017 | Johnston | |
| 2018/0005176 A1* | 1/2018 | Williams | G06Q 10/087 |
| 2018/0007453 A1 | 1/2018 | Taylor | |
| 2019/0149725 A1* | 5/2019 | Adato | H04N 1/00 348/158 |
| 2019/0156079 A1* | 5/2019 | Espinosa | G08C 17/02 |
| 2019/0215424 A1* | 7/2019 | Adato | G06T 7/521 |
| 2019/0226755 A1 | 7/2019 | Johnston | |
| 2019/0311598 A1 | 10/2019 | Johnston | |
| 2019/0392383 A1* | 12/2019 | Han | F25D 27/005 |
| 2020/0000113 A1 | 1/2020 | Eaton et al. | |
| 2020/0020014 A1* | 1/2020 | Jin | G06N 5/046 |
| 2020/0033052 A1* | 1/2020 | Maeng | F25D 29/00 |
| 2020/0097776 A1* | 3/2020 | Kim | G06T 7/70 |
| 2021/0027360 A1* | 1/2021 | Shmueli | G06Q 30/0603 |
| 2021/0166266 A1* | 6/2021 | Im | G06V 10/82 |
| 2021/0304169 A1* | 9/2021 | Helms | G06Q 20/3224 |
| 2022/0172157 A1* | 6/2022 | Itou | G06V 20/52 |
| 2022/0298722 A1* | 9/2022 | AlHaffar | G06V 20/52 |

FOREIGN PATENT DOCUMENTS

| | | |
|---|---|---|
| JP | 2001041640 A | 2/2001 |
| KR | 20120011486 A | 2/2012 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.
Engadget, "Samsung's smart home vision includes more intelligent fridges and vacuums," Jan. 11, 2021, available at https://www.engadget.com/samsung-family-hub-refrigerator-jetbot-90-smart-home-appliances-ces-2021-140047669.html, 5 pages.
Palatte, "Grocery Tracking Device for Your Fridge," Feb. 17, 2021, available at https://tomsfinds.com/palatte/a302-003-2/, 8 pages.
Samsung Newsroom U.S., "New Food AI Looks Inside Your Fridge To Help You Find The Perfect Things To Cook With What You ALREADY Have," Jan. 7, 2020, available at https://news.samsung.com/US/new-food-ai-looks-inside-fridge-help-find-perfect-things-cook-already/#, 8 pages.
Samsung Newsroom U.S., "Samsung Introduces a One-Stop Shop that Curates Every Step of Your Cooking Journey," Jan. 11, 2021, available at https://news.samsung.com/US/samsung-introduces-one-stop-shop-your-cooking-journey/, 11 pages.
Samsung Newsroom, "Samsung Expands Leadership in Home Appliances with Smart, New Products Designed Around You," Jan. 22, 2020, available at https://news.samsung.com/global/samsung-expands-leadership-in-home-appliances-with-smart-new-products-designed-around-you, 9 pages.
The Verge, "Samsung and LG go head to head with AI-powered fridges that recognize food," Jan. 2, 2020, available at https://www.theverge.com/2020/1/2/21046822/samsung-lg-smart-fridge-family-hub-instaview-thinq-ai-ces-2020, 5 pages.
The Verge, "Samsung's Family Hub Smart Fridge is Ridiculous, Wonderful and Slow," May 4, 2016, available at https://www.theverge.com/circuitbreaker/2016/5/4/11591780/samsung-family-hub-smart-fridge-hands-on-price-release-date, 5 pages.
The Verge, "Samsung's new smart refrigerator has Bixby, AKG speakers, and can control your smart home," Jan. 7, 2018, available at https://www.theverge.com/circuitbreaker/2018/1/7/16861054/samsung-family-hub-smart-fridge-2018-model-announced-ces, 3 pages.
Petcu, Paula, "Got Milk? Building a Smart Fridge Weight Scale," MonoHelix Labs Blog, Oct. 29, 2016, available at http://www.monohelixlabs.com/building-smart-fridge-weight-scale.html, 25 pages.
ARS Labs, "FOODsniffer," FOODsniffer, 14 pages, Jan. 24, 2020, URL: http://www.myfoodsniffer.com/, obtained via web.archive.org on Nov. 4, 2021.
Blasco, J., et al. "Recognition and Classification of External Skin Damage in Citrus Fruits Using Multispectral Data and Morphological Features," Biosystems Engineering 103.2 (2009): 137-145, Elsevier Ltd.
Buzby, J. C., et al. "The Estimated Amount, Value, and Calories of Postharvest Food Losses at the Retail and Consumer Levels in the

(56) References Cited

OTHER PUBLICATIONS

United States," EIB-21, U.S. Department of Agriculture (USDA), Technical Report, Economic Research Service, Feb. 2014, 39 pages, URL: https://www.ers.usda.gov/webdocs/publications/43833/43680_eib121.pdf.

Ishimwe, et al. "Applications of Thermal Imaging in Agriculture—A Review," Advances in Remote Sensing, 3:128-140, 2014, URL: https://www.researchgate.net/publication/272172641_Applications_of_Thermal_Imaging_in_Agriculture_-_A_Review.

Laguerre, O., et al., "Study of Domestic Refrigerator Temperature and Analysis of Factors Effecting Temperature: A French Survey," International Journal of Refrigeration, 25 (2002): pp. 653-659, URL: http://smas.chemeng.ntua.gr/miram/files/publ_40_5_1_2004.pdf.

Manickavasagan, A., et al. "Applications of Thermal Imaging in Agriculture—A Review"; Canadian Society for Engineering in Agricultural, Food, And Biological Systems, 05-002, 11 pages, 2005, URL: http://citeseerx.ist.psu.edu/viewdoc/download?doi=10.1.1.1078.1702&rep=rep1&type=pdf.

Wikipedia, "Food grading," www.wikipedia.com, Wikipedia: The Free Encyclopedia, 14 pages, Dec. 24, 2020, URL: https://en.wikipedia.org/wiki/Food_grading, obtained via web.archive.org on Nov. 4, 2021.

Yang, Qingsheng, and John A. Marchant, "Accurate Blemish Detection with Active Contour Models," Computers and Electronics in Agriculture 14.1 (1996): 77-89.

Zhu, B., et al. "30 Surface Reconstruction of Apples from 2D NIR Images." Two-and Three-Dimensional Methods for Inspection and Metrology III. vol. 6000. International Society for Optics and Photonics, 2005.

\* cited by examiner

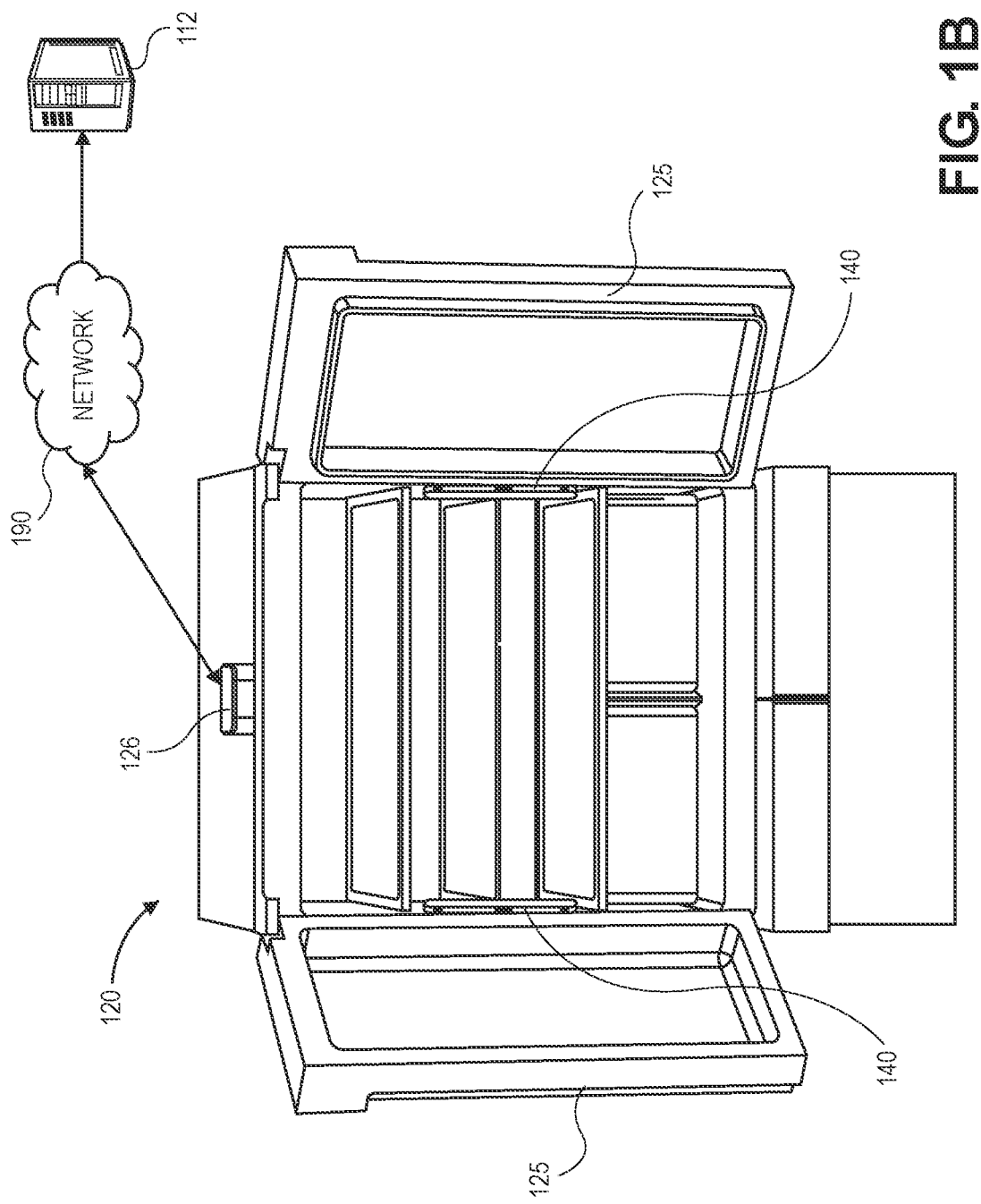

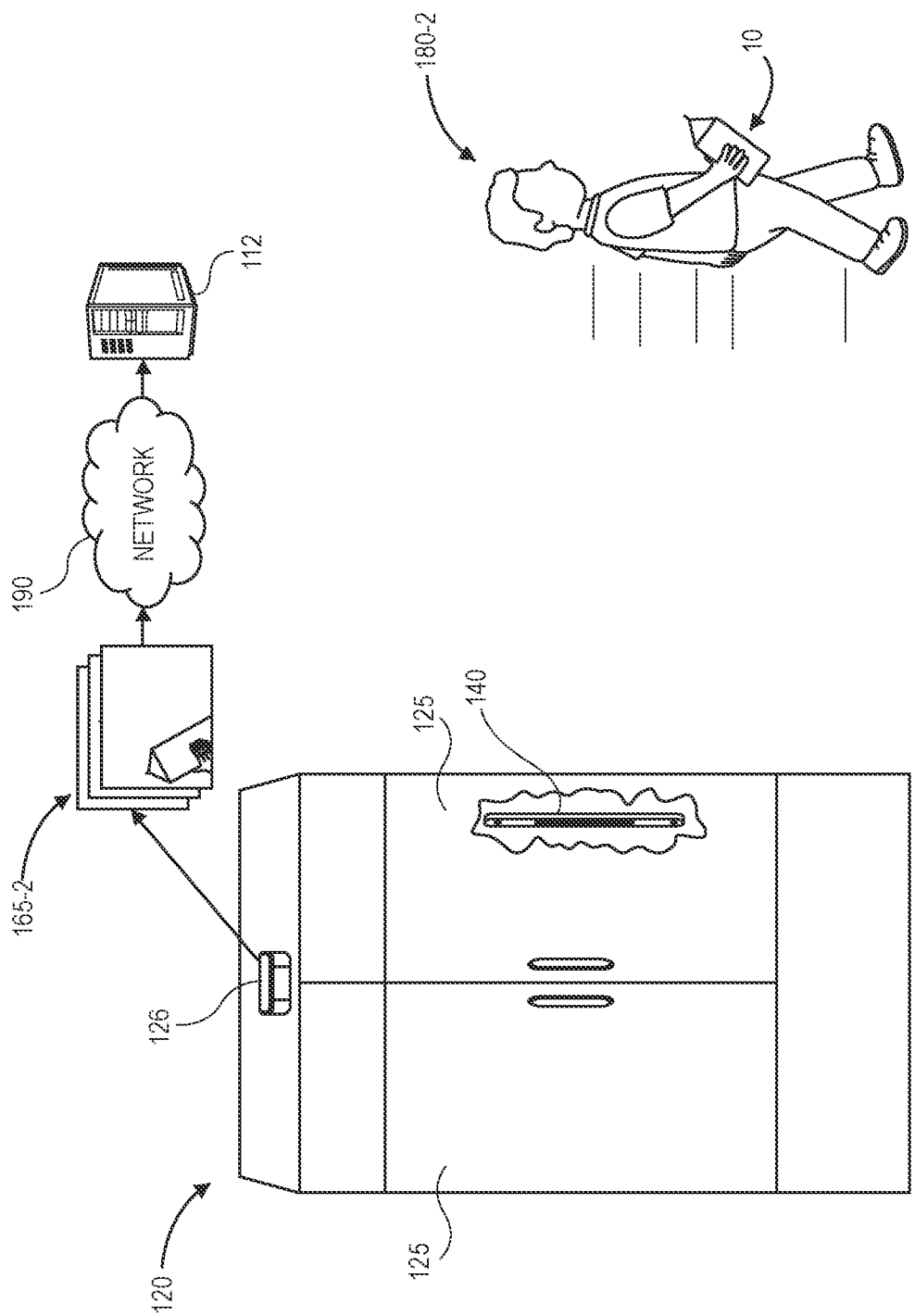

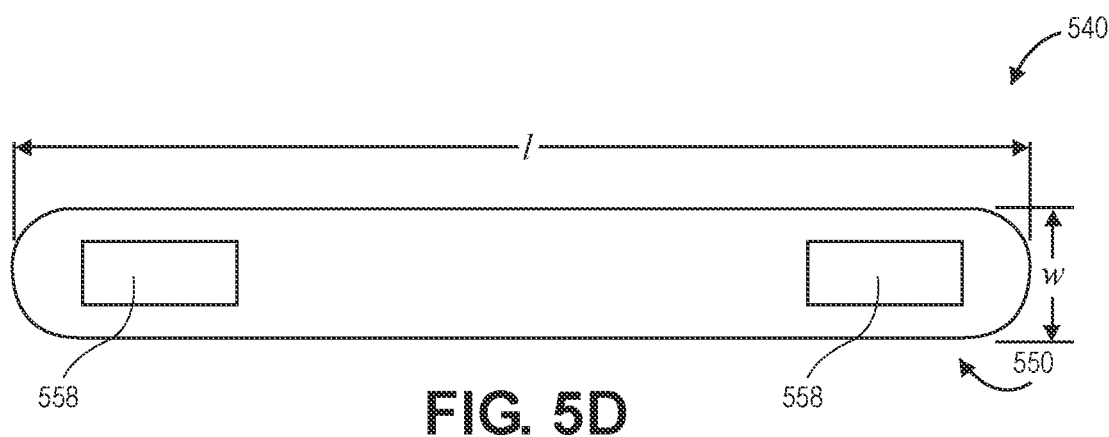
FIG. 5D
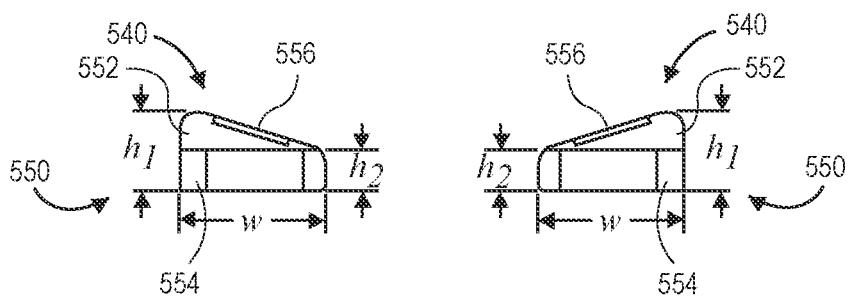
FIG. 5E          FIG. 5F

SECTION A-A

SECTION B-B

INVENTORY BARS PROJECT LIGHT INWARD FROM ACCESS POINT INTO ENCLOSURE

INVENTORY BAR CAMERAS SUBSTANTIALLY COVER ACCESS POINT TO ENCLOSURE

DEVICES FOR MONITORING INVENTORY WITHIN ENCLOSURES

BACKGROUND

In recent times, imaging devices, such as cameras, have been frequently used in bricks-and-mortar commercial settings. For example, in a materials handling facility, such as a retail store or establishment, a camera may be provided in one or more locations and configured to include portions of the materials handling facility within its field of view. Imaging data (e.g., visual images or depth images) captured by the camera may be processed to identify one or more actors (e.g., customers, associates or other personnel) within the materials handling facility, to detect movements of such actors, or to identify items that are removed from storage units by such actors, or placed on such storage units by such actors.

Imaging devices, such as cameras, that are provided within a materials handling facility or other environment are commonly mounted in elevated configurations, e.g., on ceilings or walls, in order to ensure that the fields of view of the imaging devices include accessible floor spaces, storage units or other areas. Cameras or other imaging devices may be effectively used to track movements of actors or items, or inventory levels, within open settings that feature storage units with surfaces for receiving, storing or distributing items that are visible within fields of view of the cameras or other imaging devices.

While imaging devices are increasingly utilized to track movements of actors or items within open settings, imaging devices have not, to date, been utilized to track inventory levels within enclosures, such as refrigerators, cabinets, closets, sets of shelves, or others. Moreover, installing or retrofitting imaging devices into such enclosures, or interpreting imaging data captured by imaging devices within such enclosures, are challenging tasks.

BRIEF DESCRIPTION OF THE DRAWINGS

FIGS. 1A through 1K are views of aspects of one system including inventory monitoring devices in accordance with implementations of the present disclosure.

FIGS. 5A through 5F are views of aspects of one inventory monitoring device in accordance with implementations of the present disclosure.

DETAILED DESCRIPTION

As is set forth in greater detail below, the present disclosure is directed to devices for monitoring inventory levels within enclosures. More specifically, the present disclosure is directed to systems or methods that track inventory levels within an enclosure, such as a refrigerator, a cabinet, a closet, a set of shelves, or others, e.g., a bowl, a box, or another container resting on a surface, based on information or data captured using one or more inventory monitoring devices that are provided at or near access points or planes by or through which items must pass when the items are placed within such enclosures, or when the items are removed from such enclosures. The inventory monitoring devices may take the form of substantially slender bars or other systems that may be mounted within interiors of such enclosures, e.g., within a vicinity of an access point or plane of an enclosure, and include one or more cameras or other sensors, as well as illuminators, processors or other components disposed within a common housing, or within two or more housings. Data captured by the cameras or other sensors may be processed to detect the presence or motion of items within an enclosure, or to make one or more determinations regarding conditions within the enclosure. Upon detecting items that are present or in motion at or near an access point or plane of an enclosure, an inventory level within the enclosure may be determined or updated based on the presence of the items, or the motion of the items into or out of the enclosure. Information or data regarding levels of inventory or conditions within an enclosure may be utilized for any purpose, including but not limited to generating recipes, recommending substitutable or complementary items, or predicting when items may expire or otherwise require replacement or replenishment, and may be reported to an owner or user of the enclosure, or any other individual or entity.

Figure 1A:
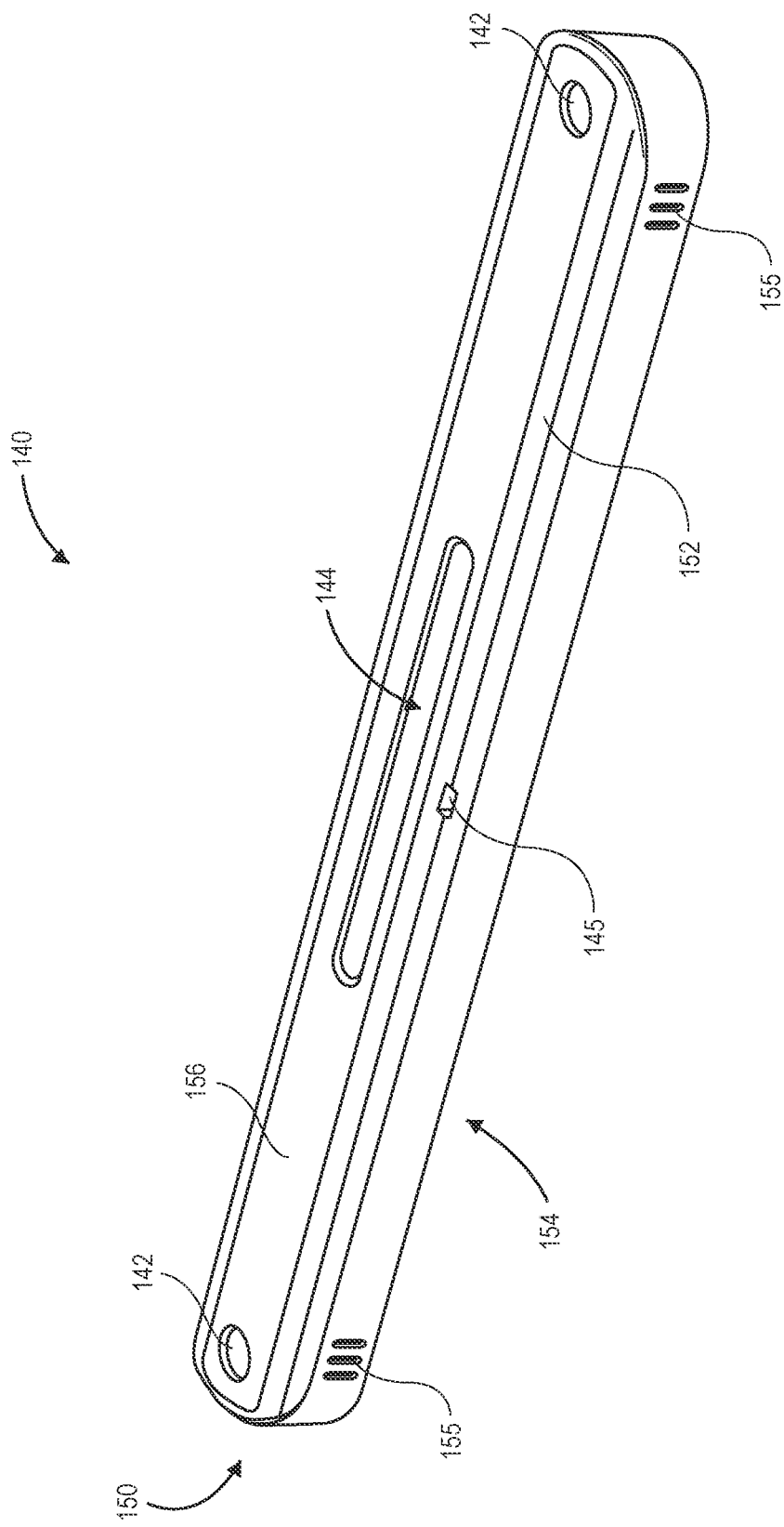

Referring to FIGS. 1A through 1K, views of aspects of one system including inventory monitoring devices in accordance with implementations of the present disclosure are shown. As is shown in FIG. 1A, an inventory monitoring device 140 (e.g., an inventory bar, an inventory monitoring bar, or a bar) includes a pair of cameras 142, an illuminator 144 and a light sensor 145 provided in a housing 150 formed from an upper section 152 and a lower section 154. Each of the cameras 142 may be configured to capture color images, grayscale images, black-and-white images, or any other type or form of imaging data (e.g., depth images). The cameras 142 may include one or more sensors that are configured to capture visual imaging data at relatively high levels of resolution, e.g., eight to nine megapixels per image, and at relatively high frame rates, e.g., fifteen or more frames per second (fps). Such camera sensors may include arrays of photodetectors or photosensitive components such as charge coupled devices ("CCD"), complementary metal-oxide sensors ("CMOS"), photodiodes, or the like. The camera sensors may capture light reflected from objects and assign one or more quantitative values (e.g., red, green, blue or other color values, or distances or ranges to such objects) to aspects of the reflected light. Alternatively, or additionally, in some implementations, the cameras 142 may be configured to capture any other imaging data, such as depth imaging data, or visual imaging data at any levels of resolution or frame rates. Furthermore, in some implementations, where the cameras 142 are separated by a known baseline distance, visual images captured by the respective cameras 142 may be processed to determine ranges to points (e.g., surfaces of objects) appearing within both of the visual images captured by the cameras 142 at the same time.

The illuminator 144 may be any number of lights or light sources that are configured to project light in one or more directions. For example, in some embodiments, the illuminator 144 may be one or more light-emitting diodes (or "LED"), liquid crystal displays (or "LCD"), incandescent bulbs, compact and/or linear fluorescent bulbs, halogen lamps, metal halide lamps, neon lamps, sodium lamps or any other type or form of lights configured to project light at any frequency, wavelength or intensity. Alternatively, or in addition to the illuminator 144, the inventory monitoring device 140 may include one or more other feedback devices, including but not limited to components such as audio speakers or other physical components that may be automatically controlled or configured to generate audible messages, signals or sounds, or one or more haptic vibrating elements that may be automatically controlled or configured to generate tactile vibrations of any frequency or intensity.

The light sensor 145 may be any type or form of system that converts detected light (e.g., visible light, or invisible light such as infrared or ultraviolet) into one or more electrical signals. For example, the light sensor 145 may be one or more charge coupled devices, light-dependent resistors, photoconductive cells, photodiodes, photoemissive cells, photomultiplier tubes, phototransistors, phototubes, photovoltaic cells, or any others.

The inventory monitoring device 140 may further include any number of processors, transceivers, or other components (not shown) that may be integrated with one or more of the cameras 142, the illuminator 144, the light sensor 145, or other aspects, or otherwise required in order to support operations of the inventory monitoring device 140. The inventory monitoring device 140 may also include one or more other sensors (not shown), including but not limited to LIDAR sensors, RFID sensors, or any other type or form of sensors, such as thermometers, barometers, hygrometers, air monitoring sensors, acoustic sensors, or others, which may be configured to capture information or data regarding conditions within an enclosure. Alternatively, or additionally, the inventory monitoring device 140 may also include any buttons, switches, controls or other features (not shown) for operating the inventory monitoring device 140.

The inventory monitoring device 140 may further include one or more internal power sources (e.g., batteries or fuel cells) or, alternatively, one or more ports, receptacles or other systems for receiving alternating current (or "AC") or direct current ("DC") power from one or more external power sources. The inventory monitoring device 140 may also include one or more features (not shown) for installing the inventory monitoring device 140 within an enclosure, or for adhering the housing 150 to an internal surface within the enclosure, e.g., a refrigerator, a cabinet, a closet, a set of shelves, or others, e.g., a freezer, a garage or an automobile trunk. Such features may include, but need not be limited to, hooks, adhesive tapes, glues, magnets, or other systems or substances.

As is further shown in FIG. 1A, the housing 150 further includes one or more ventilation ducts 155 that extend through one or both of the upper section 152 or the lower section 154, and facilitate the transfer of heat out of the housing 150, e.g., by convective or conductive transfer. Alternatively, in some implementations, the housing 150 may be sealed (e.g., hermetically sealed) against the elements, and need not include the ventilation ducts 155. The housing 150 also includes a covering 156 that is coupled to the upper section 152 over at least the cameras 142 and the illuminator 144. The covering 156 may be substantially translucent in portions of the covering 156 provided over the cameras 142 and the illuminator 144, and substantially opaque in other portions.

The housing 150 may have any external or internal dimensions, e.g., any lengths, widths or heights. Moreover, the positions, alignments or orientations of the cameras 142 or the illuminator 144 within the housing 150, and with respect to one another, may be selected on any basis. For example, the cameras 142 may be aligned to capture imaging data within an enclosure into which the inventory monitoring system 140 is installed, e.g., to enhance a level of privacy of users of the inventory monitoring device 140 or the enclosure. Likewise, the illuminator 144 may be aligned to project light into an enclosure into which the inventory monitoring system 140 is installed, and not in other directions, such as toward eyes of an actor placing an item into the enclosure or removing an item from the enclosure.

Additionally, the upper section 152 and the lower section 154 of the housing 150 may be formed from any suitable materials, including but not limited to plastics, composites, woods, or metals. In some implementations, one or more of the upper section 152 or the lower section 154 may be formed from polycarbonates or combinations of polycarbonates and other materials, such as acrylonitrile butadiene styrene (or "ABS"). In some implementations, the covering 156 may be formed from entirely or partially transparent or translucent windows or shields, including polycarbonates, polyethylene terephthalates, polyethylenes, or others. Moreover, external or internal surfaces of the housing 150 may be coated with one or more paints or other substances, e.g., moisture-resistant coatings, or one or more layers of hydrophobic or hydrophilic materials. In some implementations, such as where the housing 150 is sealed, the housing 150 may be formed from materials having sufficiently high levels of thermal conductivity, to enable the housing 150 to readily transfer heat to ambient during operations.

Inventory monitoring devices, such as the inventory monitoring device 140, may be installed singly or in tandem with one or more other such devices within an enclosure, and in a vicinity of an access point or plane of the enclosure, to capture imaging data regarding items that are present near the access point or plane, or passing by or through the access point or plane, e.g., as an actor places an item into the enclosure or removes an item from the enclosure by way of the access point or plane. As is shown in FIG. 1B, a pair of the inventory monitoring devices 140 are installed within a refrigerator 120 having a pair of doors 125 (e.g., "French doors") of substantially equal size and common shapes. The doors 125 are rotatably mounted to the refrigerator 120 by hinges provided on left and right sides, respectively, of the refrigerator 120, and configured to rotate about vertical axes defined by such hinges in order to open or close the refrigerator 120. Alternatively, in some implementations, the doors 125 may be configured to slide laterally in order to open or close the refrigerator 120.

Each of the inventory monitoring devices 140 is mounted to an internal surface of the refrigerator 120, adjacent to or near the hinges by which the doors 125 are mounted. The inventory monitoring devices 140 are, therefore, aligned substantially parallel to one another, and to an access point or plane of the refrigerator 120, e.g., at a front end of the refrigerator 120, by or through which items entering or departing the refrigerator 120 must pass. Alternatively, where the refrigerator 120 is a chest-type enclosure, or is aligned substantially horizontally, and where the doors 125 swing about substantially horizontal axes or slide laterally within substantially horizontal planes in order to open or close the refrigerator 120, the inventory monitoring devices 140 may be aligned substantially parallel to one another, and to an access point or plane of the refrigerator 120, at an upper end (or top end) of the refrigerator 120, by or through which items entering or departing the refrigerator 120 must pass.

As is also shown in FIG. 1B, a router 126 or another communications device is provided atop the refrigerator 120. The router 126 is configured to transmit information or data to and/or receive information or data from the inventory monitoring devices 140, and to transmit information or data to and/or receive information or data from one or more external computer devices or systems (not shown), e.g., over one or more networks 190. For example, in some implementations, the inventory monitoring devices 140 may capture imaging data and transmit the imaging data or any other information or data (e.g., metadata) to one or more external computer devices or systems by way of the router 126. Alternatively, the inventory monitoring devices 140 may process the imaging data, and transmit information or data regarding contents depicted within the imaging data to the one or more external computer devices or systems by way of the router 126.

Alternatively, in some implementations, the inventory monitoring devices 140 may be configured to communicate with one or more external computer devices or systems (or networks) directly, and need not rely upon a router 126 provided near or around the refrigerator 120 in order to do so.

Figure 1C:
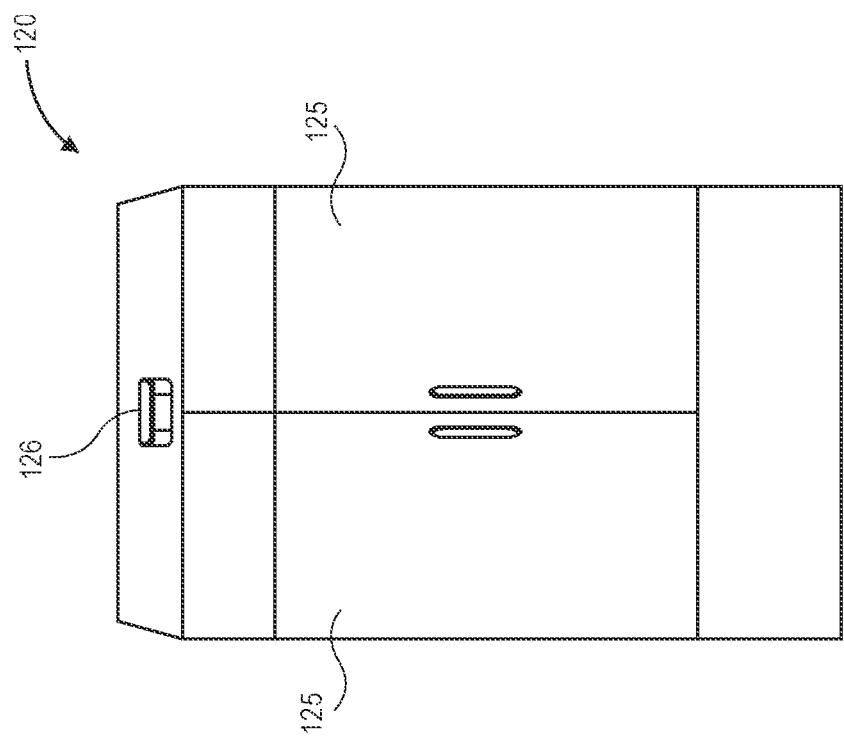
Figure 1C:
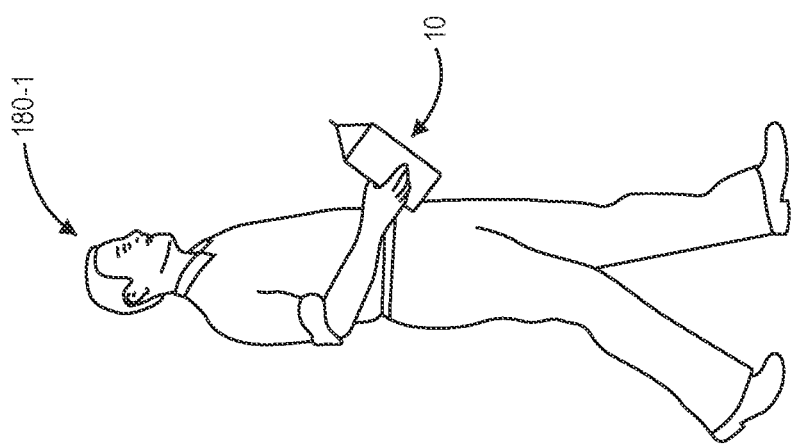
Figure 1D:
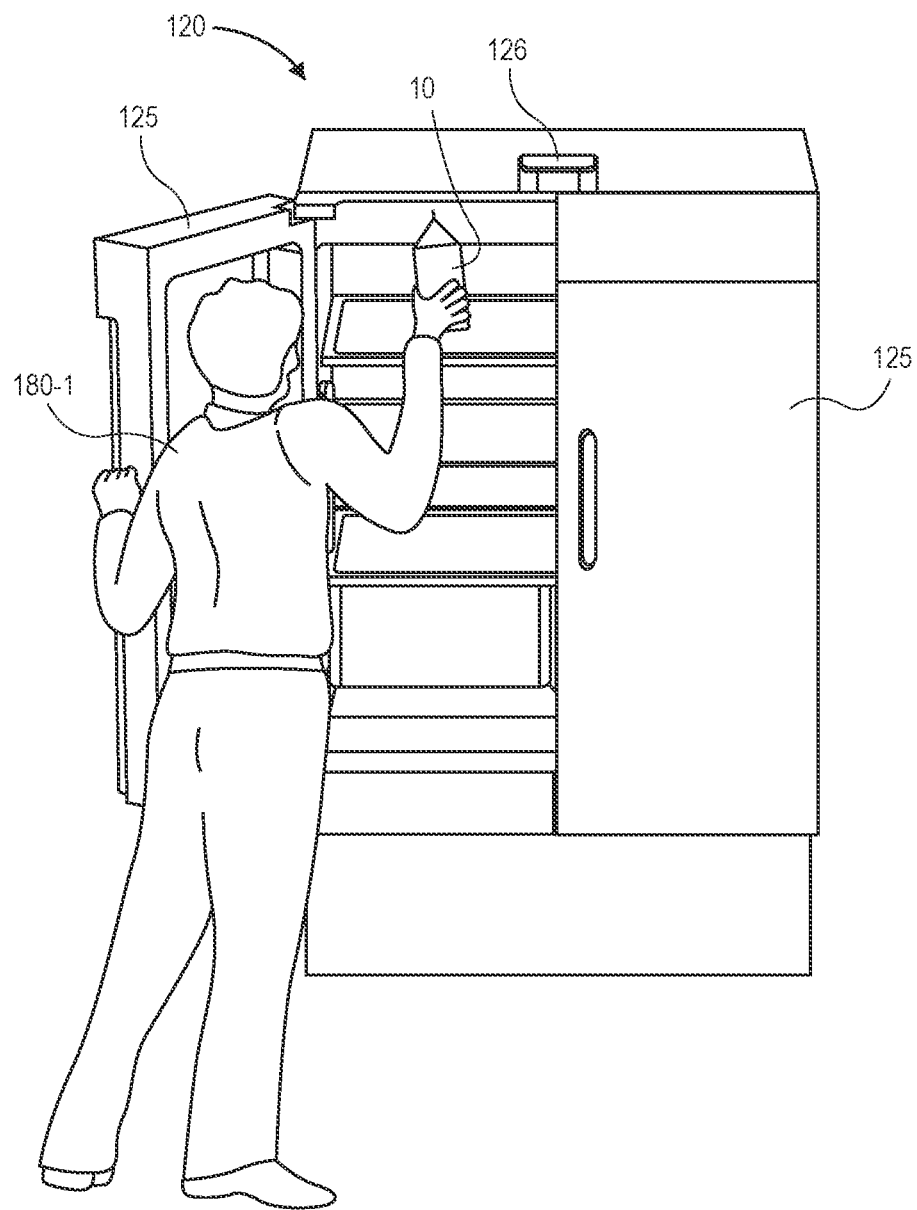

As is discussed above, inventory monitoring devices, the inventory monitoring devices 140, may be used to capture imaging data during the placement of items into an enclosure (e.g., the refrigerator 120), or the removal of items from an enclosure. The imaging data may be interpreted, e.g., by one or more processors provided within the inventory monitoring devices 140 or by processors associated with one or more external computer systems, to identify any such items and to generate or update a record of items within the enclosure accordingly. As is shown in FIG. 1C, an actor 180-1 approaches the refrigerator 120 with an item 10 (e.g., a carton of a refrigerable liquid, such as milk, juice or water). Where the refrigerator 120 is located within a home, a school, or another non-commercial facility, the actor 180-1 may be a resident, a student, or another person associated with the facility. Where the refrigerator 120 is located within a materials handling facility, the actor 180-1 may be an employee, a customer, or another person associated with the facility. As is shown in FIG. 1D, the actor 180-1 opens one of the doors 125 of the refrigerator 120 and extends a hand holding the item 10 into the refrigerator 120, e.g., to place the item 10 onto a shelf or other surface within the refrigerator 120.

Figure 1E:
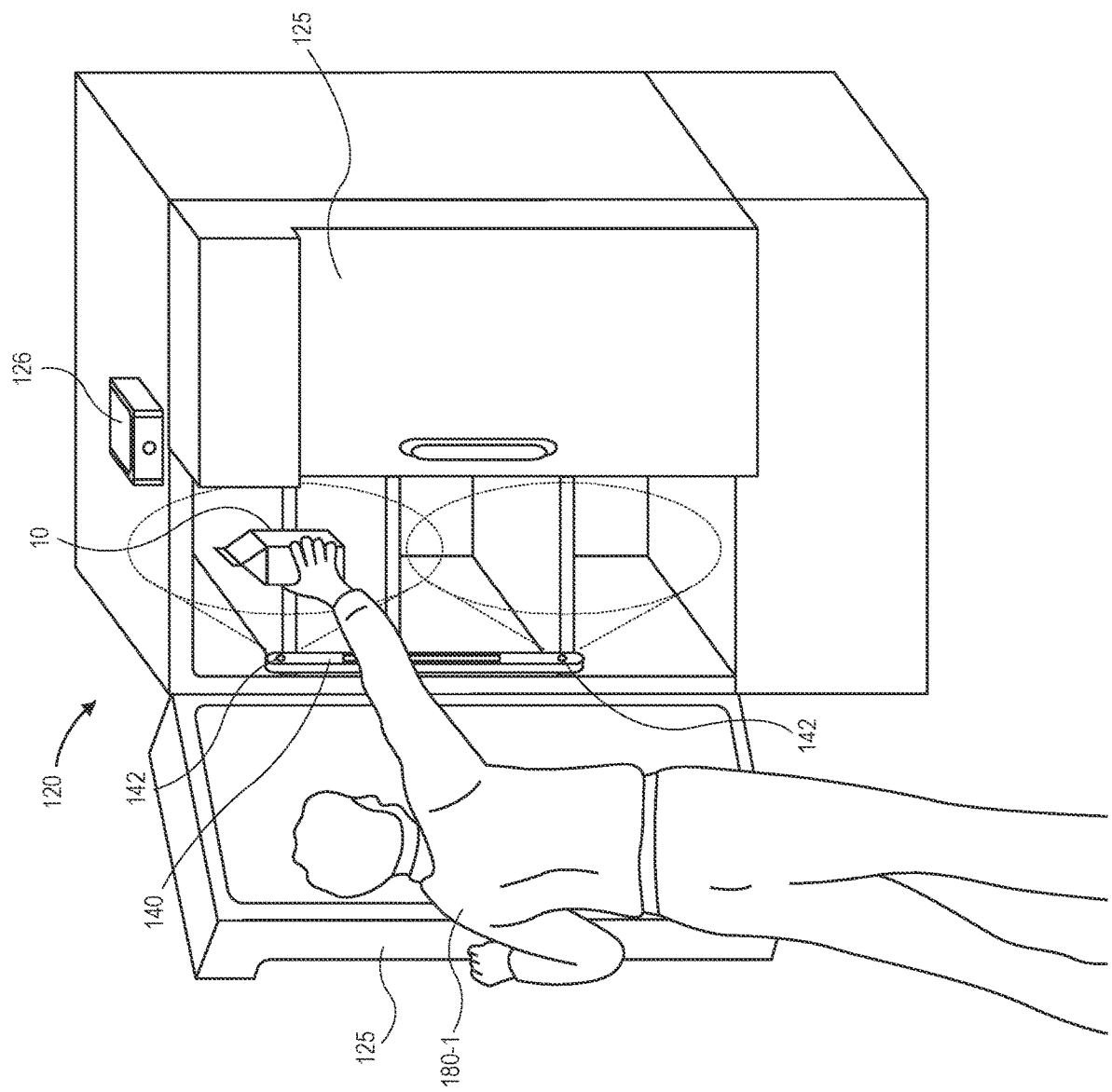

As is shown in FIG. 1E, the cameras 142 on one of the inventory monitoring devices 140 capture imaging data as the actor 180-1 extends the hand holding the item 10 into the refrigerator 120. The imaging data may include visual images, depth images or any other imaging data, and may be time-stamped or otherwise labeled or tagged with times at which the imaging data was captured. Alternatively, in some implementations, imaging data may be captured by each of the cameras 142 provided on both of the inventory monitoring devices 140 within the refrigerator 120. Imaging data captured by the cameras 142 may be processed by one or more processors provided in any location, including but not limited to processors within the housing 150, or processors associated with one or more external computer devices or systems.

In some implementations, the cameras 142 may be configured to continuously capture imaging data, and to process all of the imaging data in order to determine whether the imaging data depicts one or more items being placed into the refrigerator 120 or removed therefrom. In some other implementations, the operation of the cameras 142 to capture or process imaging data may be triggered in response to one or more events. For example, where the refrigerator 120 is outfitted with one or more internal lights that are energized upon an opening of one or more of the doors 125, the light sensor 145 may detect and interpret light emitted by such lights, or any other light (e.g., light emitted by sources outside of the refrigerator 120 that enters the refrigerator 120 upon the opening), and initiate the capture of imaging data accordingly, e.g., in order to conserve computational resources or electrical power, or on any other basis. In such embodiments, when the lights are no longer energized, e.g., upon the closure of both of the doors 125, the light sensor 145 may determine that light is no longer emitted by such lights, and terminate the capture of imaging data accordingly. Alternatively, in lieu of the light sensor 145, or in addition to the light sensor 145, the inventory monitoring devices 140 may include one or more motion sensors, acoustic sensors, infrared sensors, or any other sensors for determining that one or more actors and/or items may be in motion within a vicinity of an access point or plane to the refrigerator 120.

In some implementations, concurrent with the capture of imaging data by the cameras 142, the illuminators 144 provided on one or both of the inventory monitoring devices 140 may be activated, thereby projecting light into the refrigerator 120 and into fields of view of the cameras 142, and enhancing the visibility of any body parts and/or items that are present within the fields of view.

Figure 1F:
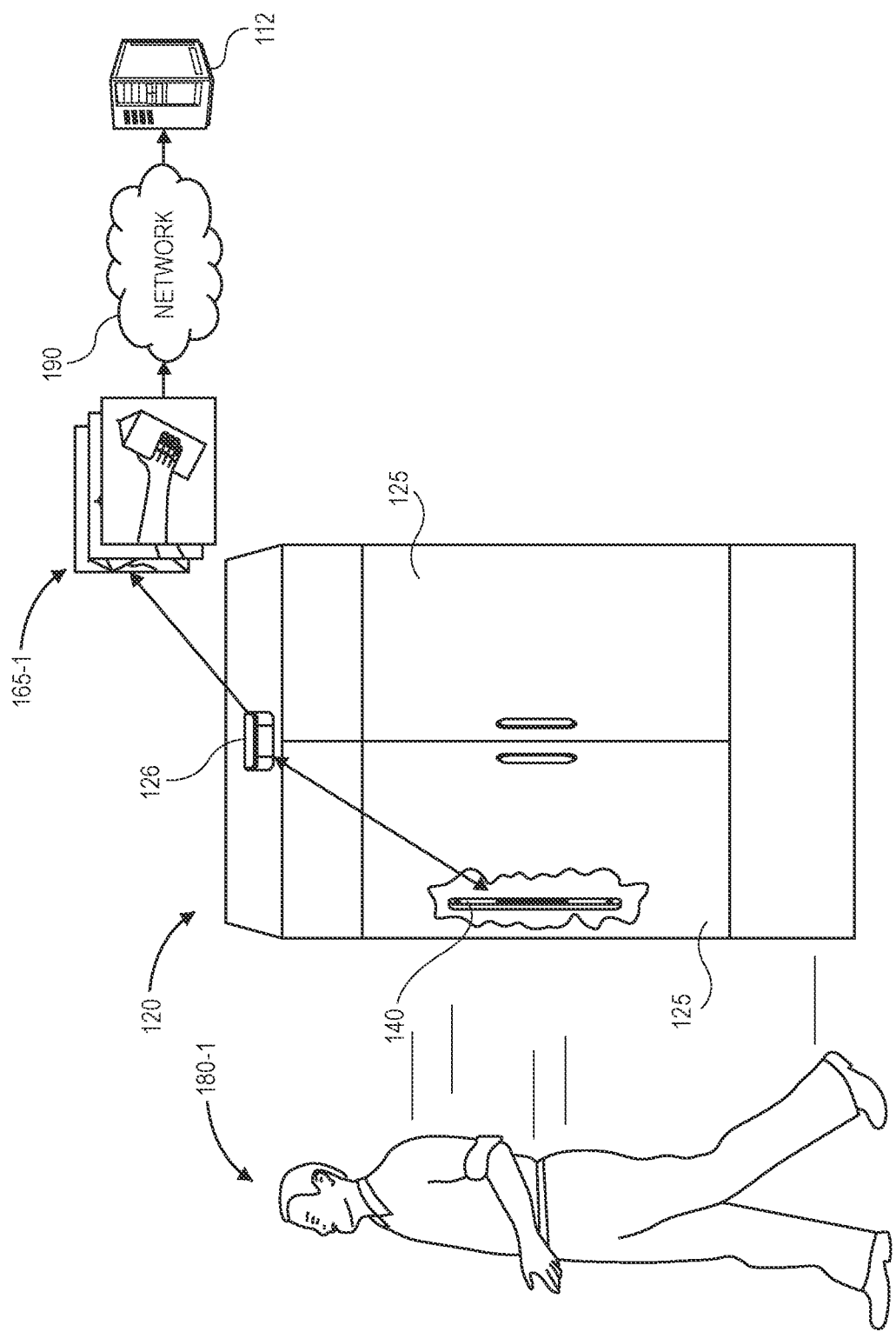
Figure 1G:
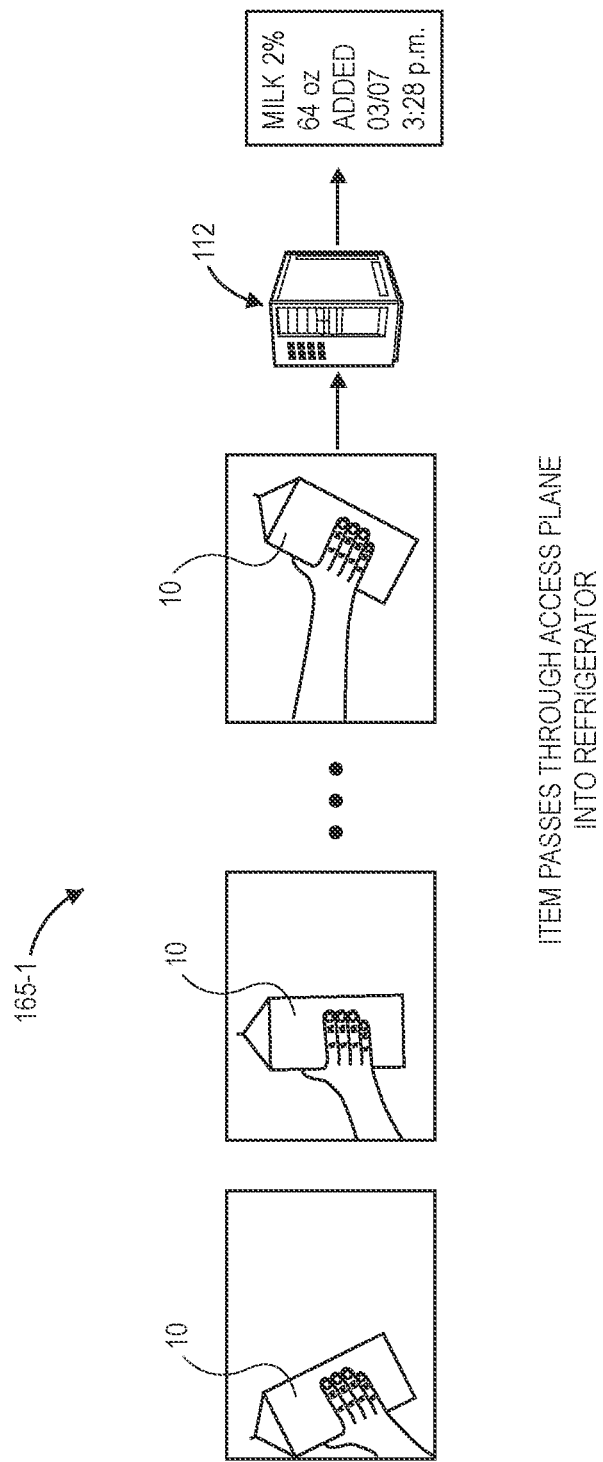

As is shown in FIG. 1F, before or after the actor 180-1 has closed the door 125 and departed from the refrigerator 120, a set of images 165-1 captured by one or both of the cameras 142 of either of the inventory monitoring devices 140 may be transmitted to a server 112 (or other computer device or system) over the network 190. As is shown in FIG. 1G, the set of images 165-1 is processed by the server 112 to detect the item 10 depicted therein, to determine that the item 10 passed by or through the access point or plane and into the refrigerator 120, to identify the item 10, and to determine a time at which the item 10 was placed into the refrigerator 120. A record of the inventory within the refrigerator 120 maintained on the server 112 is then updated to include an identifier of the item 10, and the time at which the item 10 was placed therein. Alternatively, in some implementations, the set of images 165-1 may be processed by one or more processors provided within the inventory monitoring devices 140, and need not be transmitted by such devices 140 to the server 112, thereby conserving processing power or capacity and bandwidth. In such implementations, the identity of the item 10 and the time at which the item 10 was placed into the refrigerator 120 may be transmitted to the server 112 over the network 190.

Figure 1H:
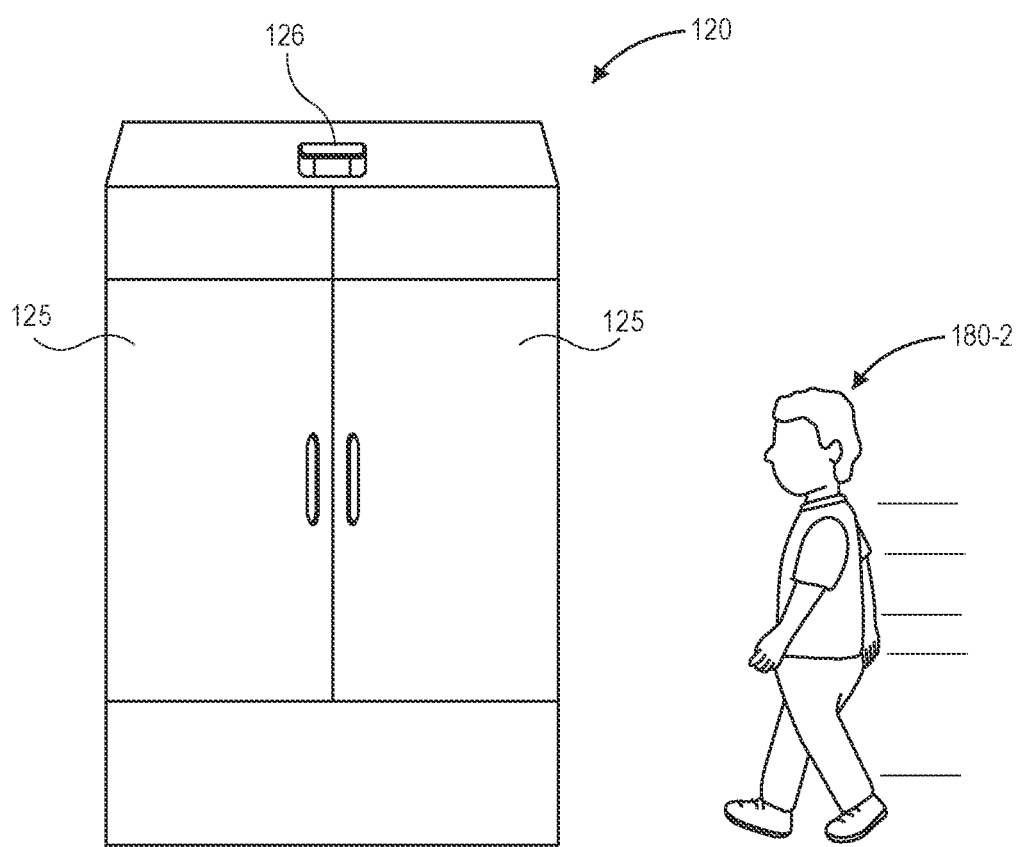
Figure 11:
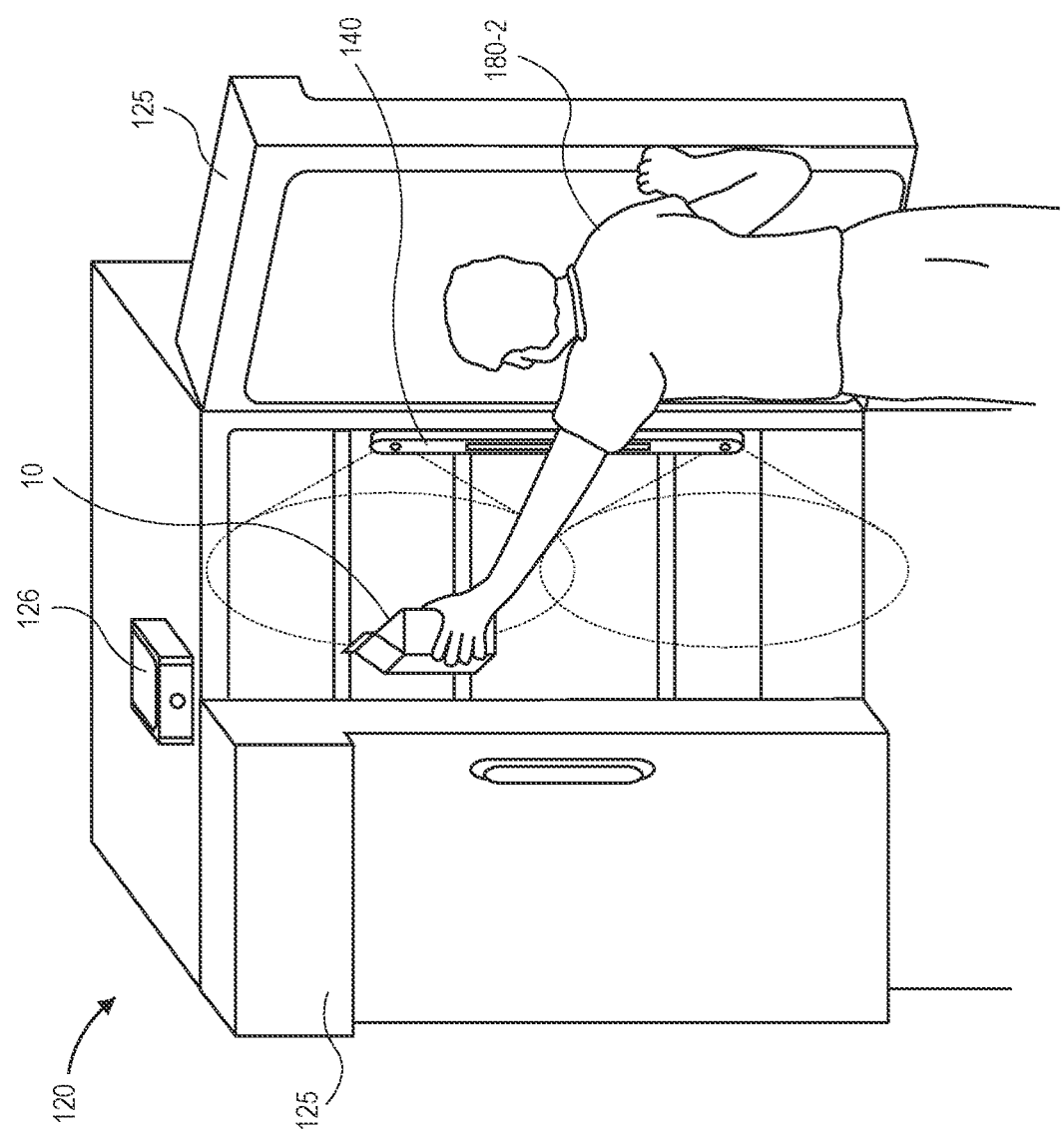
FIGS. 11A through 11E are views of aspects of one inventory monitoring device in accordance with implementations of the present disclosure.
Figure 1K:
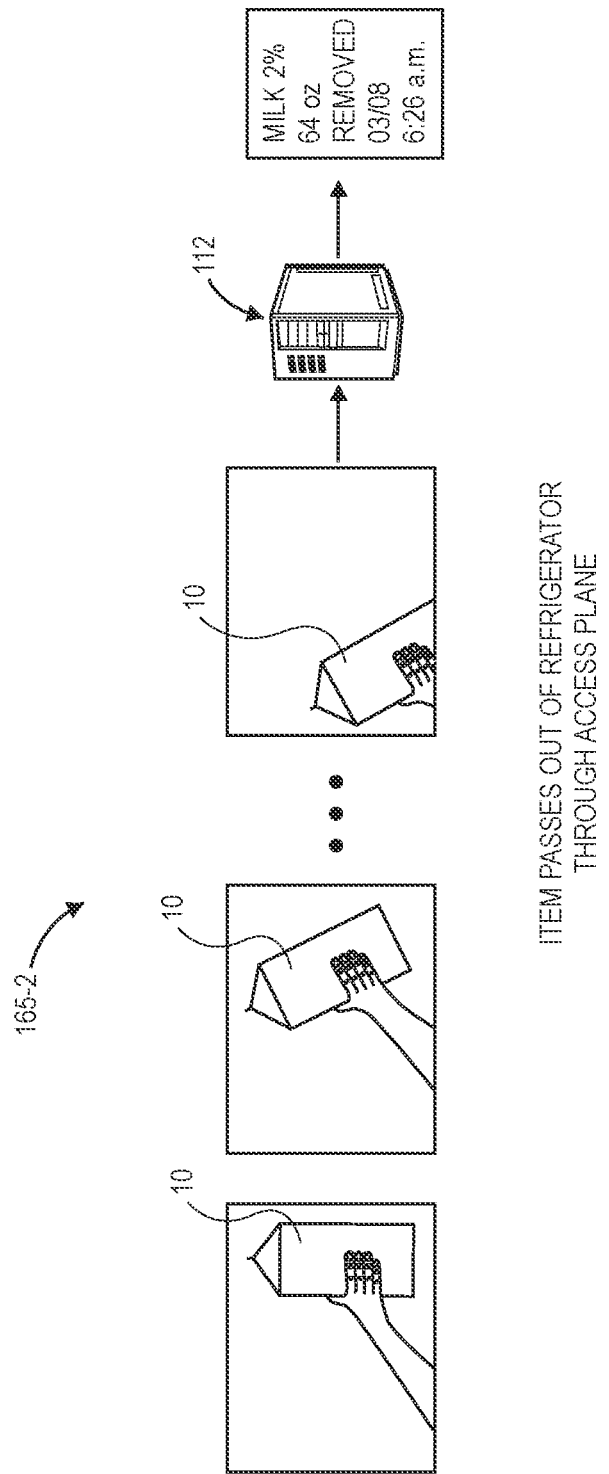

Subsequently, as is shown in FIG. 1H, an actor 180-2 approaches the refrigerator 120, and as is shown in FIG. 1I, the actor 180-2 opens one of the doors 125 and extends a hand into the refrigerator 120 to retrieve the item 10 therefrom. As the actor 180-2 opens the one of the doors 125 and retrieves the item 10, the cameras 142 of one or both of the inventory monitoring devices 140 capture imaging data, e.g., visual images, depth images or any other imaging data. The operation of the cameras 142 may be controlled or triggered on any basis, e.g., upon detecting the opening of the one of the doors 125, or light, motion or sounds therein, or on any other basis. As is shown in FIG. 1J, a set of images 165-2 captured by the cameras 142 of the inventory monitoring device 140 may be transmitted to the server 112 over the network 190. As is shown in FIG. 1K, the set of images 165-2 is processed to detect the item 10 depicted therein, to determine that the item 10 was taken out of the refrigerator 120 and passed by or through the access point or plane, to identify the item 10, and to determine a time at which the item 10 was removed from the refrigerator 120.

Accordingly, the systems and methods of the present disclosure are directed to inventory monitoring devices, e.g., inventory monitoring bars, inventory bars, or simply bars, that may be installed within or in association with enclosures such as refrigerators, cabinets or closets. The inventory monitoring devices may include one or more cameras or other sensors for capturing information or data regarding conditions within such enclosures, including information or data regarding items passing by or through access points or planes of the enclosures. A record of inventory within an enclosure may be generated or updated based on the information or data. The inventory monitoring devices may have any shape or dimension, and, in some implementations, include substantially slender housings that are configured for mounting within an enclosure to capture imaging data therein.

The inventory monitoring devices may further include one or more illuminators for projecting light into the enclosures, and enhancing a level of light reflected or scattered from items passing within fields of view of the cameras. The inventory monitoring devices may include light sensors, motion sensors, acoustic sensors or other sensors for initiating or controlling the operation of the cameras or illuminators, based on the presence of light, motion, sounds or other activity detected within an enclosure. The inventory monitoring devices may further include one or more sensors for monitoring conditions within an enclosure, including but not limited to thermometers, barometers, hygrometers, air monitoring sensors, acoustic sensors, or others, which may be configured to capture information or data regarding conditions within an enclosure.

The inventory monitoring devices may also include one or more computer processors, transceivers or other components for transmitting or receiving information or data, or for controlling the operation of the cameras, the illuminators, the sensors or the other components. In some implementations, the inventory monitoring devices may be configured to capture information or data using cameras or one or more other sensors, and transmit the information or data to one or more external computer devices or systems, e.g., over one or more networks. Alternatively, in some implementations, the inventory monitoring devices may be configured to capture information or data using cameras or one or more other sensors, process the information or data to determine information regarding inventory levels or other conditions within an enclosure, and transmit information or data including one or more summaries of the inventory levels or conditions, or determinations made based on the inventory levels or conditions, to one or more external computer devices or systems, e.g., over one or more networks.

Where an inventory monitoring system is configured to identify and track items entering into and departing from an enclosure, a record of the items within the enclosure, or a record of rates of consumption of one or more of the items, may be maintained in one or more data stores. For example, in some implementations, the inventory monitoring systems may be configured to report inventory levels within an enclosure to a materials handling facility, an electronic marketplace, or to one or more computer devices or systems associated with a user, an owner or another actor associated with the enclosure (e.g., by electronic mail or other messaging techniques). Moreover, the record of the items within the enclosure, or the record of the rates of consumption of the one or more items, may be maintained independent of any order histories of customers of a materials handling facility or an electronic marketplace.

The inventory monitoring devices may include housings formed from one or more sections of plastics (e.g., polycarbonates or others), composites, metals, woods, or other materials. The housings may contain or house the cameras, the illuminators, the processors and/or the transceivers, e.g., in association with one or more printed circuit board assemblies. The housings may further include one or more openings for permitting light to be emitted therefrom by the illuminators, or to be captured by lenses and/or sensors of the cameras. In some implementations, the housings may also include one or more openings or channels for enabling air flow therein, thereby permitting heat generated by the operation of the inventory monitoring devices to be transferred therefrom. In some other implementations, however, the inventory monitoring devices may be sealed (e.g., hermetically sealed), and may be configured to transfer heat therefrom through the one or more surfaces of such housings.

The inventory monitoring devices may include any number of cameras, illuminators or other components, and any number of the inventory monitoring devices may be provided in association with an enclosure. The cameras and/or illuminators may be aligned to capture or receive light in or from any direction or orientation. Additionally, the inventory monitoring devices may further include one or more polarizers for filtering light emitted by the illuminators, or for filtering light captured by the cameras.

The inventory monitoring devices may be powered from any source, e.g., an internal power source such as a battery or fuel cell, or an external power source, which may be located within or outside of an enclosure into which the inventory monitoring devices are installed. Additionally, any type or form of information or data may be derived from imaging data captured from an item, and used to identify the item, or to update a record of inventory to indicate that the item has been added to or removed from an enclosure. For example, where the imaging data comprises one or more visual images, information or data derived from the visual images may include but need not be limited to alphanumeric characters depicting names, titles, categories of items, as well as locations of origin of the items, instructions for using or consuming the items, or attributes of the items. Moreover, where a visual image depicts a bar code, the bar code may be interpreted and used to access information or data regarding the item, e.g., from one or more external sources. Where the imaging data comprises depth images, or three-dimensional ("3D") models derived from a pair of visual images, e.g., by stereo ranging techniques, the depth images or 3D models may be interpreted to determine a shape, a size or a texture of an item, and to identify the item based on the shape, the size or the texture.

The information or data captured by inventory monitoring devices may be utilized to identify items generally or specifically in any manner and on any basis, such as by comparing the information or data to browsing histories, purchasing histories, recommended items, items associated with locations visited by an actor, items that are known or believed to be owned, possessed or used by an actor, or any other items. An item entering or departing from an enclosure may be identified based at least in part on any such comparisons. Moreover, the information or data captured by inventory monitoring devices may also be utilized to predict rates of consumption of such items generally or specifically in any manner and on any basis. For example, such information or data may be used to determine a number of instances in which a specific item, or an item of a specific kind or type, has passed by or through an access point or plane of an enclosure, and to predict a rate at which the specific item, or items of the specific kind or type, are consumed by one or more actors associated with the enclosure.

In accordance with implementations of the present disclosure, an access point may be a single point in 3D space, or a set of such points, by or near which items entering into or departing from an enclosure must pass. In accordance with implementations of the present disclosure, an access plane may be a set of three or more non-collinear points in 3D space through which items entering into or departing from an enclosure must pass. An access point, or an access plane, may be defined with respect to one or more physical features of an enclosure, e.g., a door, a top, a bottom, sides, a back or other feature, or edges, corners, or surfaces of such features, or in any other manner.

Reflected light may be captured or detected by an imaging device if the reflected light is within the imaging device's field of view, which is defined as a function of a distance between a sensor and a lens within the imaging device, viz., a focal length, as well as a location of the imaging device and an angular orientation of the imaging device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, an imaging device may be configured in a fixed position, or with a fixed focal length (e.g., fixed-focus lenses) or angular orientation. Alternatively, a imaging device may include one or more actuated or motorized features for adjusting a position of the imaging device, or for adjusting either the focal length (e.g., zooming the imaging device) or the angular orientation (e.g., the roll angle, the pitch angle or the yaw angle) of the imaging device, by causing a change in a distance between the sensor and the lens (e.g., optical zoom lenses or digital zoom lenses), a change in a location of the imaging device, or a change in one or more of the angles defining an angular orientation.

Figure 2:
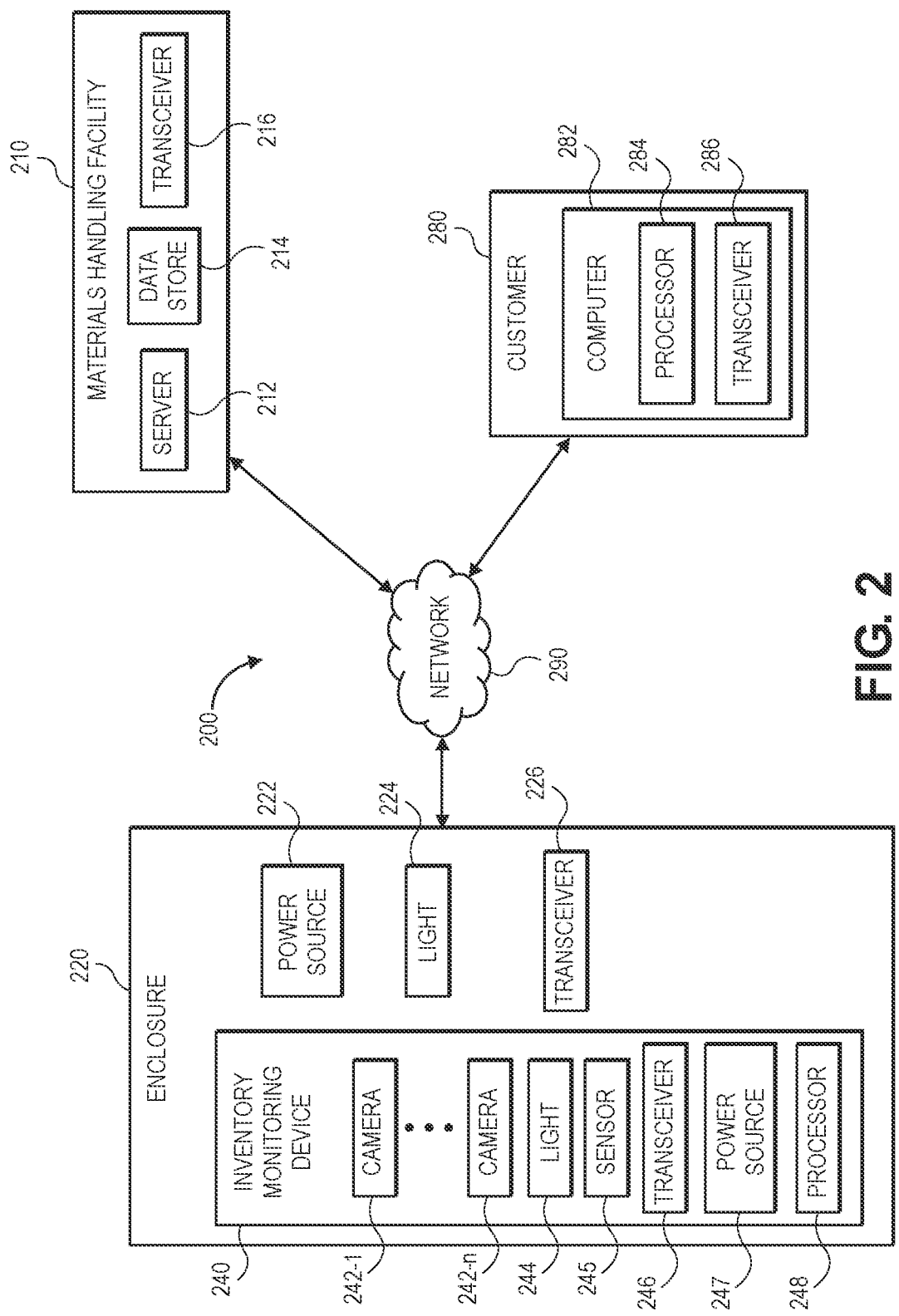
FIG. 2 is a block diagram of one system including an interactive monitoring device in accordance with implementations of the present disclosure.

Referring to FIG. 2, a block diagram of one system including an interactive monitoring device in accordance with implementations of the present disclosure are shown. Except where otherwise noted, reference numerals preceded by the number "2" shown in FIG. 2 indicate components or features that are similar to components or features having reference numerals preceded by the number "1" shown in FIGS. 1A through 1K.

As is shown in FIG. 2, a system 200 includes a materials handling facility 210, an enclosure 220 having one or more inventory monitoring devices 240 (e.g., bars) therein) and a customer 280 that are connected to one another over a network 290, which may include the Internet, in whole or in part.

The materials handling facility 210 may be any facility that is adapted to receive, store, process and/or distribute inventory items (e.g., products) from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

As is shown in FIG. 2, the materials handling facility 210 includes a networked computer infrastructure for performing various computer-related functions associated with the receipt, storage, processing and distribution of such items, including one or more physical computer servers 212, data stores (e.g., databases) 214 and/or transceivers 216, that may be provided in the same physical location as the materials handling facility 210, or in one or more alternate or virtual locations, e.g., in a "cloud"-based environment. In some implementations, the servers 212, the data stores 214 and/or the transceivers 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212 and/or the data stores 214 may be configured to execute one or more machine learning systems or techniques. For example, in some implementations, the servers 212 may be configured to execute an artificial neural network, such a convolutional neural network, to process imaging data or other information or data received from the inventory monitoring device 240 over the network 290, or from any other source. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing information or data. In some implementations, the transceivers 216 enable the materials handling facility 210 to communicate with the enclosure 220, the inventory monitoring device 240, the customer 280, or any other external devices, systems or components by way of the network 290. In some implementations, the transceiver 216 may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290 directly.

The materials handling facility 210 may include one or more inventory areas having predefined two-dimensional or 3D storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2). The materials handling facility 210 may operate one or more order processing and/or communication systems using computer devices or resources in communication with one or more of the servers 212, the data stores 214 and/or the transceivers 216, or through one or more other computing devices or resources that may be connected to the network 290, in order to transmit or receive information in the form of digital or analog data, or for any other purpose.

The enclosure 220 may be or include any space, container or system for accommodating one or more items therein. In some implementations, the enclosure 220 includes a door or other covering that may conceal the items therein, or otherwise prevent an accurate inventory of items within the enclosure 220 to be visually determined from outside of the enclosure 220. As is shown in FIG. 2, the enclosure 220 further includes a power source 222, a light (or illuminator) 224, and a transceiver 226. In some implementations, the enclosure 220 may be a refrigerator, e.g., a device or system having an insulated internal compartment that may be configured to transfer heat from within the internal compartment to ambient, outside of the internal compartment, in order to maintain the internal compartment at or near a predetermined temperature, or within a predetermined temperature band or range. In some implementations, the enclosure 220 may be a cabinet, a closet, or a set of shelves, e.g., a defined space having one or more of a door, a top, a bottom, sides or a back for accommodating one or more items therein. Alternatively, the enclosure 220 may be a bowl, a box, or another container resting on a surface, or in any other location. A door or other portal for accessing the enclosure 220 may rotate about a vertical axis, a horizontal axis, or an axis aligned at any other angle. Optionally, the enclosure 220 may include one or more shelves for accommodating one or more items thereon. In some implementations, the enclosure 220 may be any other space, such as a garage, an automobile trunk, or others.

The power source 222 may be any available AC or DC power source, within or outside of the enclosure 220, for providing electrical power at any voltage level, current level and/or frequency to one or more aspects of the enclosure 220 or the inventory monitoring device 240. For example, the power source 222 may include a receptacle within the enclosure 220, or an outlet provided outside of the enclosure 220. The light (or illuminator) 224 may be any visible indicator provided within or in association with the enclosure 220. For example, the light 224 may include any number of LED, LCD, incandescent bulbs, compact and/or linear fluorescent bulbs, halogen lamps, metal halide lamps, neon lamps, sodium lamps or any other type or form of lights configured to project light at any frequency, wavelength or intensity. In some implementations, the operation of the light 224 may be coordinated with other aspects of the enclosure 220. For example, where the enclosure 220 includes a door or other covering, the operation of the light 224 may be triggered by operation of the door or other covering, e.g., turned on when the door or other covering is opened, thereby enabling access to the enclosure 220, and turned off when the door or other covering is closed, thereby inhibiting access to the enclosure 220.

The transceiver 226 may be any device or system that enables communication between the inventory monitoring device 240 or any computer processors or other systems associated with the enclosure 220 and one or more external computer devices or systems, e.g., over the network 290. For example, the transceiver 226 may enable the enclosure 220 or the inventory monitoring device 240 to communicate with the materials handling facility 210 or the customer 280, or any other external devices, systems or components by way of the network 290. In some implementations, the transceiver 226 may be configured to communicate through one or more wired or wireless means, e.g., wired technologies such as USB or fiber optic cable, or standard wireless protocols such as Bluetooth® or any Wi-Fi protocol, either by way of the servers 212 or over the network 290 directly.

The inventory monitoring device 240 may be any device or system that is outfitted with one or more cameras 242-1 . . . 242-n and configured for mounting within the enclosure 220 for the purpose of capturing imaging data regarding items entering or exiting the enclosure 220, and updating a record of inventory within the enclosure 220 based on the imaging data. As is shown in FIG. 2, the inventory monitoring device 240 includes the cameras 242-1 . . . 242-n, a light 244, a sensor 245, a transceiver 246, a power source 247 and a processor 248, which may be disposed within a common housing.

The cameras 242-1 . . . 242-n may be any form of optical recording devices that may be used to photograph or otherwise record imaging data of items appearing within their respective fields of view. The cameras 242-1 . . . 242-n may include any sensors, such as color sensors, grayscale sensors, black-and-white sensors, or other visual sensors, as well as depth sensors or any other type of sensors, that are configured to capture visual imaging data (e.g., textures) or depth imaging data (e.g., ranges) to objects within one or more fields of view of the cameras 242-1 . . . 242-n. In some implementations, the cameras 242-1 . . . 242-*n* may have single elements or a plurality of photoreceptors or photosensitive components (e.g., a CCD sensor, a CMOS sensor, or another sensor), which may be typically arranged in an array. Light reflected or scattered from objects within fields of view of the cameras 242-1 . . . 242-*n* may be captured, and quantitative values, e.g., pixels, may be assigned to one or more aspects of the reflected or scattered light. The cameras 242-1 . . . 242-*n* may capture imaging data in the form of one or more still or moving images (e.g., streams of visual and/or depth image frames), along with any relevant audio signals or other information (e.g., position data).

In some implementations, the cameras 242-1 . . . 242-*n* may include both visual (e.g., color, grayscale or black-and-white) and depth sensors. Alternatively, one or more of the cameras 242-1 . . . 242-*n* may include just visual sensors, or just depth sensors. For example, one or more of the cameras 242-1 . . . 242-*n* may be an RGB color camera, a still camera, a motion capture/video camera or any other type or form of camera. In other implementations, one or more of the cameras 242-1 . . . 242-*n* may include depth-sensing cameras, such as an RGBD or RGBz camera. In still other implementations, one or more of the cameras 242-1 . . . 242-*n* may be a thermographic or infrared (IR) camera.

The light (or illuminator) 244 may be any illuminating system such as LED, LCD, incandescent bulbs, compact and/or linear fluorescent bulbs, halogen lamps, metal halide lamps, neon lamps, sodium lamps or any other type or form of lights configured to project light into portions of the enclosure 220 at any frequency, wavelength or intensity.

The sensor 245 may be any sensor provided within the inventory monitoring device 240 for capturing information or data regarding items entering or departing the enclosure 220, or conditions within the enclosure 220. In some implementations, the sensor 245 may be a sensor that converts detected light (e.g., visible light, or invisible light such as infrared or ultraviolet) into one or more electrical signals. For example, the sensor 245 may be one or more charge coupled devices, light-dependent resistors, photoconductive cells, photodiodes, photoemissive cells, photomultiplier tubes, phototransistors, phototubes, photovoltaic cells, or any others. In some implementations, the sensor 245 may be a sensor that detects motion within the enclosure 220, e.g., of body parts of actors, of items, or of doors or other systems of the enclosure 220, and generates one or more signals in response to detecting the motion. In some implementations, the sensor 245 may be an acoustic sensor (e.g., microphones, piezoelectric sensors, vibration sensors or other transducers) that detects sounds or other acoustic energy within the enclosure 220, and generates one or more signals in response to detecting the sounds or acoustic energy. In still other implementations, the sensor 245 may be thermometers, barometers or hygrometers, or any devices, components, systems, or instruments for determining local air temperatures, atmospheric pressures, or humidities, respectively, within the enclosure 220. In other implementations, the sensor 245 may be an air monitoring sensor (e.g., oxygen, ozone, hydrogen, carbon monoxide or carbon dioxide sensors), an ozone monitor, a pH sensor, a metal detector, a radiation sensor (e.g., Geiger counters, neutron detectors, alpha detectors), or any other type or form of sensor.

The transceiver 246 enables the inventory monitoring device 240 to communicate with the materials handling facility 210, the customer 280, or any other external devices, systems or components by way of the network 290. In some implementations, the transceiver 246 be configured to communicate through one or more wired or wireless means, e.g., wired technologies such as USB or fiber optic cable, or standard wireless protocols such as Bluetooth® or any Wi-Fi protocol, either by way of the transceiver 226 or over the network 290 directly.

The power source 247 may be any type or form of battery, fuel cell or other system for generating power for supporting operations of the inventory monitoring device 240, such as a standard battery, e.g., a size AA battery, a size AAA battery, a size C battery, a size D battery, a coin-cell battery (e.g., a CR 2016, a CR 2025 or a CR 2032), or any other battery of any size, shape or power rating. In some implementations, the inventory monitoring device 240 need not include an intrinsic power source, but may be electrically coupled to another component, e.g., the enclosure 220, and may receive electrical power from the other component, e.g., by one or more conductors or other connectors, such as according to a Power over Ethernet (or "PoE") or a Universal Serial Bus Type-C("USB-C") standard or system. Accordingly, the inventory monitoring system 240 may include any number of transformers, converters (e.g., step-down converters), capacitors, resistors, inductors, transistors or other components for utilizing or altering power received from the power source 222 or other external power sources.

The processor 248 may be configured to process imaging data captured by one or more of the cameras 242-1 . . . 242-*n* or any other information or data captured by the sensor 245. For example, in some implementations, the processor 248 or other components of the cameras 242-1 . . . 242-*n* may be configured to recognize characteristics of stationary or moving objects or portions thereof depicted within imaging data, and to match such characteristics against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects. In some implementations, the processor 248 may be configured to receive information or data captured by the sensor 245 and make one or more determinations regarding inventory levels within the enclosure 220, or other conditions within the enclosure 220, based on the information or data.

In some implementations, the processor 248 may be configured to train and/or execute one or more machine learning systems, such as artificial neural networks, e.g., convolutional neural networks, to process imaging data captured by one or more of cameras 242-1 . . . 242-*n* or information or data captured by the sensor 245. For example, in some implementations, a machine learning system executed by the processor 248 may be trained by providing information or data representing one or more features of actors (e.g., body parts) and/or items to the machine learning system as training inputs, e.g., in a supervised manner, and a set of outputs received from the machine learning system may be compared to a set of training outputs, such as one or more identifiers or indications of an event, including whether imaging data depicts a portion of an actor and/or an item, or a category of item. Machine learning systems executed by the processor 248 may include one or more artificial neural networks (e.g., convolutional neural networks) that are trained to map inputted information or data regarding features of actors, e.g., time series of values of data determined from captured images or other information or data, to desired outputs by adjusting strengths of connections between one or more neurons, which are sometimes called synaptic weights, and may have any number of layers, e.g., an input layer, an output layer, and any number of intervening hidden layers. Alternatively, machine learning systems executed by the processor 248 may be any other type or form of algorithm, system or technique.

Moreover, in some implementations, machine learning systems executed by the processor 248 may perform tasks in one or more core areas, including but not limited to body part detections, cropping, evaluation, distance determination, feature extraction, person linking and unlinking, or others. In some implementations, one such machine learning system may be a neural network backbone (e.g., a residual neural network backbone) that is configured to perform one or more tasks for detecting portions of actors, items or products, events or other features based on images captured by the cameras 242-1 . . . 242-n or information or data captured by the sensor 245. The processor 248 may be configured to execute networks (e.g., multi-task networks) having shared backbones and one or more middle layers, task layers, decoding layers or others.

In addition to the one or more cameras 242-1 . . . 242-n, the light 244, the sensor 245, the transceiver 246, the power source 247 or the processor 248, the inventory monitoring device 240 may also include any number of other components that may be required in order to capture, analyze and/or store information or data, including but not limited to one or more memory or storage components, chips, electrodes, clocks, timers, power sources, connectors or any other relevant features (not shown). Additionally, in some implementations, the one or more cameras 242-1 . . . 242-n, the light 244, the sensor 245, the transceiver 246, the power source 247 or the processor 248 may be provided on or in association with a substrate (e.g., a circuit board) provided within a housing.

The inventory monitoring device 240 may be deployed in any number, and may be homogenous or heterogeneous in nature, in accordance with the present disclosure. Although the system 200 of FIG. 2 includes boxes corresponding to a single box corresponding to the inventory monitoring device 240, two boxes corresponding to the cameras 242-1 . . . 242-n and a single box corresponding to the sensor 245 disposed within the inventory monitoring device 240, those of ordinary skill in the pertinent arts will recognize that any number or type of inventory monitoring devices may be provided within an enclosure in accordance with the present disclosure, and such inventory monitoring devices may include any number of cameras or other components (e.g., lights, sensors, transceivers, processors).

The customer 280 may be any entity or individual that wishes to download, purchase, rent, lease, borrow or otherwise obtain items (which may include goods, products, services or information of any type or form) from the materials handling facility 210, or any other entity or individual that is associated with the materials handling facility 210 for any reason. The customer 280 may utilize one or more computers 282, which may include but are not limited to a mobile device (e.g., a smartphone, a tablet computer or a wearable computer, or computing devices provided in wristwatches or other wrist-mounted devices, glasses or other head-mounted devices, automobiles or any other appliances or machines), a set-top box, a smart speaker, as well as a laptop computer, a desktop computer, or computing devices provided in wristwatches, televisions, set-top boxes, automobiles or any other appliances or machines. The computers 282 utilized by the customer 280 may include one or more processors 284 for executing one or more software applications, e.g., a web browser, a shopping application, a mapping application or an E-mail client. The computers 282 may also include one or more transceivers 286 that enable the customer 280 or the computers 282 to communicate with the materials handling facility 210, the inventory monitoring device 240, or any other external devices, systems or components by way of the network 290. In some implementations, the transceiver 286 may be configured to communicate through one or more wired or wireless means, e.g., wired technologies such as USB or fiber optic cable, or standard wireless protocols such as Bluetooth® or any Wi-Fi protocol, over the network 290. The computers 282 may further include any number of input and/or output peripherals such as scanners, readers, keyboards, keypads, touchscreens, voice interaction or recognition components or modules, or like devices.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The data and/or computer-executable instructions, programs, firmware, software and the like (also referred to herein as "computer-executable" components) described herein may be stored on a computer-readable medium that is within or accessible by computers or computer components such as the inventory monitoring device 240 or the computers 282, or any other computer devices or systems utilized by the materials handling facility 210 or the enclosure 220, and having sequences of instructions which, when executed by a processor (e.g., a central processing unit, or "CPU"), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

Figure 3:
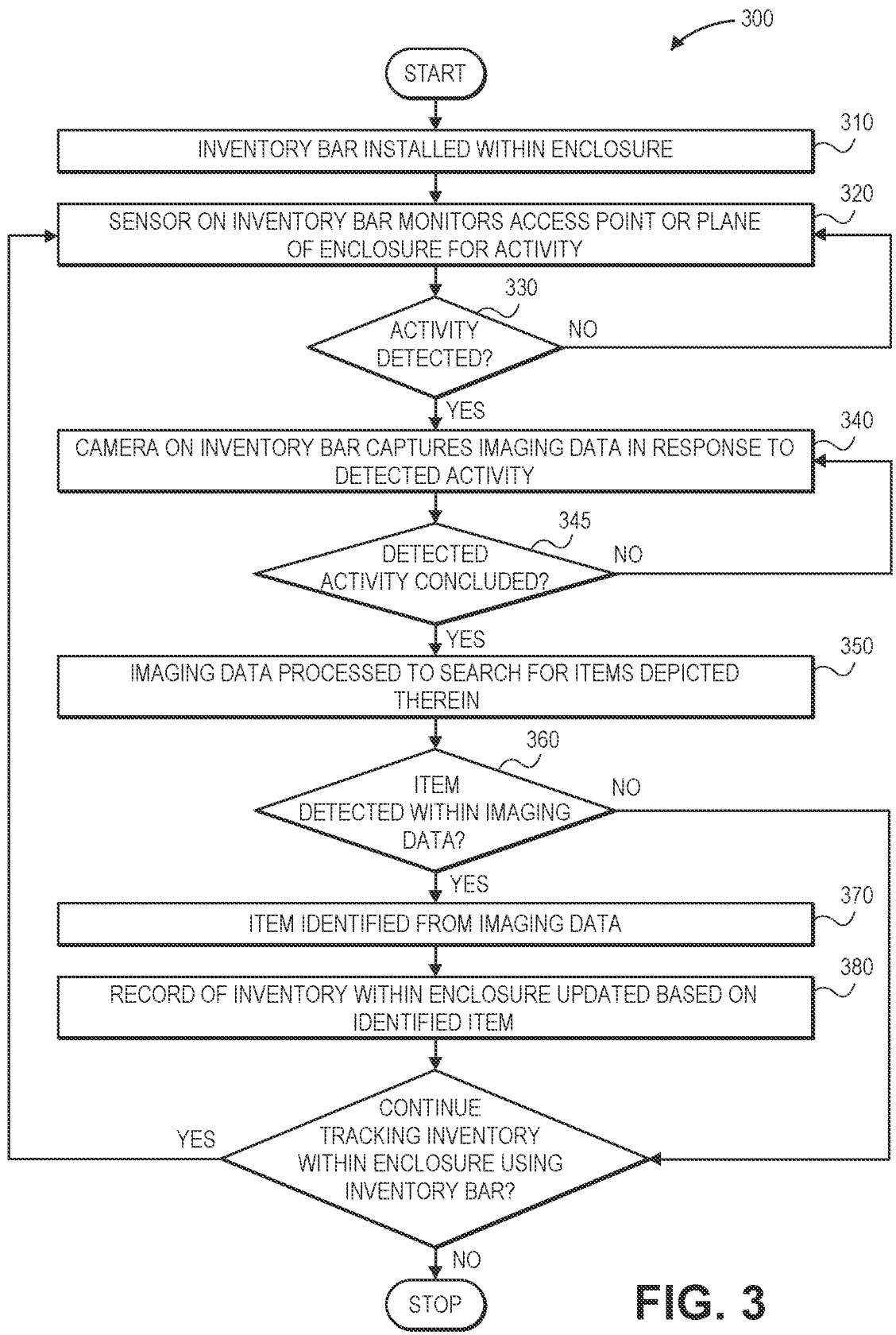
FIG. 3 is a flow chart of one process for tracking inventory levels using an inventory monitoring device in accordance with implementations of the present disclosure.

As is discussed above, the systems and methods of the present disclosure may utilize one or more inventory monitoring devices (e.g., inventory bars) provided within an enclosure (e.g., a refrigerator, a cabinet, a closet, a set of shelves) to track the entry of items into the enclosure or the removal of items from the enclosure. Referring to FIG. 3, a flow chart 300 of one process for tracking inventory levels using an inventory monitoring device in accordance with implementations of the present disclosure is shown. At box 310, an inventory bar (e.g., an inventory monitoring device) is installed within an enclosure. The inventory bar may include any number of cameras that are disposed within a housing mounted within a vicinity of an access point or plane of the enclosure. The cameras may be aligned and configured to capture imaging data regarding the presence or motion of one or more body parts of actors, or items, into or out of the enclosure. Alternatively, or additionally, the inventory bar may include one or more illuminators disposed within the housing and aligned to project light, when energized, into the enclosure. The inventory bar may further include one or more light sensors, buttons, power connections, or any other features. In some implementations, any number of inventory bars may be mounted in tandem with one another, and may be configured to capture imaging data independently or collectively regarding the presence or motion of one or more body parts of actors, or items, into or out of the enclosure.

At box 320, one or more sensors provided on the inventory bar monitor an access point or plane of the enclosure for activity. For example, in some implementations, the inventory bar may be outfitted with a light sensor that is adapted to detect light within the enclosure, e.g., from one or more lights within the enclosure or from an external source, and to generate one or more signals in response to detecting light. In some implementations, the inventory bar may be outfitted with one or more motion sensors that are adapted to detect motion within the enclosure, e.g., of body parts of actors, of items, or of doors or other systems of the enclosure, and to generate one or more signals in response to detecting the motion. In some implementations, the inventory bar may be outfitted with one or more acoustic sensors that are adapted to detect sounds or other acoustic energy within the enclosure, and to generate one or more signals in response to detecting such sounds or energy. Alternatively, or additionally, the inventory bar may include any other sensors that may detect activity occurring within the enclosure, and to generate one or more signals in response to detecting the activity.

At box 330, whether activity is detected by the sensor is determined. If the sensor does not detect any activity, then the process returns to box 320, wherein the one or more sensors continue to monitor the access point or plane for activity.

If the sensor detects activity, however, then the process advances to box 340, where one or more cameras on the inventory bar are triggered to capture imaging data in response to the detected activity. For example, the cameras may be configured to capture visual images, depth images, or other imaging data at any frame rate and any level of resolution. At box 345, whether the detected activity has concluded is determined. In some implementations, the conclusion of the detected activity may be determined based on data that is captured, or was previously captured, by the sensor, such as where light, motion or sounds are no longer sensed within the enclosure. Alternatively, or additionally, the detected activity may be determined to have concluded after a predetermined period of time following an initial detection of the activity, e.g., thirty seconds, sixty seconds, or another period of time. For example, in some implementations, a customer, a user, or another actor associated with the enclosure may configure one or more inventory bars to capture imaging data for a specific period of time.

If the detected activity has not concluded, then the process returns to box 340, where the camera continues to capture imaging data regarding the detected activity.

If the detected activity has concluded, however, then the process advances to box 350, where the imaging data is processed to search for any items depicted therein. For example, one or more individual frames of visual images may be processed to determine whether any of such images depict one or more items, or body parts of actors (e.g., hands) that may be holding one or more items, within or near an access point or access plane to the enclosure. One or more of the individual images may be processed by providing such images as inputs to a machine learning system, e.g., an artificial neural network, such as a convolutional neural network, that is trained to detect hands, items or other objects, and whether such images depict any hands, items or objects may be determined based on outputs received from the machine learning system. Items may be detected based on visible features such as contours, outlines, colors, textures, silhouettes, shapes or other characteristics of the items depicted within the images, viz., which may vary from image to image as the items move by or through the access point or plane over time.

At box 360, whether an item is detected within the imaging data is determined. The imaging data may be processed by one or more processors of the inventory bar, or transmitted, e.g., over one or more networks, to an external computer device or system for processing, to determine whether the imaging data depicts one or more features from which an item may be identified as being depicted therein. For example, in some implementations, where an actor loads one or more items into an enclosure, or removes one or more items from the enclosure, imaging data captured by the camera is likely to depict the one or more items in motion. Alternatively, where the sensor detects activity based on an opening of a door to an enclosure by an actor, such as the opening of either of the doors 125 of the refrigerator 120 shown in FIG. 1B, but the actor merely inspects contents of the enclosure without placing an item therein or removing an item therefrom, an item will not be depicted in motion within the imaging data, and the status of inventory within the enclosure may be presumed to be constant.

If an item is detected within the imaging data, then the process advances to box 370, where the item is identified. For example, an item may be identified based on visible features of the item detected within one or more images, or any markings such as symbols, alphanumeric characters, bar codes (e.g., one-dimensional or two-dimensional bar codes, such as "QR" codes) provided on such item, or in any other manner. Where items include names or numbers signifying a name of the item, or an origin of the item, the items may be identified by detecting and interpreting the names or numbers. Alternatively, or additionally, any bar codes provided on external surfaces of items may be detected and interpreted to identify the items, or any additional information regarding the items, including names, brands, origins, sizes, attributes (e.g., nutrition facts), or any other information. An item detected within images may be identified or classified generally based on a type of the item, e.g., butter, soda, or carrots, or more specifically based on a brand of the item, e.g., Land O'Lakes Butter, Coca-Cola, or 365 Organic Carrots, based on a size of the item, e.g., pints, pounds or pitchers, or based on a status or condition of the item, e.g., raw, cooked or frozen.

Alternatively, or additionally, any visual features of items detected within images may be compared to prior purchasing histories of one or more actors associated with the enclosure, or to visual features of items previously detected within the enclosure. For example, in some implementations, a record of items (or types of items) previously purchased by such actors or previously placed within the enclosure may be maintained in one or more data stores, and attributes of such items may be compared to visual features of items detected within such images in order to predict an identity of one or more items, such as where the items are replacements or substitutes for previously purchased or stored items, or complements to such items (e.g., items commonly consumed or stored with such items). The visual features of items may be compared to any other information or data regarding any other items that are known or believed to be owned, possessed or used by an actor on any basis.

In some implementations, a direction of motion of an item may be determined by tracking an item across a field of view of the camera, e.g., within images captured by the camera. For example, where an item is initially detected within an image at or near an edge of the image or a field of view of the camera that is outside of the enclosure, or nearest the access point or plane to the enclosure, and is subsequently detected at locations that are increasingly farther from the access point or plane to the enclosure, or toward an interior of the enclosure, a direction of motion of the item may be determined to be moving from outside of the enclosure to inside the enclosure. An item that is detected as moving in this direction may be presumed to have been loaded into the enclosure. Conversely, where an item is initially detected within an image at or near an edge of the image or a field of view of the camera that is inside of the enclosure, or farthest from the access point or plane to the enclosure, and is subsequently detected at locations that are increasingly closer to the access point or plane to the enclosure, or toward an exterior of the enclosure, a direction of motion of the item may be determined to be moving from inside the enclosure to outside of the enclosure. An item that is detected as moving in this direction may be presumed to have been removed from the enclosure.

In some implementations, the imaging data may be processed by one or more processors residing on the inventory bar or, alternatively, transmitted to one or more external computer devices or systems for processing.

At box 380, a record of the inventory within the enclosure is updated based on the item identified at box 370. For example, once an item has been identified as moving into the enclosure, an identifier of the item may be added to a record of the inventory within the enclosure, or a number of the item within the record of the inventory may be increased by one. Once an item has been identified as moving out of the enclosure, an identifier of the item may be removed from a record of the inventory within the enclosure, or a number of the item within the record of the inventory may be decremented by one. The record of inventory, as updated, may be utilized for any purpose. For example, where the record of inventory of the item is below a threshold, one or more of the item may be automatically ordered or reordered, or a recommendation to order or reorder one or more of the item may be provided to a customer, a user or another actor associated with the enclosure. Alternatively, the record of inventory of the item, optionally along with records of inventory of any other relevant items, may be utilized to identify one or more recipes or other procedures for utilizing the item or one or more other items. Any information regarding the record of inventory or other conditions within the enclosure may be provided to any number of computer devices or systems of customers, users or actors associated with the enclosure in any manner and on any basis.

After determining that a moving item was not detected within imaging data at box 360, or after updating the record of the inventory within the enclosure at box 380, the process advances to box 390, where whether the continued tracking of inventory within the enclosure using the inventory bar is desired may be determined. If the continued tracking of inventory is desired, then the process returns to box 320, where the sensor monitors the access point or plane for activity (e.g., light, motion or sounds). If the continued tracking of inventory is no longer desired, however, then the process ends.

Figure 4A:
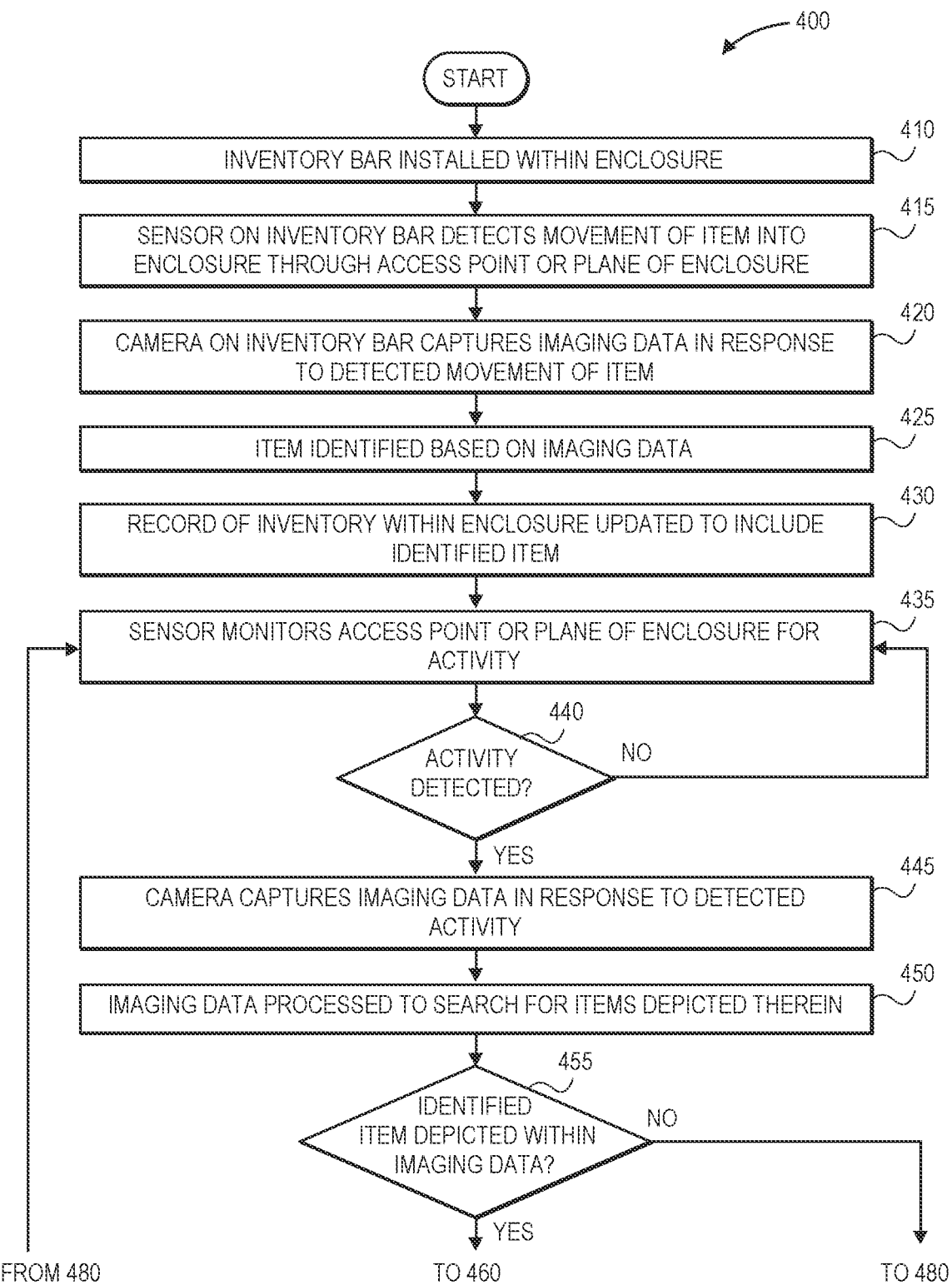
FIGS. 4A and 4B are a flow chart of one process for tracking inventory levels using an inventory monitoring device in accordance with implementations of the present disclosure.
Figure 4B:
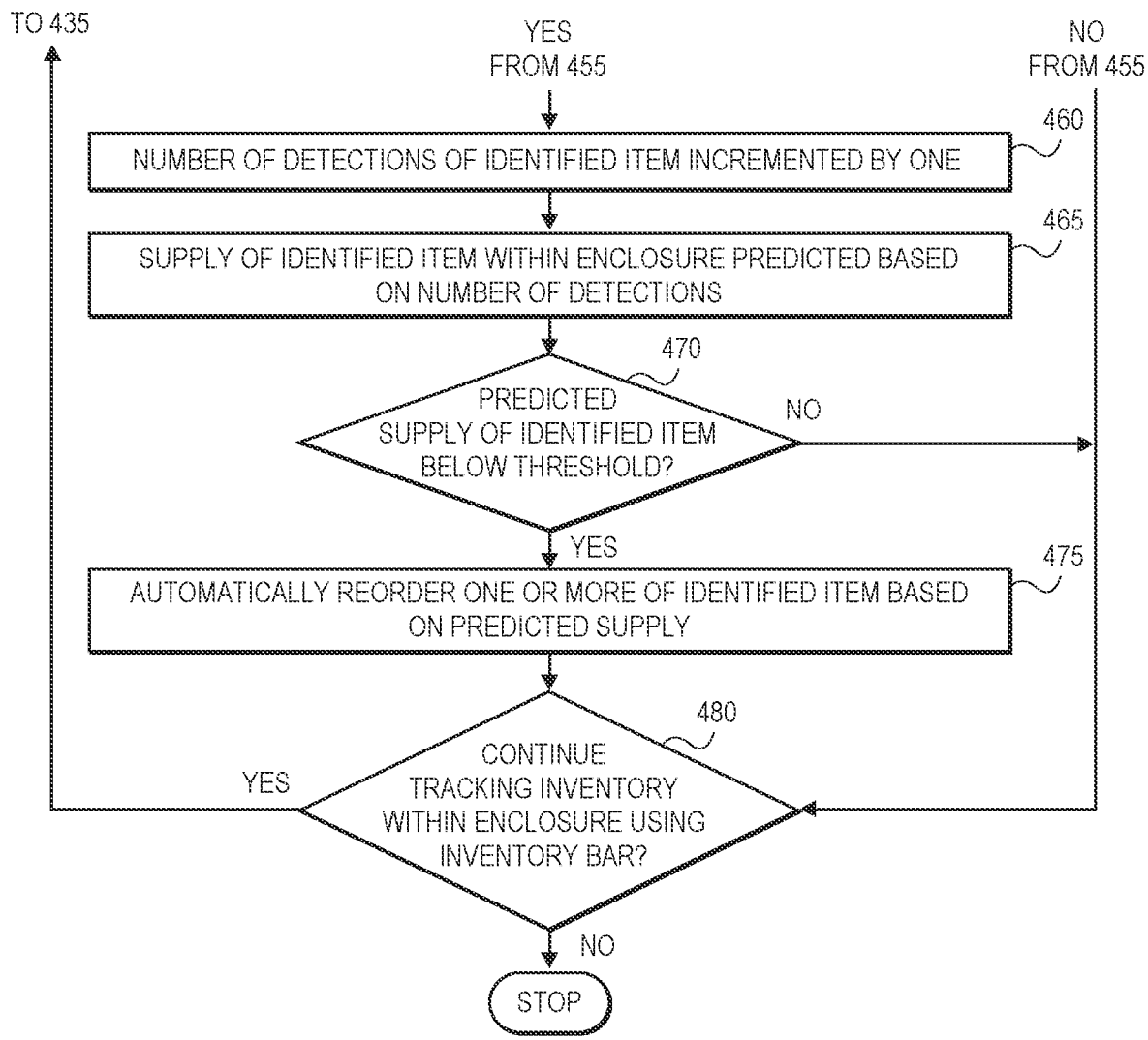

As is discussed above, the systems and methods of the present disclosure may utilize information or data captured by one or more inventory monitoring devices (e.g., inventory bars) provided within an enclosure (e.g., a refrigerator, a cabinet, a closet, a set of shelves) to determine a level, a rate or an extent of consumption of items placed within the enclosure, such as based on a number or frequency of instances in which the items pass by or through an access point or plane of the enclosure. Referring to FIGS. 4A and 4B, a flow chart 400 of one process for tracking inventory levels using an inventory monitoring device in accordance with implementations of the present disclosure is shown. At box 410, an inventory bar (e.g., an inventory monitoring device) is installed within an enclosure. In some implementations, any number of inventory bars may be mounted in tandem with one another, and may be configured to capture imaging data independently or collectively regarding the presence or motion of one or more body parts of actors, or items, into or out of the enclosure.

At box 415, a sensor provided on the inventory bar detects movement of an item into the enclosure through an access point or plane of the enclosure. In some implementations, the sensor may be one or more cameras that are configured to determine that an item has passed by or through the access point or plane and into the enclosure. Alternatively, or additionally, the sensor may be any other type or form of sensor.

At box 420, one or more cameras of the inventory bar capture imaging data within the enclosure. The cameras may be configured to capture imaging data continuously, or may be triggered to capture the imaging data upon the occurrence of one or more events, e.g., sensing light, motion or sounds within the enclosure. Moreover, the imaging data may include visual imaging data, depth imaging data or any other type of imaging data, and may be captured at any frame rate and any level of resolution. In some implementations, the inventory bar may be modular in nature, and may include multiple sets of components provided in multiple housings that may be coupled to one another in a wired or wireless manner.

At box 425, an item is identified based on the imaging data. The item may be identified based on visible features of the item detected within one or more images, or any markings such as symbols, alphanumeric characters, bar codes (e.g., one-dimensional or two-dimensional bar codes, such as "QR" codes) provided on such item, or in any other manner. Where items include names or numbers signifying a name of the item, or an origin of the item, the items may be identified by detecting and interpreting the names or numbers. Alternatively, or additionally, any bar codes provided on external surfaces of items may be detected and interpreted to identify the items, or any additional information regarding the items.

At box 430, a record of the inventory within the enclosure is updated to include the item identified at box 425. For example, an identifier of the item may be added to a record of the inventory within the enclosure, or a number of the item within the record of the inventory may be increased by one. Alternatively, in some other implementations, a record of inventory within the enclosure may be updated to include one or more of the item independent of any data captured by sensors provided on the inventory bar. For example, where a customer purchases one or more of the item from a materials handling facility or an electronic marketplace, a record of inventory of the item within the enclosure may be automatically generated or updated to include at least one of the item.

At box 435, one or more sensors provided on the inventory bar monitor an access point or plane of the enclosure for activity. For example, in some implementations, the inventory bar may be outfitted with a light sensor, a motion sensor or an acoustic sensor that is adapted to detect light, motion or sounds, and to generate one or more signals in response to detecting light, motion or sounds. Alternatively, or additionally, the inventory bar may include any other sensors that may detect activity occurring within the enclosure, and to generate one or more signals in response to detecting the activity.

At box 440, whether activity is detected by the sensor is determined. If the sensor does not detect any activity, then the process returns to box 435, wherein the one or more sensors continue to monitor the access point or plane for activity.

If the sensor detects activity, however, then the process advances to box 445, where one or more cameras on the inventory bar capture imaging data in response to the detected activity. For example, the cameras may be configured to capture visual images, depth images, or other imaging data at any frame rate and any level of resolution. At box 450, the imaging data is processed to search for any items depicted therein. Items may be detected using machine learning systems, algorithms or techniques (e.g., artificial neural networks, such as convolutional neural network), or based on visible features such as contours, outlines, colors, textures, silhouettes, shapes or other characteristics of the items depicted within the images, viz., which may vary from image to image as the items move by or through the access point or plane.

At box 455, whether the item identified at box 425 is detected within the imaging data captured at box 445 is determined. The imaging data may be processed by one or more processors of the inventory bar, or transmitted, e.g., over one or more networks, to an external computer device or system for processing, to determine whether the imaging data depicts one or more features of the identified item.

If the item identified at box 425 is detected within the imaging data captured at box 445, however, then the process advances to box 460, where a number of detections of the identified item is incremented by one. For example, the inventory bar, or one or more external computer devices or systems in communication with the inventory bar, may maintain a record of a number of times or instances in which an item is detected at the access point or plane of the enclosure.

At box 465, a supply of the identified item is predicted based on the number of detections. For example, where an item has a typical serving size (e.g., a number, a mass or a volume of the item), the number of detections of the item may be used to estimate a remaining supply of the item, assuming that the typical serving size is removed from the item upon each of the detections. Alternatively, where an item was previously located within the enclosure, and was determined to have been completely consumed or was replaced after a previously determined number of detections, a fraction of the item remaining (e.g., a number, a mass or a volume of the item compared to a whole) may be calculated based on a ratio of the number of detections as incremented at box 460 to the previously determined number of detections. For example, where a second half-gallon carton of milk is placed in a refrigerator or another enclosure, and where a first half-gallon carton of milk was previously placed in the refrigerator or the other enclosure and replaced after being detected (e.g., passing through the access point or plane) ten times, the second half-gallon carton of milk may be presumed to be half-consumed where the second half-gallon carton of milk has been detected at the access point or plane five times, and may be presumed to be eighty percent consumed where the second half-gallon carton of milk has been detected at the access point or plane eight times.

At box 470, whether the predicted supply of the identified item is below a threshold is determined. In some implementations, a threshold number, mass or volume of the identified item below which the identified item may require reordering or replacement may be identified and compared to the supply of the identified item predicted at box 465 to determine whether the identified item must be reordered or replaced. If the predicted supply of the identified item is below the threshold, then the process advances to box 475, where one or more of the identified item is automatically reordered based on the predicted supply. For example, in some implementations, where the predicted supply of the identified item is below the threshold, a number, a mass or a volume of the identified item may be selected and ordered electronically, e.g., via an electronic marketplace or a materials handling facility. Alternatively, in some implementations, one or more electronic messages or signals may be provided to a customer, a user or an actor associated with the enclosure, to prompt the customer, the user or the actor to order one or more of the identified item. In some implementations, upon determining that the predicted supply of the identified item is below the threshold, one or more of the identified item may be added to a virtual shopping cart or other record or set, and the customer, the user or the actor may be prompted to purchase the one or more of the identified item from the virtual shopping car.

After the identified item is determined to be not depicted within the imaging data at box 455, after the predicted supply of the identified item is determined to be not below the threshold at box 470, or after one or more of the identified item has been automatically reordered at box 475, the process advances to box 480, where whether the continued tracking of inventory within the enclosure using the inventory bar is desired may be determined. If the continued tracking of inventory is desired, then the process returns to box 435, where the sensor monitors the access point or plane for activity (e.g., light, motion or sounds). If the continued tracking of inventory is no longer desired, however, then the process ends.

The process represented in the flow chart 400 of FIGS. 4A and 4B, or like variants, may be executed in series or in parallel with respect to any number of items that may be present within an enclosure. For example, the imaging data that is captured at box 445 and processed at box 450 to search for a previously identified item may also be processed to search for and identify one or more items, e.g., as is described above with respect to box 425.

Referring to FIGS. 5A through 5F, views of aspects of one inventory monitoring device in accordance with implementations of the present disclosure are shown. Except where otherwise noted, reference numerals preceded by the number "5" shown in FIGS. 5A through 5F indicate components or features that are similar to components or features having reference numerals preceded by the number "2" shown in FIG. 2 or by the number "1" shown in FIGS. 1A through 1K.

Figure 5A:
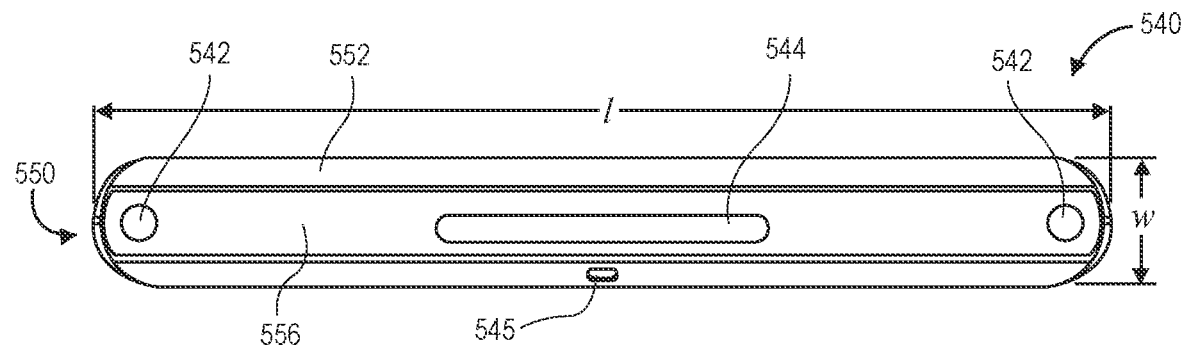
Figure 5B:
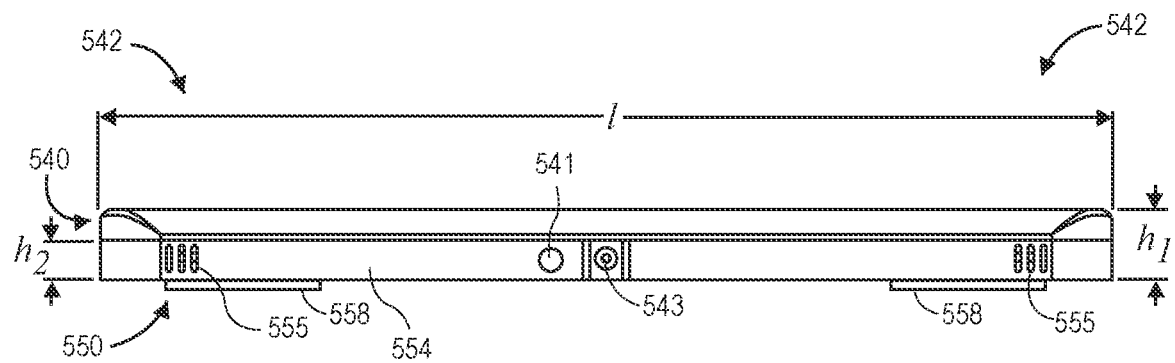
Figure 5C:
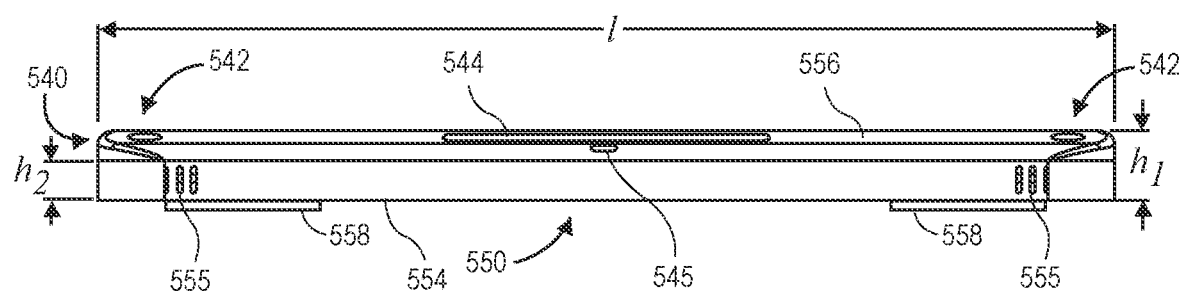

FIG. 5A is a top view of an inventory monitoring device (e.g., an inventory bar) 540. FIG. 5B is a front view of the inventory monitoring device 540. FIG. 5C is a rear view of the inventory monitoring device 540. FIG. 5D is a bottom view of the inventory monitoring device 540. FIGS. 5E and 5F are left side and right side views, respectively, of the inventory monitoring device 540.

As is shown in FIGS. 5A through 5F, the inventory monitoring device 540 includes a includes a pair of cameras 542, an illuminator 544 and a light sensor 545 provided in a housing 550 formed from an upper section 552 and a lower section 554. Each of the cameras 542 may be configured to capture color images, grayscale images, black-and-white images, or any other type or form of imaging data (e.g., depth images). The cameras 542 may include one or more sensors that are configured to capture visual imaging data, depth imaging data, or any other imaging data at relatively high levels of resolution, e.g., eight to nine megapixels per image, and at relatively high frame rates, e.g., fifteen or more frames per second (fps), or at any levels of resolution or frame rates. The illuminator 544 may be any number of lights or light sources (e.g., LED lights) that are configured to project light in one or more directions within an enclosure in which the inventory monitoring device 540 is mounted. The light sensor 545 may be any type or form of system that converts light detected at any frequency, wavelength or intensity into one or more electrical signals. Alternatively, or in addition to the illuminator 544, the inventory monitoring device 540 may include one or more other feedback devices.

The housing 550 has a length/and a width w, which may have any values. In some implementations, the length/is substantially greater than the width w, such that the housing 550 is substantially slender, and has a shape of a rounded rectangle with respect to top and bottom views. For example, in some implementations, the length/may be approximately thirty centimeters (30 cm), or twelve inches (12 in.), and the width w may be approximately four centimeters (4 cm), or 1.6 inches (1.6 in.). Alternatively, the length/and the width w may have any values defined by operational or geographic constraints of the inventory monitoring device 540 or an enclosure into which the inventory monitoring device 540 is to be installed. Likewise, the upper section 552 of the housing 550 has a substantially tapered shape, or a substantially trapezoidal shape, with respect to side views. The housing 550 has a first leg (or side) having the length/and the width w, a first base (or side) normal to the first leg having the length/and a height $h_1$ at a rear of the housing 550. Additionally, the housing 550 further includes a second base (or side) normal to the first leg and parallel to the first base having the length/and a height $h_2$ at a front of the housing 550, and a second leg (or side) joined to the first base and the second base having the length/and is tapered downward from the rear of the housing 550 to the front of the housing 550. Alternatively, or additionally, the housing 550 may have any shape, area or cross-section with respect to longitudinal, lateral or vertical axes, and lengths, widths or heights of any dimension.

The lower section 554 of the housing 550 includes pairs of air ducts 555 on the front and rear sides of the housing 550. In some embodiments, such as where the inventory monitoring device 540 is mounted in a substantially vertical alignment, such as the inventory monitoring devices 140 is shown in FIG. 1B, air that is warmed by resistive heating (or Joule heating) within the housing 550 may exit the housing 550 via air ducts 555 that are provided at or near an upper end of the housing 550, and air that is cooled or at ambient temperatures within an enclosure in which the inventory monitoring device 540 is mounted (e.g., a refrigerator) may be drawn into the housing 550 via air ducts 555 that are provided at or near a lower end of the housing 550, in a natural circulation process that transfers heat from within the inventory monitoring device 540 to ambient. Alternatively, or additionally, in some implementations, the inventory monitoring device 540 may include fans, blowers or other heat sinks within the housing 550 that draw cooled air into the housing 550 and expel warmed air from the housing 550. In some implementations, the inventory monitoring device 540 need not include the air ducts 555, and may instead be sealed (e.g., hermetically sealed), and configured to transfer heat from within the inventory monitoring device 540 to ambient through one or more surfaces of the housing 550.

The lower section 554 is configured for mounting the inventory monitoring system 540 to one or more surfaces, e.g., walls or ceilings, within an enclosure. For example, the lower section 554 includes a plurality of adhesive tape strips 558 that may bind the housing 550 to a wall or ceiling of a refrigerator, a cabinet, a closet, a set of shelves, or any other enclosure. Alternatively, or additionally, the inventory monitoring system 540 may be mounted within an enclosure by any number of hooks, holes, ports, adhesives, magnets or other components provided in any location or on any surface of the housing 550.

Additionally, a front side of the housing 550 includes a switch 541 (or button, or like feature) and a power port 543 extending through the lower section 554 of the housing 550 into an interior of the housing 550 (not shown). In some implementations, the switch 541 may be a power switch that energizes or deenergizes the inventory monitoring device 540 when contacted. In some other implementations, the switch 541 may be a toggle switch that may be contacted to temporarily deactivate or activate the inventory monitoring device 540 for any reason, e.g., when the operation of the inventory monitoring device 540 is no longer desired for privacy considerations.

One or more of the upper section 552 or the lower section 554 may act as a chassis to provide structural support for the switch 541, the cameras 542, the port 543, the illuminators 544, the light sensor 545, or any processors, circuit boards, transceivers, power supplies, or other systems associated with the operation of the inventory monitoring system 540. Likewise, one or more of the upper section 552 or the lower section 554 may act as a cover, a case, a shroud or another system that is configured to mate with such a chassis, and to enclose such systems within a chamber defined by the upper section 552 and the lower section 554. In some implementations, the housing 550 may include one or more ventilation ducts (or air ducts) that enable air flow through the housing 550, to transfer heat generated by the operation of the cameras 542, the illuminators 544, the light sensors 545, or any other components outside of the housing 550 to ambient, e.g., by convective or conductive cooling. In some other implementations, the housing 550 may be sealed (e.g., hermetically sealed) with such systems therein, and heat generated by the operation of such systems may be transferred to ambient through surfaces of the housing 550.

Lenses or other systems of the cameras 542 may be aligned with fields of view that extend through the upper section 552 of the housing 550 in any alignment or orientation, such as with axes of orientation that extend normal to and away from upper surfaces or panels of the upper section 552. Additionally, the housing 550 further includes a covering 556 over the cameras 542 and the illuminators 544, and any other aspect of the upper section 552, and is entirely or partially transparent or translucent.

The upper section 552 or the lower section 554 may be formed in any manner, such as by injection molding, and from any suitable materials. For example, in some implementations, the upper section 552 or the lower section 554 may be formed from polycarbonates or combinations of polycarbonates and other materials, such as ABS. Alternatively, in some other implementations, the upper section 552 or the lower section 554 may be formed from any materials other than plastics or composites, including but not limited to woods or metals. The materials from which the upper section 552, the lower section 554, or any other aspect of the housing 550 are formed may be selected on any basis, e.g., a level of thermal conductivity, to enable the housing 550 to readily transfer heat to ambient during operations. Furthermore, in some implementations, the upper section 552 or the lower section 554 may be combined in a single-piece construction, or may be coupled or joined by one or more hinges.

Figure 6:
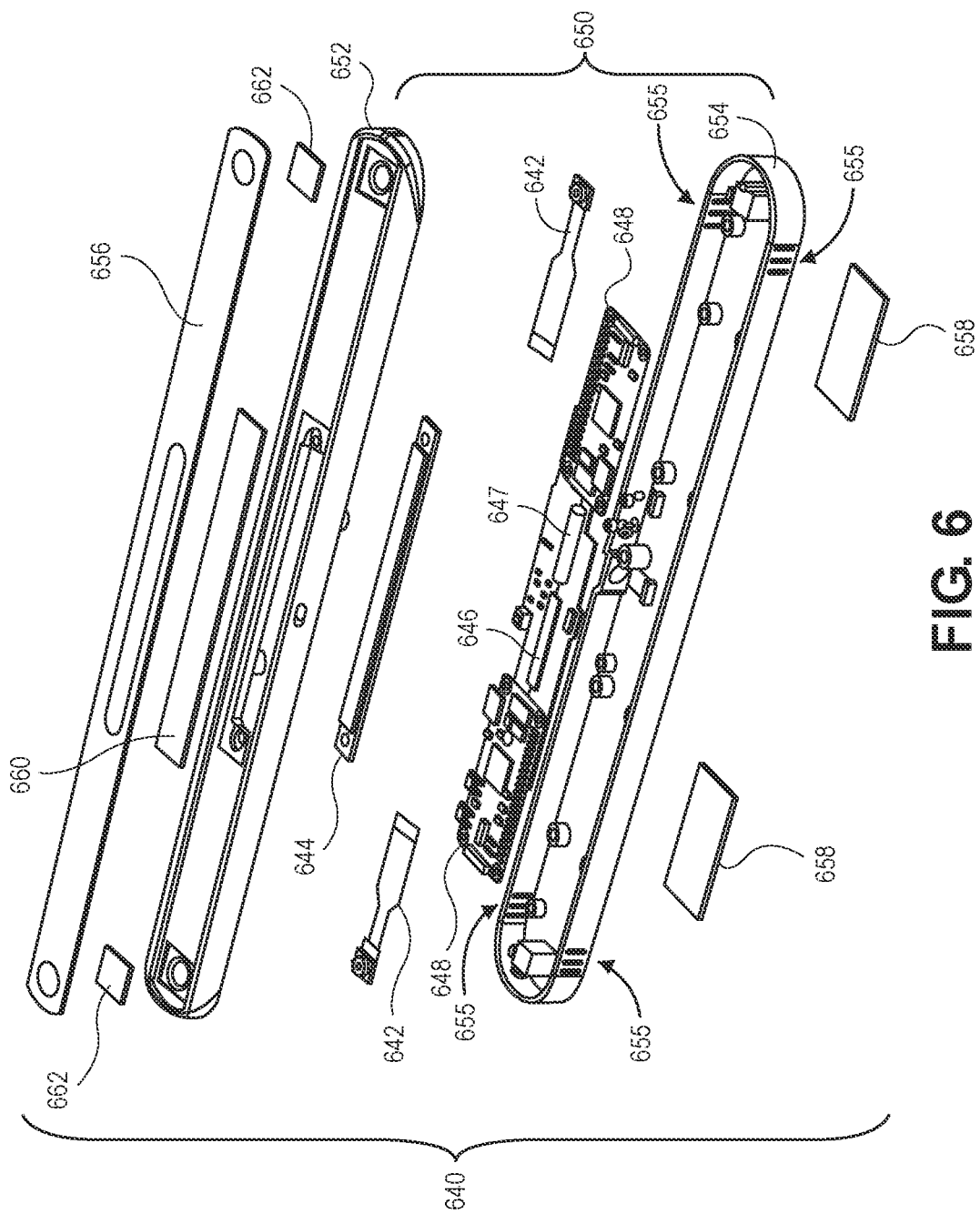
FIG. 6 is a view of aspects of one inventory monitoring device in accordance with implementations of the present disclosure.

Referring to FIG. 6, a view of aspects of one inventory monitoring device in accordance with implementations of the present disclosure is shown. Except where otherwise noted, reference numerals preceded by the number "6" shown in FIG. 6 indicate components or features that are similar to components or features having reference numerals preceded by the number "5" shown in FIGS. 5A through 5F, by the number "2" shown in FIG. 2 or by the number "1" shown in FIGS. 1A through 1K.

FIG. 6 is an exploded view of one inventory monitoring device 640 (e.g., an inventory bar) of the present disclosure. As is shown in FIG. 6, the inventory monitoring device 640 includes a pair of cameras 642, an illuminator 644, a transceiver 646, a battery 647 (or other power supply) and a plurality of processors 648 disposed within a housing 650 formed from an upper section 652 and a lower section 654.

The cameras 642, the illuminator 644, the transceiver 646, the battery 647 and the processors 648 may be coupled to one another by way of one or more printed circuit boards, substrates or like components that may be accommodated within an interior volume defined by the housing 650.

The cameras 642 may include any number of lenses, memory or storage components, photosensitive surfaces, filters, chips, electrodes, clocks, boards, timers, power sources, connectors or any other relevant features for capturing light reflected or scattered from one or more objects and assigning quantitative values (e.g., red, green, blue or other color values, or distances or ranges) to aspects of the reflected or scattered light. The cameras 642 may be configured to capture any imaging data, such as visual imaging data or depth imaging data at any levels of resolution or frame rates. Although the inventory monitoring device 640 of FIG. 6 includes two cameras 642, an inventory monitoring device 640 of the present disclosure may include any number of cameras 642 that are provided at any location or orientation within the inventory monitoring device 640. The illuminator 644 may be any number of lights, diodes (e.g., LED), liquid crystals (e.g., LCD), bulbs, lamps or other lights for emitting light at any frequency, wavelength or intensity. The cameras 642 may be mounted within the housing 650 such that fields of view of each of the cameras 642 extend through one or more holes or other openings within the housing 650 and outside of the housing 642. Likewise, the illuminator 644 may be mounted within the housing 650 in a manner that enables light to be emitted by the illuminator 644 through one or more holes or other openings within the housing 650, and outside of the housing 650, to illuminate one or more subjects within the fields of view of the cameras 642.

The transceiver 646 may be configured to enable the inventory monitoring device 640 to communicate through one or more wired or wireless means, e.g., wired technologies such as USB or fiber optic cable, or standard wireless protocols such as Bluetooth® or any Wi-Fi protocol, over a network or directly. The transceiver 646 may be configured to allow information or data to be exchanged between one or more of the components of the inventory monitoring device 640, or to one or more other computer devices or systems (e.g., computer devices or systems associated with a materials handling facility, one or more actors associated with an enclosure into which the inventory monitoring device 640 is installed, or any other personnel) via one or more networks or directly. The transceiver 646 may perform any necessary protocol, timing or other data transformations in order to convert data signals from a first format suitable for use by one component into a second format suitable for use by another component. In some implementations, functions of the transceiver 646 may be split into two or more separate components, or integrated with the processor 648.

The battery 647 may be any type, size or form of battery or other power cell, e.g., dry cell or wet cell batteries such as lead-acid batteries, lithium-ion batteries, nickel cadmium batteries or nickel metal hydride batteries, or any other type, size or form of battery. Additionally, the battery 647 may have any cell voltages, peak load currents, charge times, specific energies, internal resistances or cycle lives, or other power ratings. Alternatively, the inventory monitoring device 640 may include any other power source, other than a battery, including but not limited to one or more fuel cells, solar cells, or others, or may receive power directly from one or more external power sources via one or more connectors or conductors.

The processors 648 may be configured to perform any type or form of computing function associated with the operation of the inventory monitoring device 640, including but not limited to the execution of one or more machine learning tools, algorithms or techniques. The processor 648 may also be configured to execute any other algorithms or techniques (e.g., object detection or recognition algorithms or techniques) associated with one or more applications, purposes or functions, or to control any aspects of the operation of the inventory monitoring device 640 and or any computer-based components thereon, including but not limited to the cameras 642 or the illuminator 644.

The processor 648 may be a uniprocessor system including one processor, or a multiprocessor system including several processors (e.g., two, four, eight, or another suitable number), and may be capable of executing instructions. For example, in some embodiments, the processor 648 may be a general-purpose or embedded processor unit such as a CPU or a GPU having any number of instruction set architectures (ISAs), such as the x86, PowerPC, SPARC, or MIPS ISAs, or any other suitable ISA. Where the processor 648 is a multiprocessor system, each of the processors within the multiprocessor system may operate the same ISA, or different ISAs.

The housing 650 may be formed by coupling the cameras 642, the illuminator 644, the transceiver 646 and the processors 648 to one or more of the upper section 652 or the lower section 654, e.g., to a substrate such as a printed circuit board assembly, and joining the upper section 652 to the lower section 654 with such components therein, e.g., by one or more screws or other fasteners. The upper section 652 and the lower section 654 may be formed from any suitable materials, e.g., polycarbonates or combinations of polycarbonates and other materials, such as ABS. Moreover, as is shown in FIG. 6, the lower housing 654 includes two pairs of ventilation ducts (or air ducts) 655 that enable air flow through the housing 650, and the transfer of heat outside of the housing 650, e.g., by convective or conductive cooling.

The housing further includes a covering 656 formed from an entirely or partially transparent or translucent window or shield, e.g., plastics such as polycarbonates, polyethylene terephthalates, polyethylenes, or others. Portions of the covering 656 that are not provided over the cameras 642 or the illuminator may, in some implementations, be coated with one or more paints or other substances, e.g., moisture-resistant coatings, or one or more layers of hydrophobic or hydrophilic materials. Moreover, an underside of the lower housing 654 includes a pair of adhesive tapes 658 or other materials for adhering the inventory monitoring device 640 to one or more surfaces within an enclosure, including but not limited to hooks, adhesive tapes, glues, magnets, or other systems or substances.

The inventory monitoring device 640 further includes a polarizer 660 provided over the illuminator 644, and polarizers 662 provided over the cameras 642, in spaces between the upper section 652 and the covering 656. The polarizers 660, 662 act to block light waves from passing from the illuminator 644 and out of the housing 650, or from outside of the housing 650 and into the lenses of the cameras 642.

Figure 7:
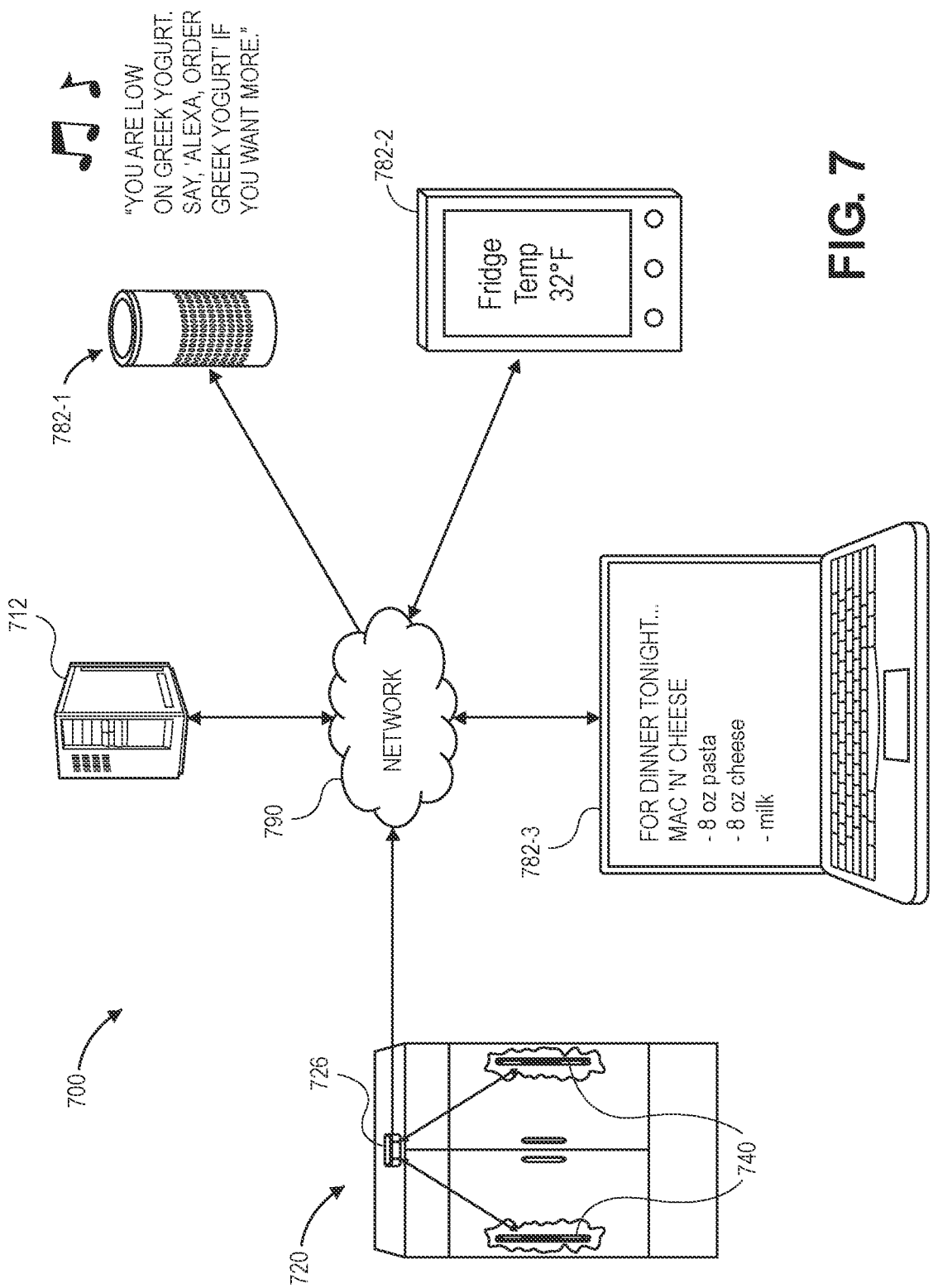
FIG. 7 is a view of aspects of one system including an inventory monitoring device in accordance with implementations of the present disclosure.

As is discussed above, inventory monitoring devices of the present disclosure may transmit any type or form of information or data regarding conditions within an enclosure to one or more external computer devices or systems. Referring to FIG. 7, views of aspects of one system including an inventory monitoring device in accordance with implementations of the present disclosure are shown. Except where otherwise noted, reference numerals preceded by the number "7" shown in FIG. 7 indicate components or features that are similar to components or features having reference numerals preceded by the number "6" shown in FIG. 6, by the number "5" shown in FIGS. 5A through 5F, by the number "2" shown in FIG. 2 or by the number "1" shown in FIGS. 1A through 1K.

As is shown in FIG. 7, a system 700 includes a server 712, an enclosure 720, and a plurality of computer devices 782-1, 782-2, 782-3 that are connected to one another over a network 790. The server 712 may be associated with a materials handling facility, an electronic marketplace, or any other entity, and may be configured to receive, transmit or store any type or form of information or data regarding items that are made available to customers, users or actors, as well as items that are known or believed to be owned, possessed or used by any number of customers, users or actors. The server 712 may further receive, transmit or store any type or form of information or data regarding browsing histories, purchasing histories, recommendations, locations, or any other information or data regarding one or more customers, users or actors.

The enclosure 720 may be a refrigerator, a cabinet, a closet, a set of shelves, or any other space that is configured to receive or store items on behalf of one or more customers, users or actors. As is shown in FIG. 7, the enclosure 720 includes a router 726 or other communication device provided atop the enclosure, and a pair of inventory monitoring devices 740 provided within the enclosure 720. The router 726 enables communication between the inventory monitoring devices 740 and one or more external computer devices or systems by way of the network 790, by the receipt, exchange or transfer of imaging data or any other type or form of information or data (e.g., metadata) between the inventory monitoring devices 740 and the external computer devices or systems.

As is also shown in FIG. 7, the computer device 782-1 is a smart speaker configured to receive information or data from the inventory monitoring devices 740 within the enclosure 720, from the server 712, or from one or more other external computer devices or systems (not shown), and to generate and emit one or more acoustic signals based on such information or data. For example, as is shown in FIG. 7, the computer device 782-1 generates and emits acoustic signals regarding inventory levels or other conditions within the enclosure 720, e.g., announcing that a supply of one item within the enclosure 720 is low, and inviting a customer, a user or another actor to provide one or more audible instructions to reorder the item.

As is further shown in FIG. 7, the computer device 782-2 is a mobile device configured to receive information or data from the inventory monitoring devices 740, from the server 712, or from one or more other external computer devices or systems (not shown), and to generate and show images, text or other information in one or more user interfaces on a display, e.g., by a browser, a dedicated application, or any other application, based on such information or data. For example, as is shown in FIG. 7, the computer device 782-2 displays information regarding conditions within the enclosure, e.g., a temperature, on the display. Alternatively, the computer device 782-2 may display any other information or data regarding inventory levels or other conditions within the enclosure, or receive one or more interactions regarding the operation of the inventory monitoring devices 740 within the enclosure 720, e.g., one or more instructions to increase or decrease a temperature or otherwise change another condition within the enclosure 720.

As is also shown in FIG. 7, the computer device 782-3 is a laptop computer (or other computer) configured to receive information or data from the inventory monitoring devices 740, from the server 712, or from one or more other external computer devices or systems (not shown), and to generate and show images, text or other information in one or more user interfaces on a display. For example, as is shown in FIG. 7, the computer device 782-3 displays information regarding a recipe that may be prepared based on inventory levels of items within the enclosure 720, as determined based on information or data received from the inventory monitoring devices 740. Alternatively, the computer device 782-3 may display any number of recipes or other instructions for preparing items maintained within the enclosure 720, or information or data regarding inventory levels or other conditions within the enclosure, or receive one or more interactions regarding such recipes or instructions, e.g., requests to order one or more additional items that may be required, or any other interactions.

In accordance with implementations of the present disclosure, the server 712 and/or the computer devices 782-1, 782-2, 782-3 may receive and display or emit any information or data regarding any number of items that may be located within the enclosure 720, or one or more other enclosures (not shown). For example, where the enclosure 720 is a refrigerator, one or more additional inventory monitoring devices may also be mounted or otherwise installed in a closet, a cabinet, or in a set of shelves, and configured to capture imaging data or other information or data regarding levels of inventory or other conditions within such enclosures. The server 712 or the computer devices 782-1, 782-2, 782-3, or any other computer devices or systems, may emit information regarding levels of inventory within any of such enclosures, display information regarding conditions within any of such enclosures, or display recipes or other sets of instructions for preparing items maintained within any of such enclosures.

Figure 8A:
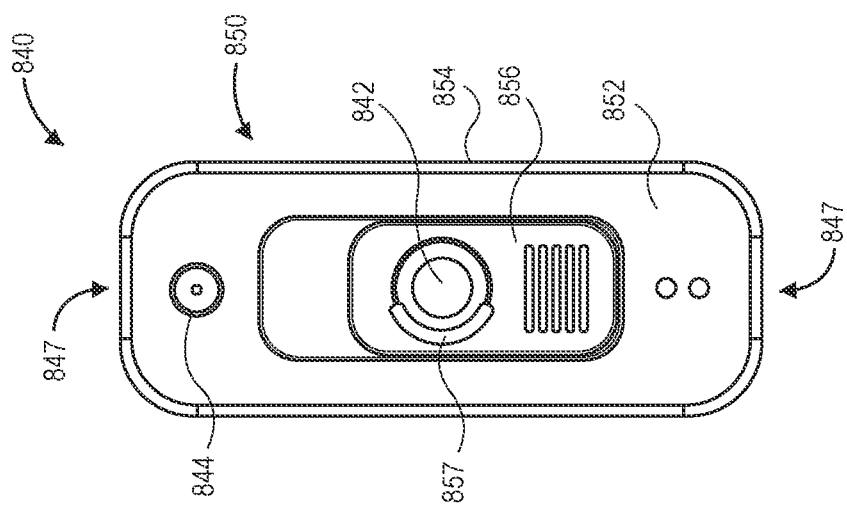
FIGS. 8A through 8C are views of aspects of one inventory monitoring device in accordance with implementations of the present disclosure.
Figure 8A:
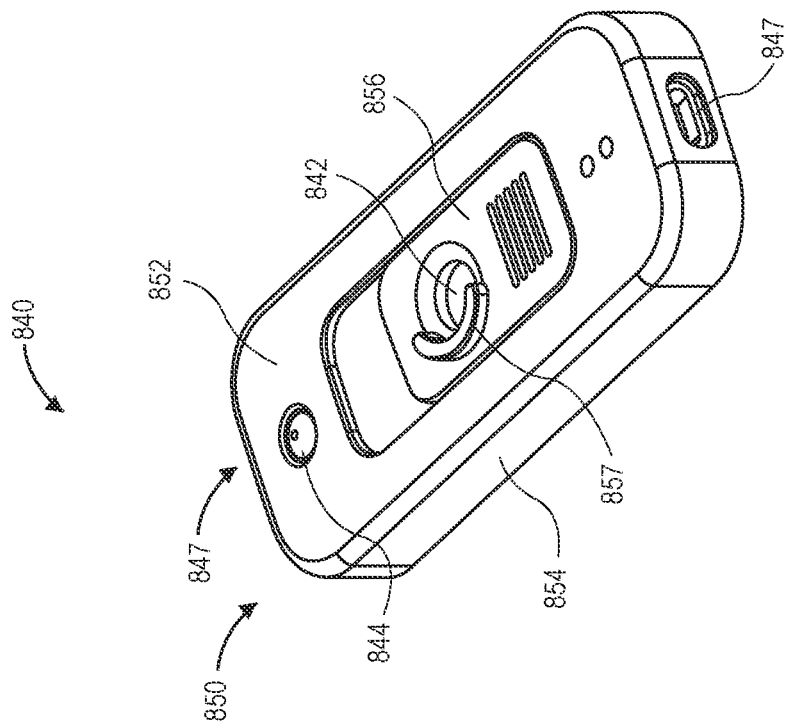
Figure 8B:
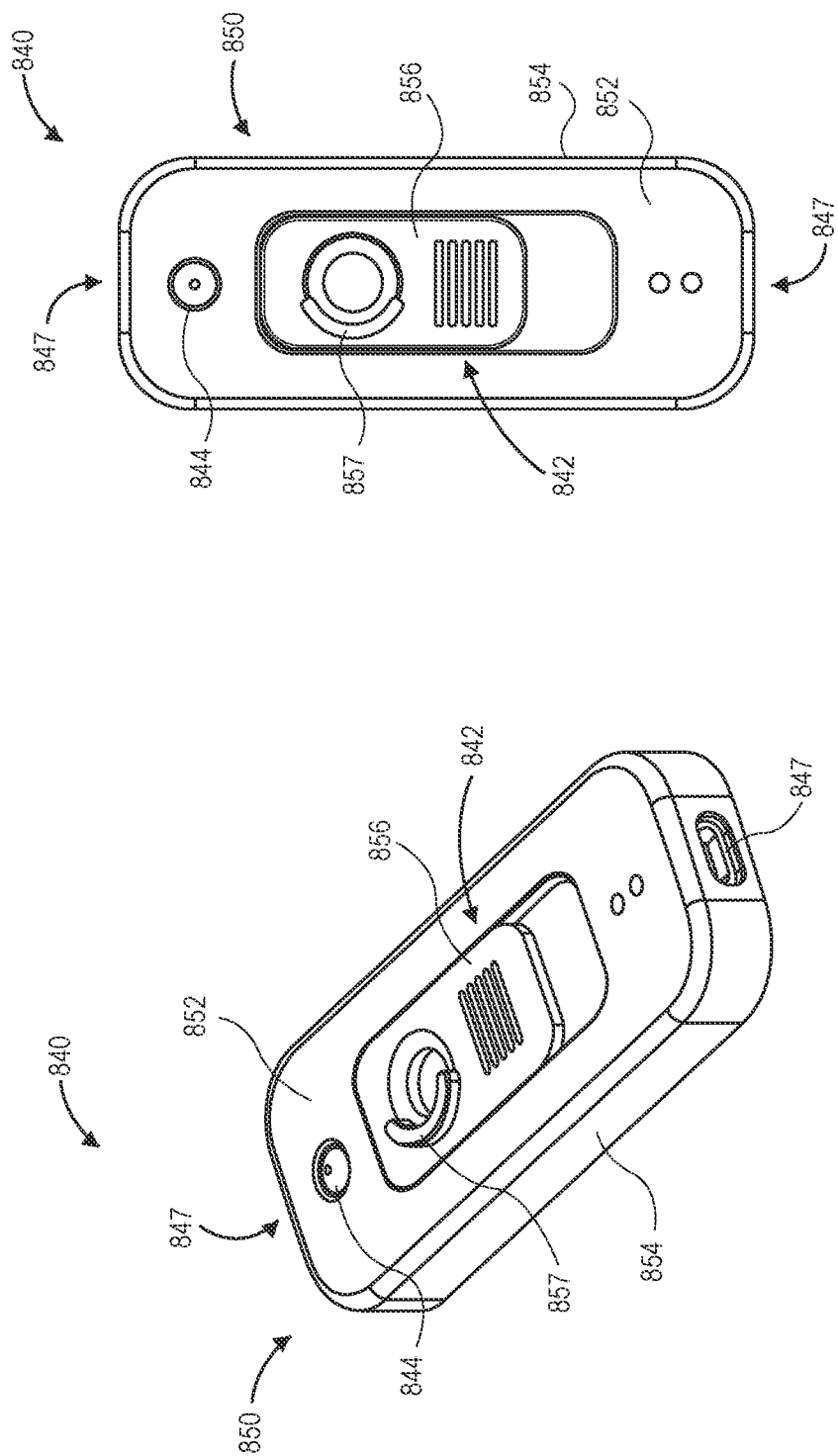
Figure 8C:
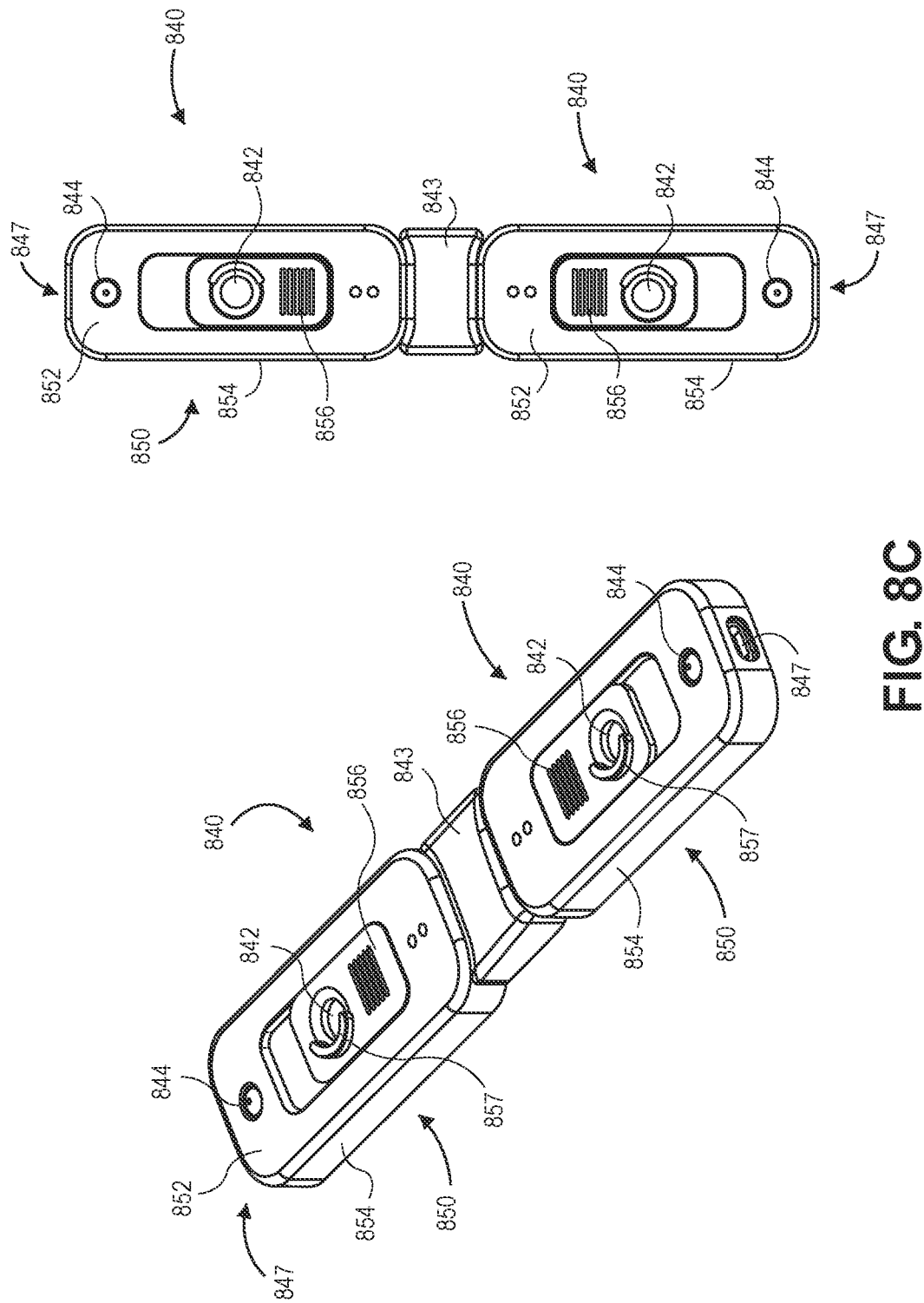

As is discussed above, inventory monitoring devices of the present disclosure may have any shape or size, and may include one or more features for enhancing a level of privacy for customers, users or other actors associated with an enclosure into which such inventory monitoring devices are installed. Moreover, the inventory monitoring devices of the present disclosure may be modular in nature, and two or more of such devices may be physically or functionally coupled to one another and operated together as a common system. Referring to FIGS. 8A through 8C, views of aspects of one inventory monitoring device in accordance with implementations of the present disclosure are shown. Except where otherwise noted, reference numerals preceded by the number "8" shown in FIGS. 8A through 8C indicate components or features that are similar to components or features having reference numerals preceded by the number "7" shown in FIG. 7, by the number "6" shown in FIG. 6, by the number "5" shown in FIGS. 5A through 5F, by the number "2" shown in FIG. 2 or by the number "1" shown in FIGS. 1A through 1K.

As is shown in FIGS. 8A and 8B, an inventory monitoring device 840 includes a camera 842 and an illuminator 844 provided within a housing 850, as well as ports 847 extending through the housing 850 at both ends of the inventory monitoring device 840. Additionally, the housing 850 is formed from an upper section 852 and a lower section 854, and a cover 856 slidably provided within a channel formed in the upper section 852. For example, the channel permits the cover 856 to travel between a position shown in FIG. 8A, e.g., at one end of the channel, and a position shown in FIG. 8B, e.g., at another end of the channel.

The camera 842 may be configured to capture color images, grayscale images, black-and-white images, or any other type or form of imaging data (e.g., depth images). The illuminator 844 is configured to emit light from the housing 850, such that the light is reflected or scattered from any number of objects within a field of view of the camera 842. The ports 847 may be configured to receive or transfer power or data according to any standard configuration or format, e.g., one or more cables of the USB standard, a PoE standard, or any other configuration or format. Alternatively, in some implementations, the inventory monitoring device 840 may include any number of sensors or other components (not shown).

The cover 856 provides enhanced privacy control to customers, users or other actors associated with an enclosure into which the inventory monitoring device 840 is installed. As is further shown in FIGS. 8A and 8B, the cover 856 includes an opening having a shape of a circle, and a raised edge 857 about at least a portion of the opening.

When a customer, a user, or another actor intends to use the inventory monitoring device 840 to capture imaging data or other information or data regarding inventory levels or conditions within an enclosure, the inventory monitoring device 840 may be installed within the enclosure such that the raised edge 857 is aligned nearest an access point or plane of the enclosure. With the cover 856 in the position shown in FIG. 8A, the opening in the cover 856 is positioned over the camera 842, and the field of view of the camera 842 extends through the opening, normal to the upper section 852 of the housing 850. Additionally, the raised edge 857 obscures at least a portion of the field of view of the camera 842. Thus, when the inventory monitoring device 840 is installed within the enclosure and the raised edge 857 is aligned nearest the access point or plane of the enclosure, the raised edge 857 acts as a physical barrier within the field of view of the camera 842 that reduces an extent to which a customer, a user or another actor appears within imaging data captured by the camera 842.

When the customer, the user or the other actor does not want the inventory monitoring device 840 to capture imaging data or other information or data, e.g., on a temporary basis, the cover 856 may be placed in the position shown in FIG. 8B, such that the cover 856 obscures the camera 842, and blocks the field of view of the camera 842.

As is shown in FIG. 8C, two or more of the inventory monitoring devices 840 may be joined to one another, e.g., by a module 843, that is physically and electrically coupled to each of the inventory monitoring devices 840 by their respective ports 847. The module 843 includes one or more conductors or other connectors that enable the inventory monitoring devices 840 to exchange power and/or data therebetween within a housing. The module 843 may be formed from the same materials as the housing 850 or other aspects of the inventory monitoring devices 840, or from one or more different materials.

Although FIG. 8C shows two inventory monitoring devices 840 coupled to one another by way of the module 843, any number of the inventory monitoring devices 840 may be joined to one another by way of modules 843 or otherwise. Moreover, where two or more of the inventory monitoring devices 840 are joined to one another, components of one or more of the inventory monitoring devices 840 (e.g., processors, transceivers, memory components or others) may be used or configured to execute operations by or on behalf of one or more other inventory monitoring devices 840. For example, information or data captured by one or more sensors of one of the inventory monitoring devices 840 may be transferred to another of the inventory monitoring devices 840, e.g., by way of the module 843, and processed by the other of the inventory monitoring devices 840, or transmitted to an external computer device or system (not shown) for processing.

In some implementations, the ports 847 of the inventory monitoring devices 840 may be configured to be physically or electrically coupled to one another directly, and a module, e.g., the module 843, need not be required. For example, in some implementations, the two ports 847 of the inventory monitoring devices 840 may be configured to mate with one another, e.g., one male port 847 and one female port 847, thereby enabling a male port 847 of one of the inventory monitoring devices 840 to be directly engaged or inserted into a female port 847 of another of the inventory monitoring devices 847.

Figure 9:
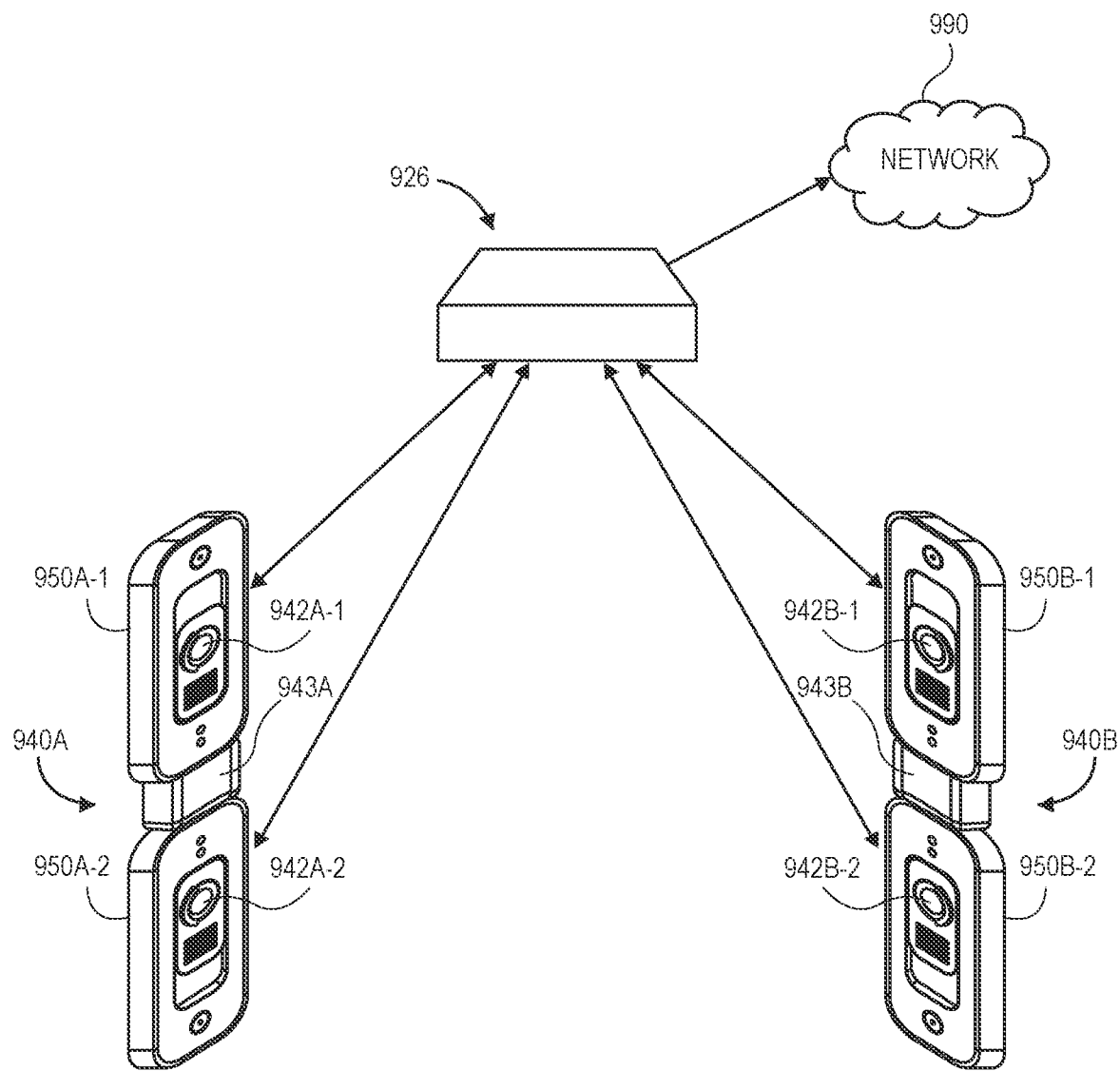
FIG. 9 is a view of aspects of one system including an inventory monitoring device in accordance with implementations of the present disclosure.

Some inventory monitoring systems of the present disclosure may include features that are provided in a single housing, such as is shown in FIG. 1A or 5A through 5F, or in multiple housings. Referring to FIG. 9, views of aspects of one system including an inventory monitoring device in accordance with implementations of the present disclosure are shown. Except where otherwise noted, reference numerals preceded by the number "9" shown in FIG. 9 indicate components or features that are similar to components or features having reference numerals preceded by the number "8" shown in FIGS. 8A through 8C, by the number "7" shown in FIG. 7, by the number "6" shown in FIG. 6, by the number "5" shown in FIGS. 5A through 5F, by the number "2" shown in FIG. 2 or by the number "1" shown in FIGS. 1A through 1K.

As is shown in FIG. 9, an inventory monitoring system 940A and an inventory monitoring system 940B are configured for communication with one or more computer devices or systems over a network 990, e.g., via a router 926 or another communications device. The inventory monitoring system 940A includes a camera 942A-1 provided within a housing 950A-1 and a camera 942A-2 provided within a housing 950A-2. Each of the housings 950A-1, 950A-2 is connected by a module 943A, which includes one or more conductors or other connectors that extend between the housings 950A-1, 950A-2. Similarly, the inventory monitoring system 940B includes a camera 942B-1 provided within a housing 950B-1 and a camera 942B-2 provided within a housing 950B-2. Each of the housings 950B-1, 950B-2 is connected by a module 943B, which also includes one or more conductors or other connectors that extend between the housings 950B-1, 950B-2. The modules 943A, 943B enable the transfer of power, information or data between the housings 950A-1, 950A-2, or between the housings 950B-1, 950B-2. Additionally, one or both of the housings 950A-1, 950A-2 of the inventory monitoring system 940A may be configured to communicate wirelessly with the router 926, and to exchange imaging data or other information or data with one or more external computer devices or systems over the network 990.

The housings 950A-1, 950A-2 of the inventory monitoring system 940A may be mounted within any enclosure, e.g., on one or more internal surfaces of the enclosure, and aligned to capture imaging data or other information or data within the enclosure. Likewise, the housings 950B-1, 950B-2 of the inventory monitoring system 940B may also be mounted within the enclosure, e.g., on one or more internal surfaces of the enclosure, preferably opposite the housings 950A-1, 950A-2 of the inventory monitoring system 940A, and aligned to capture imaging data or other information or data within the enclosure. The respective housings 950A-1, 950A-2 may be separated by the same distance as the housings 950B-1, 950B-2, or by any other distance.

The inventory monitoring devices of the present disclosure may also include one or more sets of polarizers for the cameras and/or illuminators provided therein. Referring to FIGS. 10A through 10F, views of aspects of one inventory monitoring device in accordance with implementations of the present disclosure are shown. Except where otherwise noted, reference numerals preceded by the number "10" shown in FIGS. 10A through 10F indicate components or features that are similar to components or features having reference numerals preceded by the number "9" shown in FIG. 9, by the number "8" shown in FIGS. 8A through 8C, by the number "7" shown in FIG. 7, by the number "6" shown in FIG. 6, by the number "5" shown in FIGS. 5A through 5F, by the number "2" shown in FIG. 2 or by the number "1" shown in FIGS. 1A through 1K.

Figure 10A:
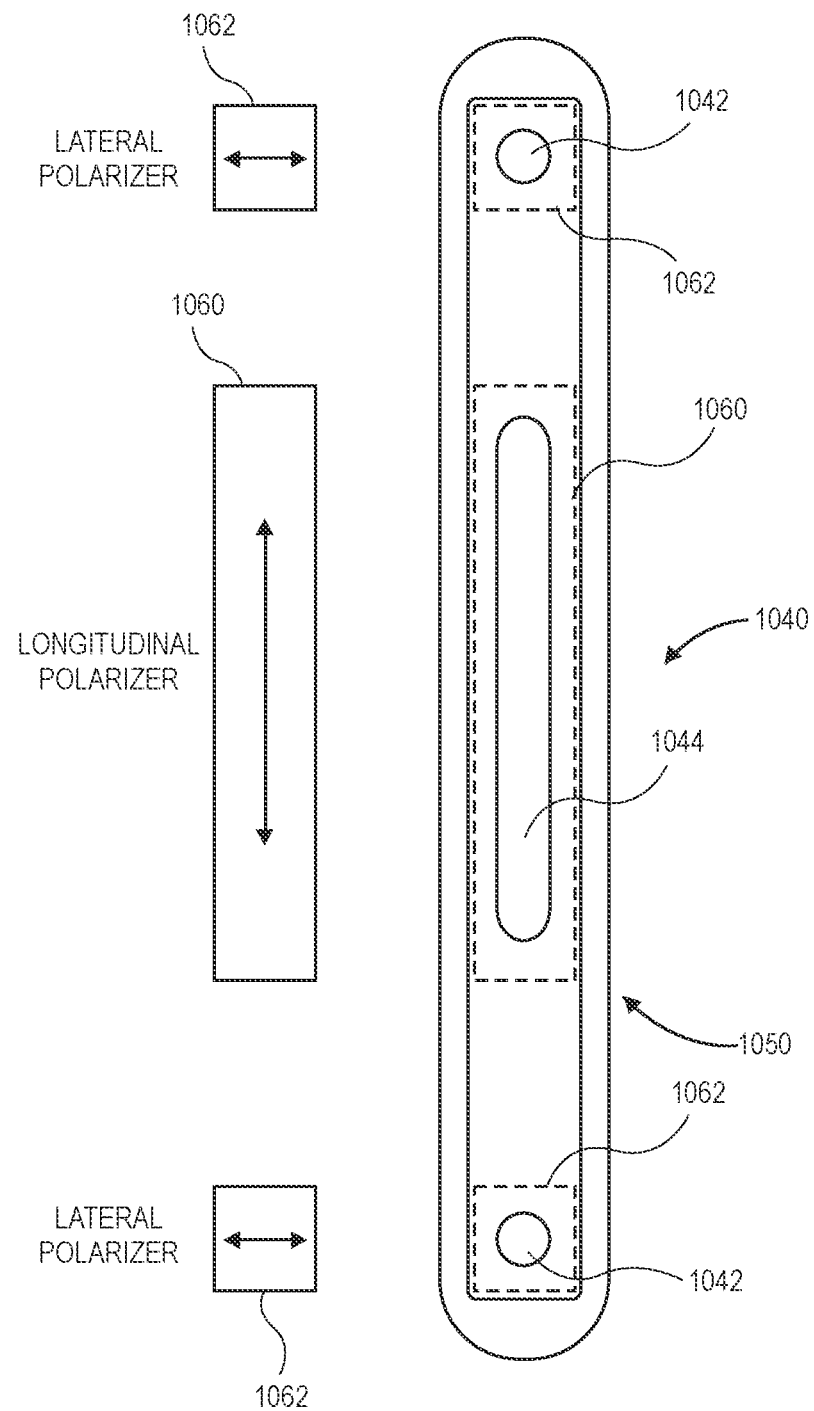
FIGS. 10A through 10F are views of aspects of one inventory monitoring device in accordance with implementations of the present disclosure.
Figure 10B:
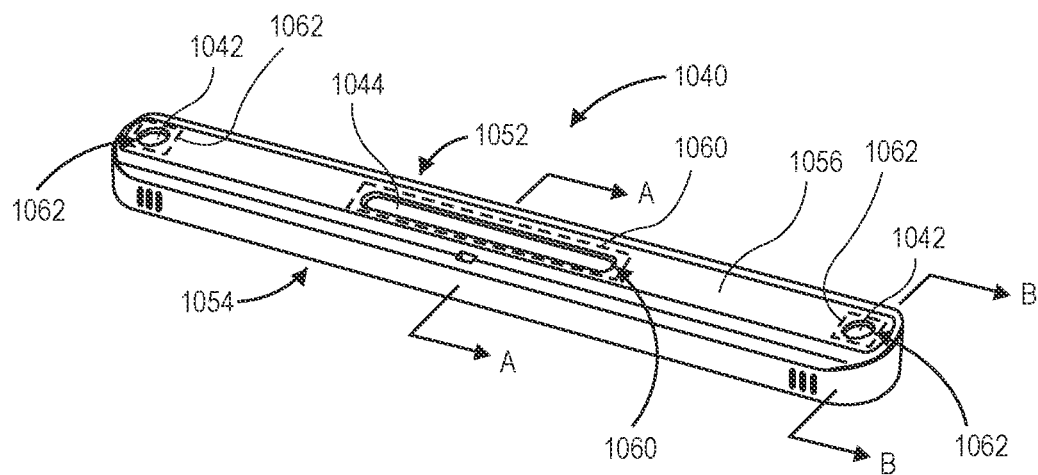

As is shown in FIGS. 10A and 10B, an inventory monitoring device 1040 (e.g., an inventory bar) includes a pair of cameras 1042 and an illuminator 1044 provided within a housing 1050 formed from an upper section 1052 and a lower section 1054. Additionally, the inventory monitoring device 1040 further includes a longitudinal polarizer 1060 provided over the illuminator 1044, and a pair of lateral polarizers 1062 provided over lenses or sensors of the cameras 1042. The longitudinal polarizer 1060 and the lateral polarizer 1062 may be mounted between an upper section 1052 of the housing 1050 and a covering 1056. The longitudinal polarizer 1060 and the lateral polarizer 1062 are aligned perpendicular to one another, such that when two or more of the inventory monitoring devices 1040 are provided opposite one another within a common enclosure, such as the inventory monitoring devices 140 provided within the refrigerator 120 as shown in FIG. 1B, glares from light emitted by the illuminator 1044 of one of the inventory monitoring devices 1040 is not captured by cameras 1042 provided in the opposing one of the inventory monitoring devices 1040.

Figure 10C:
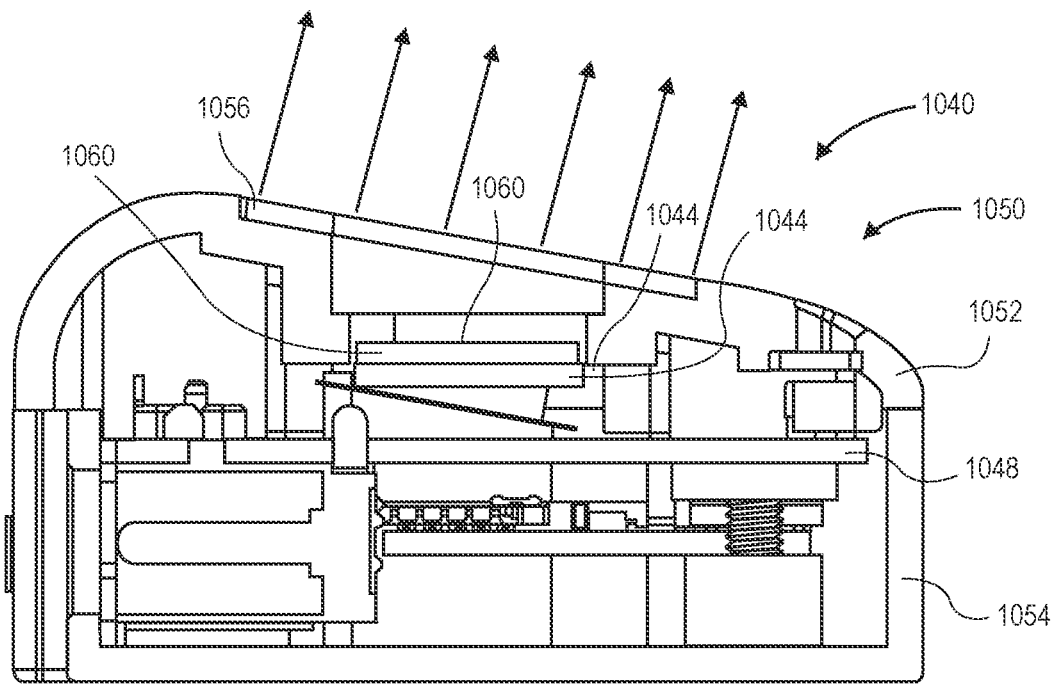
Figure 10D:
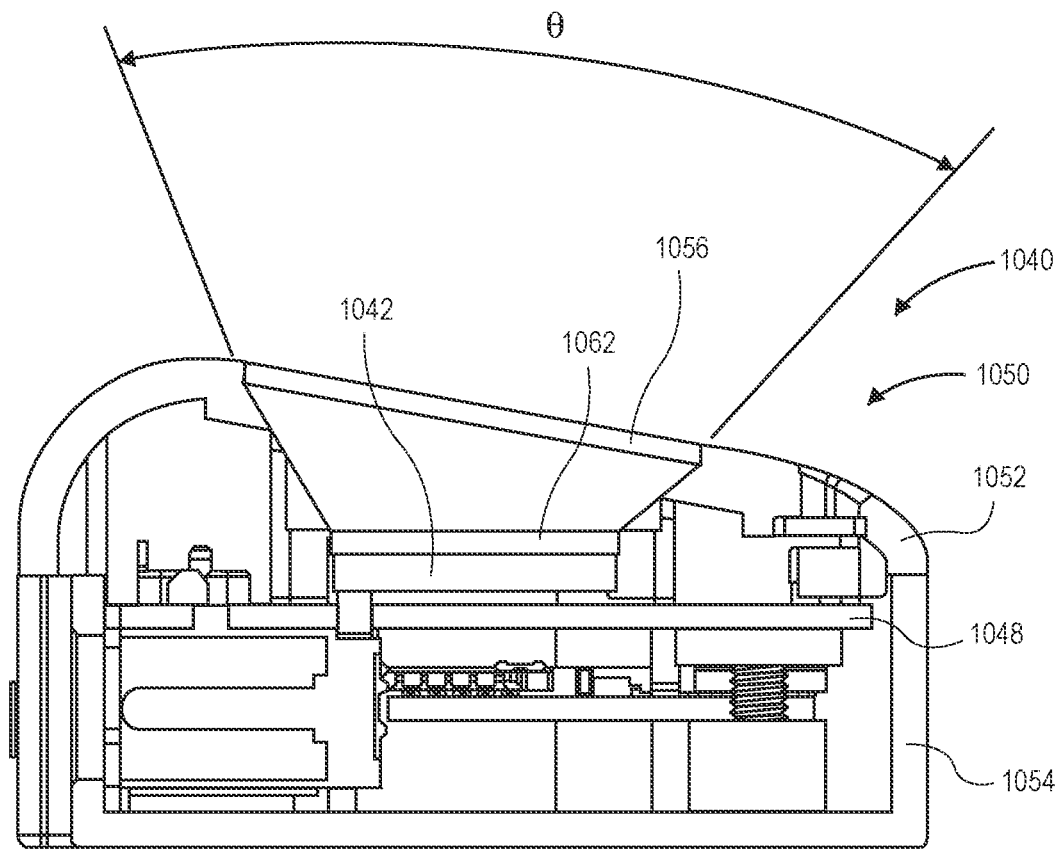

As is discussed above, the upper section 1052 of the housing 1050 may take a tapered shape, or a trapezoidal shape, such that the cameras 1042 and the illuminators 1044 are aligned in an inward direction toward an interior of an enclosure. As is shown in FIG. 10C, a cross-sectional view of the inventory monitoring device 1040 along the section lines A-A shown in FIG. 10B is shown. The illuminator 1044 is mounted in association with a printed circuit board assembly 1048 having one or more processors or other components thereon, and is aligned to emit light through an opening in the upper section 1052, the covering 1056 and the polarizer 1060. As is shown in FIG. 10D, a cross-sectional view of the inventory monitoring device 1040 along the second lines B-B is shown. One of the cameras 1042 is mounted in association with the printed circuit board assembly 1048, and is aligned to permit light to pass through an opening in the upper section 1052, the covering 1056 and one of the polarizers 1062. The one of the cameras 1042 shown in FIG. 10D has a field of view defining an angle θ.

Figure 10E:
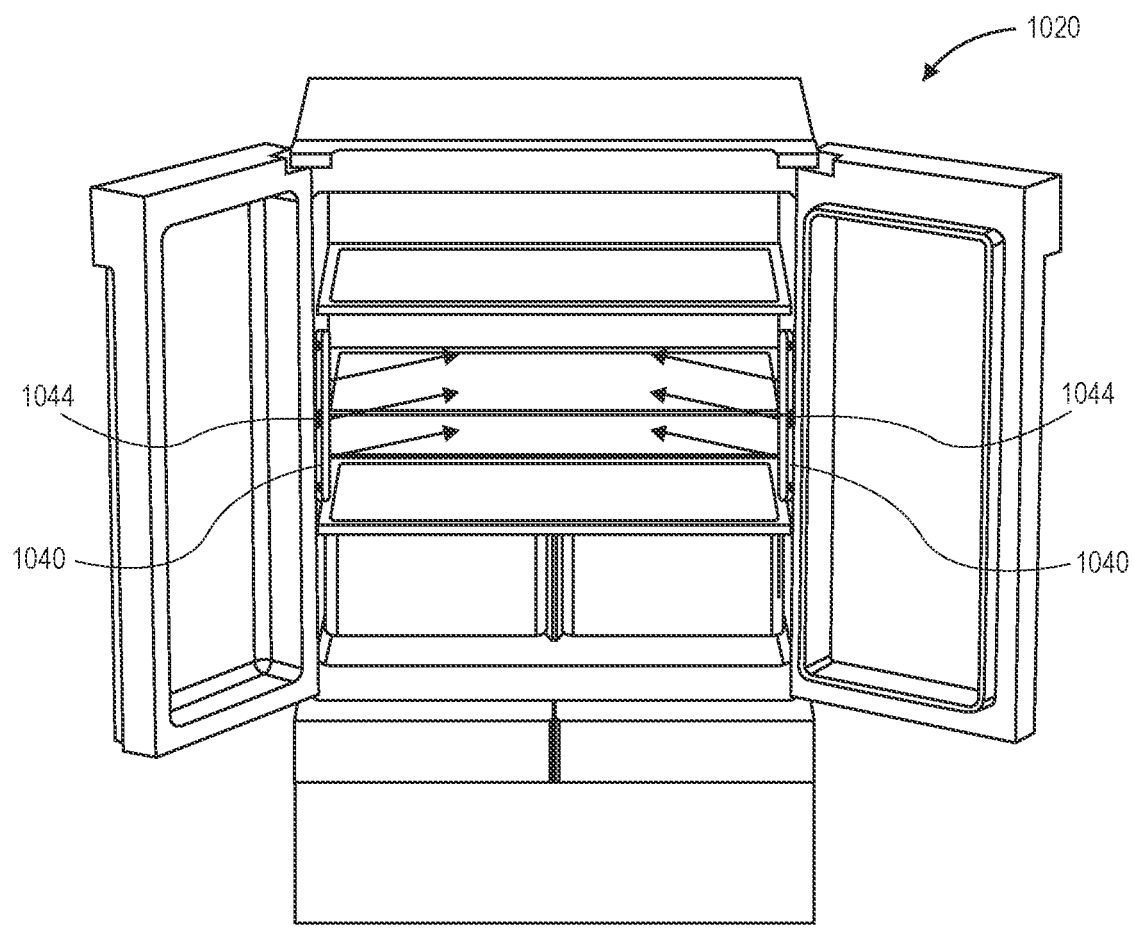

As is shown in FIG. 10E, when two of the inventory monitoring devices 1040 are mounted opposite one another within an enclosure 1020 (viz., a refrigerator), the illuminators 1044 of each of the inventory monitoring devices 1040 project light in an inward direction, e.g., toward an interior of the enclosure 1020.

Figure 10F:
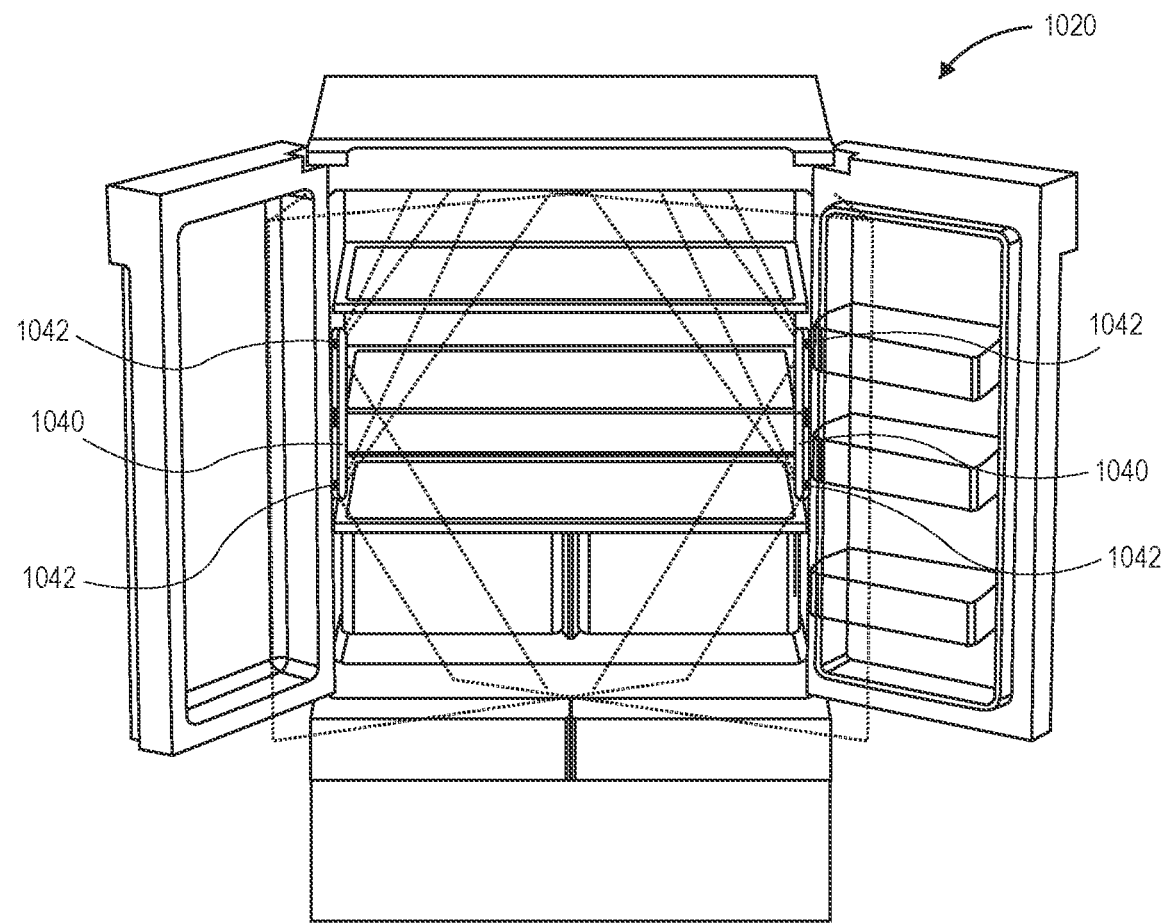

As is shown in FIG. 10F, the cameras 1042 of each of the inventory monitoring devices 1040 have fields of view that substantially cover an access point or plane of the enclosure 1020, e.g., a plane through which items must pass when being loaded or placed into the enclosure 1020, or when being removed from the enclosure 1020, as shown in FIG. 10F with the doors 1025 of the enclosure 1020 opened. The polarizers 1060, 1062 shown in FIGS. 10A through 10D serve to filter light emitted by the illuminator 1044 of one of the inventory monitoring devices 1040 from being captured by the cameras 1042 provided in the opposing one of the inventory monitoring devices 1040, and vice versa. Alternatively, in some implementations, where the inventory monitoring devices 1040 include light sensors for capturing light emitted from within the enclosure 1020, e.g., upon an operation of one or both of the doors 1025, polarizers may be provided over the light sensors, in the same manner that the polarizers 1062 are provided over the cameras 1042, to ensure that light from an opposing illuminator 1044 does not affect the operation of the light sensors.

The inventory monitoring devices of the present disclosure may be self-powered, e.g., by one or more batteries, fuel cells or other sources provided within their respective housings, or may receive power from one or more other power sources, which may be accessed within or outside of enclosures into which the inventory monitoring devices are mounted or installed. Referring to FIGS. 11A through 11E, views of aspects of one inventory monitoring device in accordance with implementations of the present disclosure are shown. Except where otherwise noted, reference numerals preceded by the number "11" shown in FIGS. 11A through 11E indicate components or features that are similar to components or features having reference numerals preceded by the number "10" shown in FIGS. 10A through 10F, by the number "9" shown in FIG. 9, by the number "8" shown in FIGS. 8A through 8C, by the number "7" shown in FIG. 7, by the number "6" shown in FIG. 6, by the number "5" shown in FIGS. 5A through 5F, by the number "2" shown in FIG. 2 or by the number "1" shown in FIGS. 1A through 1K.

Figure 11A:
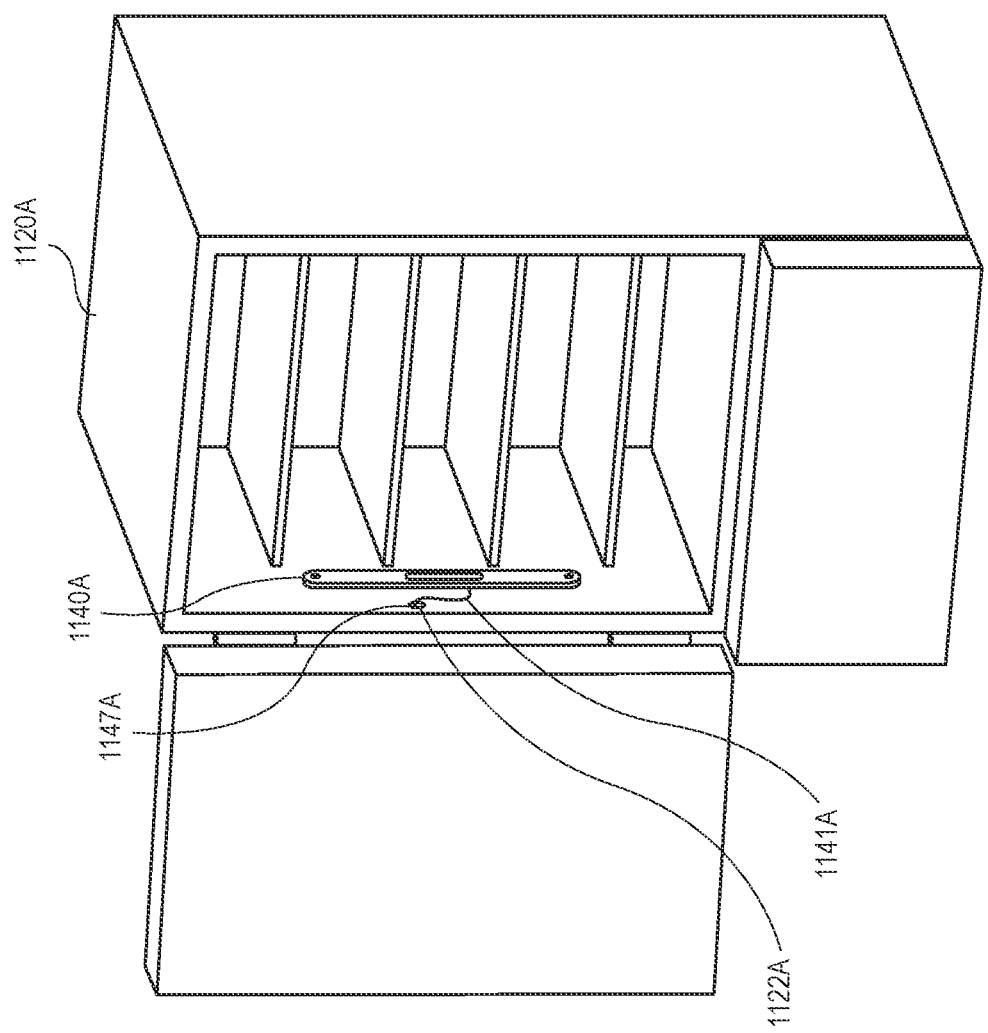

As is shown in FIG. 11A, an inventory monitoring device 1140A includes a cord (or cable, wire or other conductor) 1141A extending therefrom, and a plug (or connector) 1147A at a distal end of the cord 1141A. The plug 1147A may correspond to a receptacle (or outlet) 1122A provided within an enclosure 1120A (e.g., a refrigerator, a cabinet, a closet, a set of shelves), and may be configured to mate with the receptacle 1122A, e.g., by inserting the plug 1147A into the receptacle 1122A, when the inventory monitoring device 1140A is mounted within the enclosure 1120A. When the plug 1147A mates with the receptacle 1122A, the inventory monitoring device 1140A may receive electrical power from the enclosure 1120A. The cord 1141A may be any flexible, elongated conductor extending between the inventory monitoring device 1140A and the plug 1147A.

The plug 1147A and the receptacle 1122A may be configured to operate according to any standard configuration or format, including but not limited to one or more cables of the USB standard, e.g., USB-A, USB-B, USB-C, Mini-USB, Micro-USB, or others. Alternatively, the plug 1147A and the receptacle 1122A may be configured to operate according to any other standard, including but not limited to a Power over Ethernet (or "PoE") standard, thereby permitting both electrical power and information or data to be exchanged between the inventory monitoring device 1140A and the enclosure 1120A. In some implementations, the plug 1147A and the receptacle 1122A may be proprietary or non-standard in nature. Furthermore, the receptacle 1122A may be incorporated into the enclosure 1120A upon its original manufacture or assembly, or, alternatively, retroactively fitted or installed into the enclosure 1120A prior to configuring the enclosure 1120A for receiving one or more of the inventory monitoring devices 1140A therein.

Figure 11B:
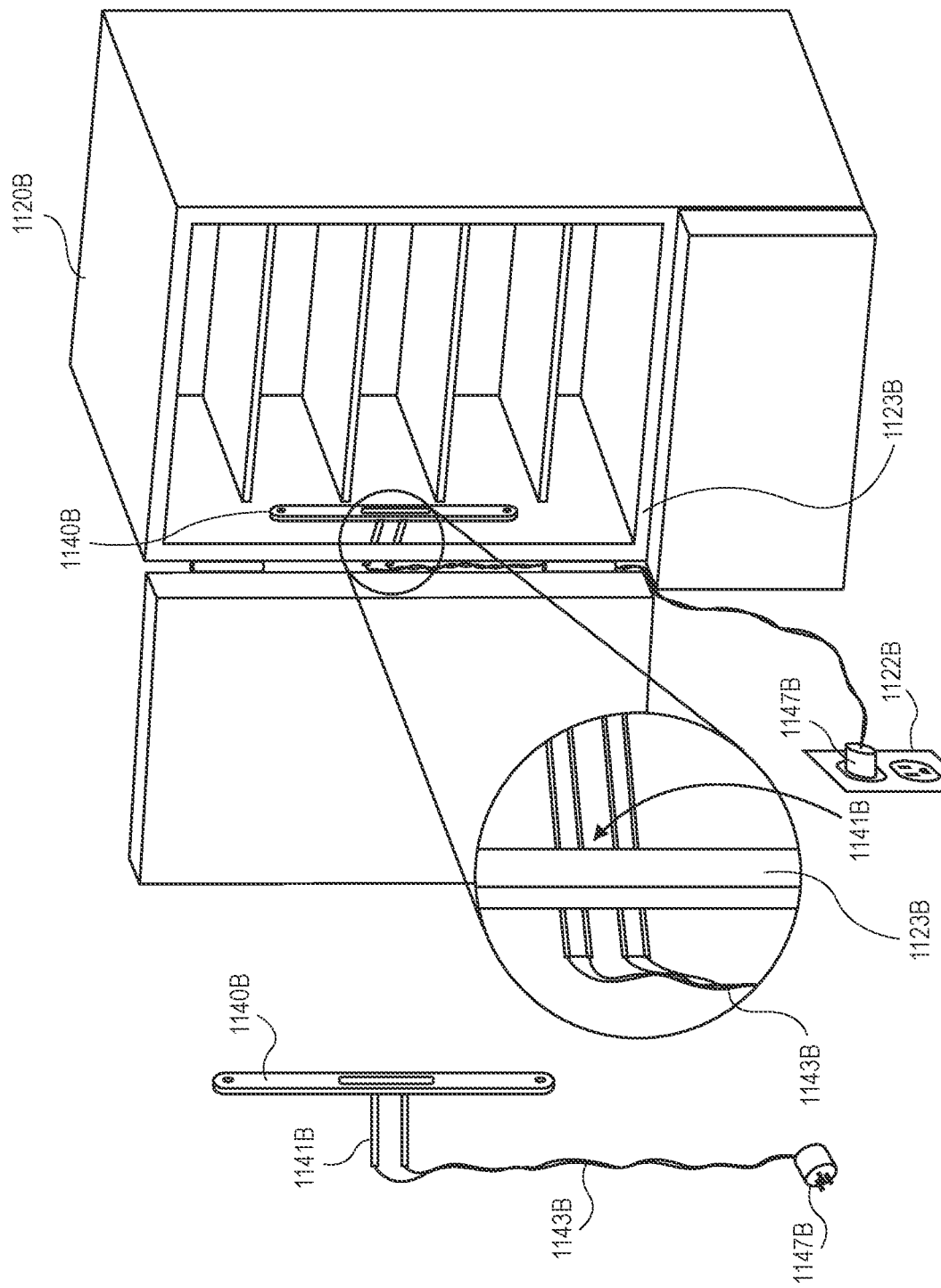

As is shown in FIG. 11B, an inventory monitoring device 1140B includes a pair of tapes (or extensions) 1141B leading to a cord (or cable, wire or other conductor) 1143B having a plug (or connector) 1147B at a distal end of the cord 1143B. The tapes 1141B are substantially flat conductors that may be routed through thin spaces while still permitting the transfer of electrical power or information or data therethrough. The plug 1147B may be configured to mate with a standard two-prong or three-prong electrical outlet 1122B (e.g., an AC power source) provided outside of an enclosure 1120B. The cord 1143B may be any flexible, elongated conductor extending between the inventory monitoring device ends of the tapes 1141B and the plug 1147B. Alternatively, the plug 1147B and the outlet 1122B may be configured to operate according to any other AC or DC configuration or format.

When the inventory monitoring device 1140B is installed within the enclosure 1120B (e.g., a refrigerator, a cabinet, a closet, a set of shelves), the tapes 1141B may extend between an interior wall of the enclosure 1120B and a liner 1123B provided along an interior of the enclosure 1120B, e.g., to insulate the interior of the enclosure 1120B, or otherwise aid in maintaining environmental conditions (such as temperatures, pressures or humidities) within the enclosure 1120B. The thin nature of the tapes 1141B enables electrical power, information or data to be transferred between the inventory monitoring device 1140B and sources or systems provided outside of the enclosure 1120B while maintaining control of the environmental conditions within the enclosure 1120B. Lengths of the tapes 1141B may be selected on any basis, including but not limited to a distance between an interior of the enclosure 1120B and an exterior of the enclosure 1120B over which the electrical power, information or data is to be transferred, or on any other basis. A length of the cord 1143B may be selected on any basis, including but not limited to a distance between the enclosure 1120B and the outlet 1122B, or dimensions of any obstacles therebetween, or on any other basis. In some implementations, the cord 1143B need not be utilized, and the plug 1147B may be provided at distal ends of each of the tapes 1141B.

Figure 11C:
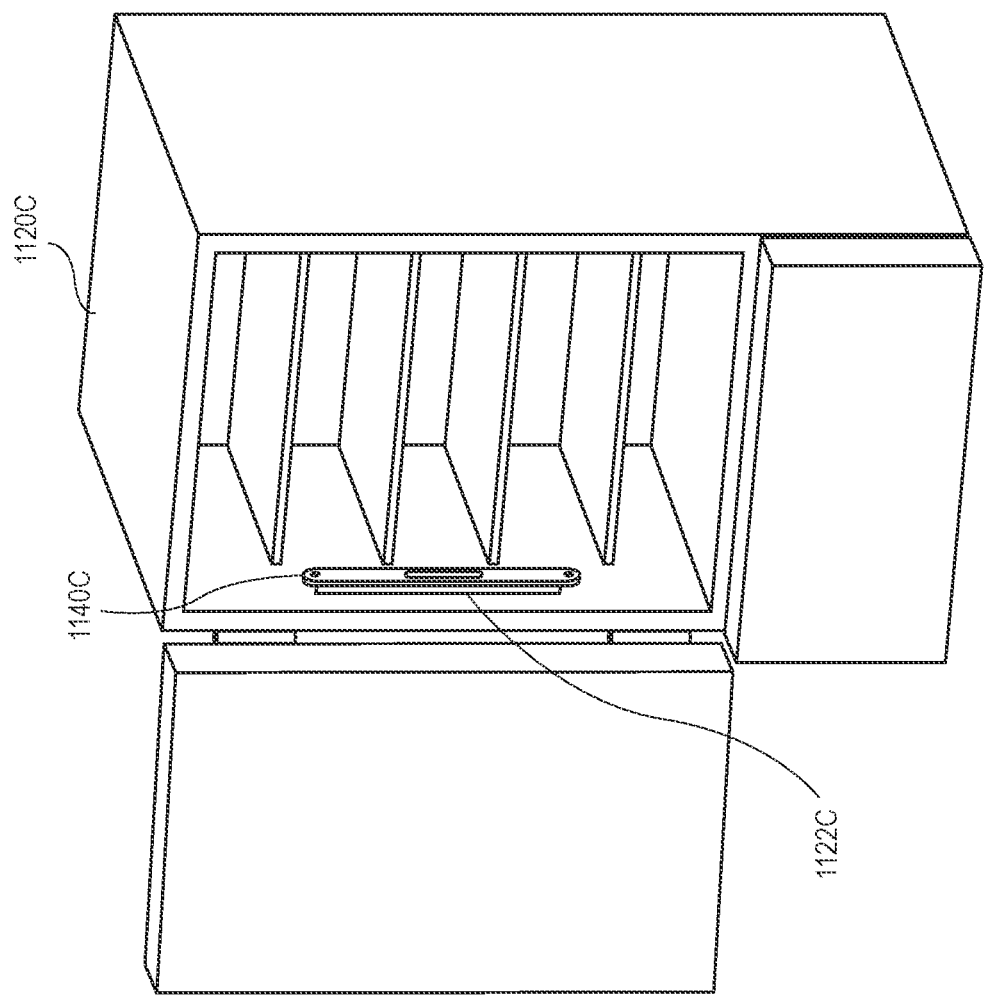
Figure 11C:
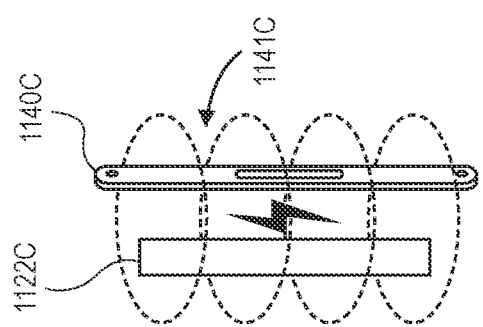

As is shown in FIG. 11C, an inventory monitoring device 1140C is wireless, and includes an inductive charging receiver 1141C that is configured to receive electrical power in an inductive manner, from an inductive charging transmitter 1122C provided on an interior wall of an enclosure 1120C (e.g., a refrigerator, a cabinet, a closet, a set of shelves). One or more of the receiver 1141C or the transmitter 1122C may include any number of oscillators, transistors, amplifiers, coils, rectifiers, regulators, circuits or other components for transferring power from the transmitter 1122C to the receiver 1141C. Moreover, the transfer of electrical power from the transmitter 1122C to the receiver 1141C causes the inventory monitoring device 1140C to be drawn toward the transmitter 1122C, thereby enabling the inventory monitoring device 1140C to be mounted to the interior wall of the enclosure 1120C magnetically, and without the use of any physical systems or penetrations of the interior wall.

Figure 11D:
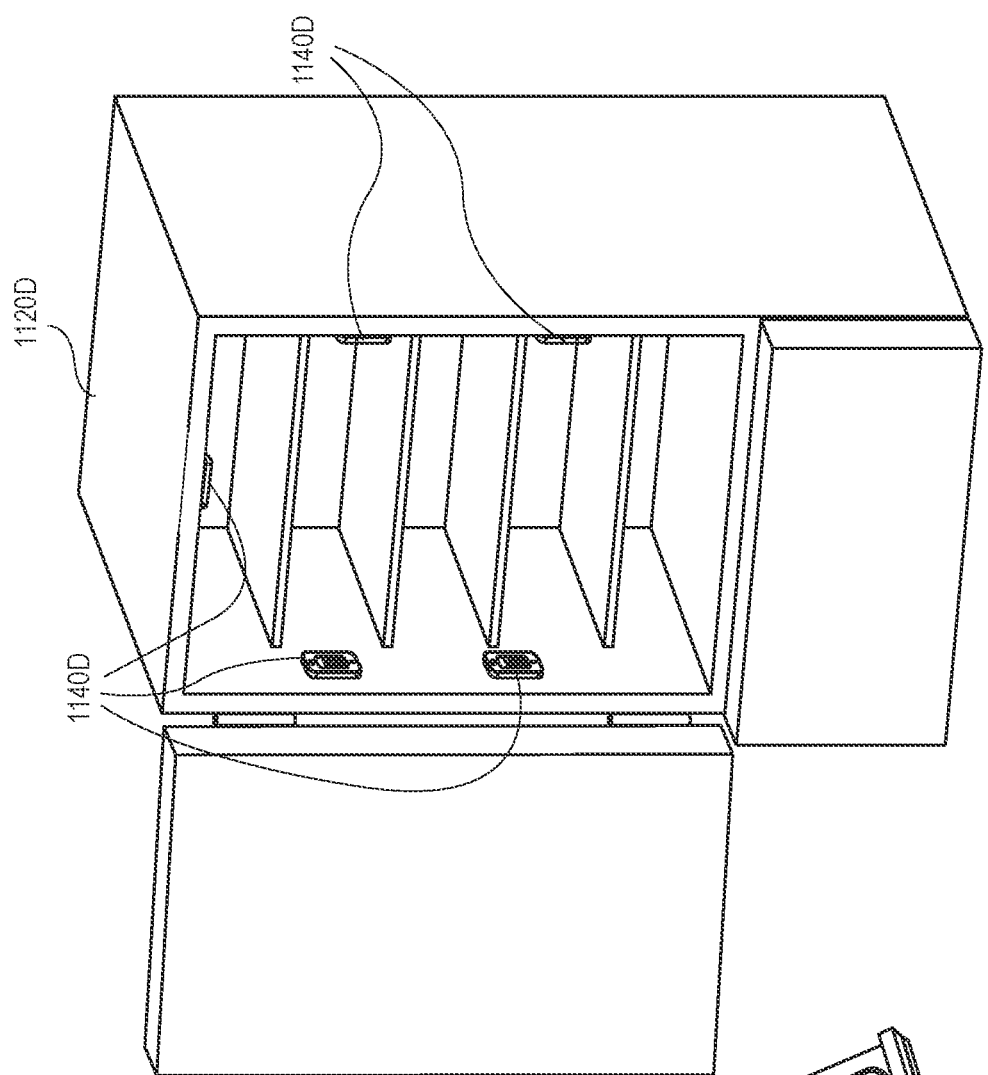
Figure 11D:
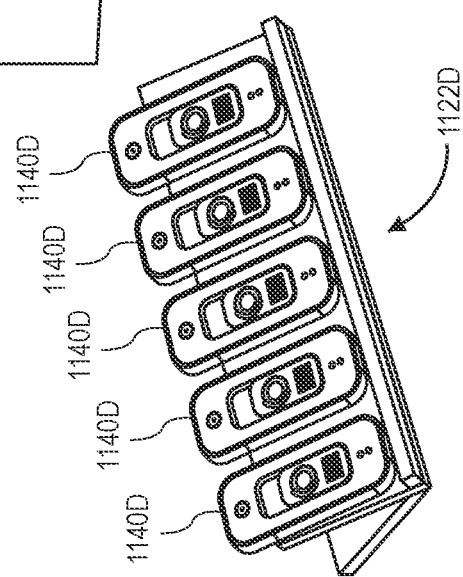

As is shown in FIG. 11D, a plurality of inventory monitoring devices 1140D are also wireless, and include an inductive charging receivers that are configured to receive electrical power in an inductive charging device 1122D (or cradle, or easel). When the inventory monitoring device 1140D has been adequately charged, the inventory monitoring devices 1140D may be mounted or otherwise installed on interior side walls or other surfaces of an enclosure 1120D (e.g., a refrigerator, a cabinet, a closet, a set of shelves). One or more of the inventory monitoring devices 1140D or the charging device 1122D may include any number of oscillators, transistors, amplifiers, coils, rectifiers, regulators, circuits or other components for transferring power from the charging device 1122D to the inventory monitoring devices 1140D. The inventory monitoring devices 1140D may be removed from the interior side walls of the enclosure 1120D and replaced, as necessary, in order to ensure that the inventory monitoring devices 1140D are sufficiently charged for operations. Moreover, the inventory monitoring devices 1140D may be magnetically powered or oriented to enable the inventory monitoring devices 1140D to be mounted to the interior wall of the enclosure 1120D magnetically, and without the use of any physical systems or penetrations of the interior wall.

Figure 11E:
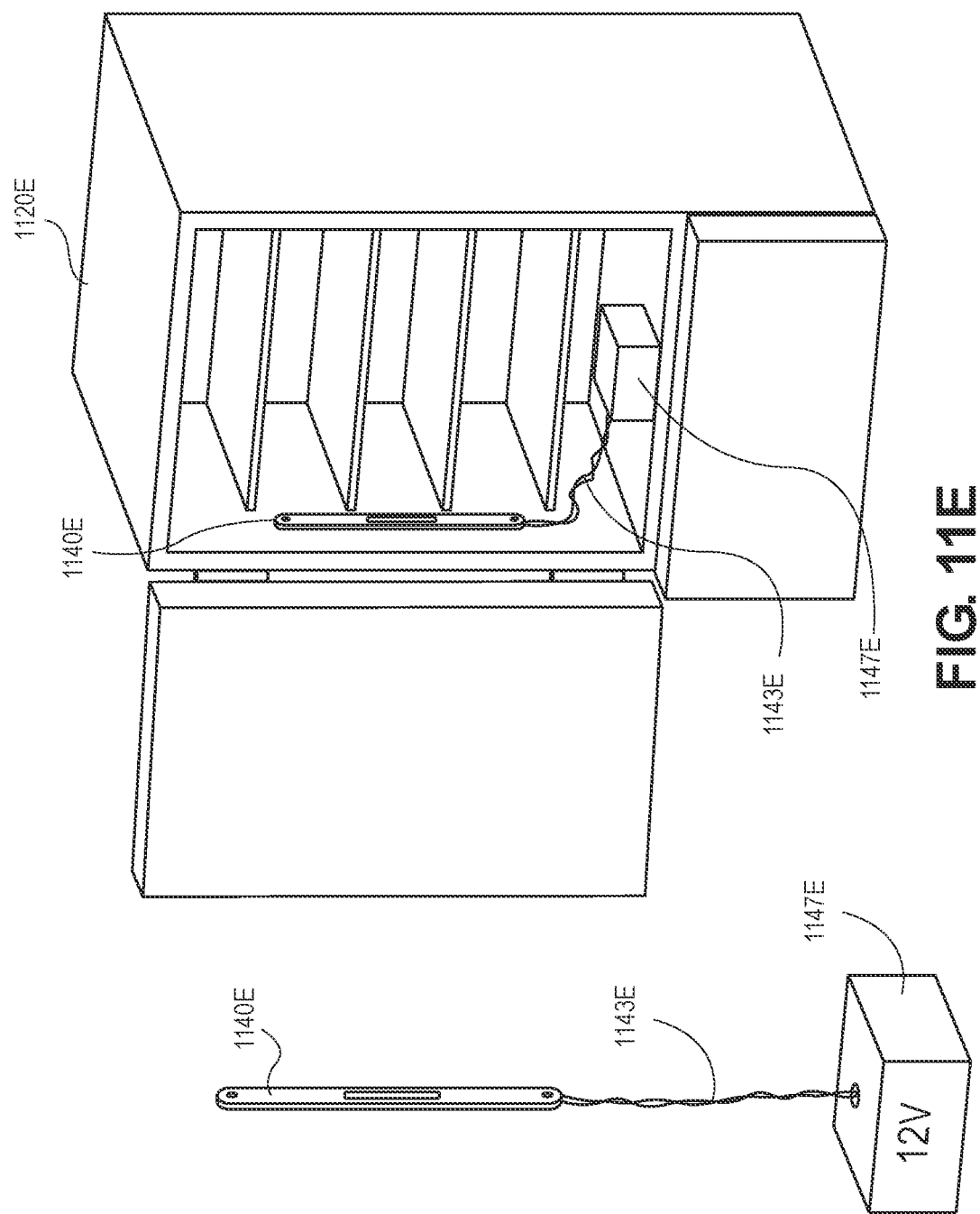

As is shown in FIG. 11E, an inventory monitoring device 1140E includes a cord (or cable, wire or other conductor) 1143E extending therefrom. The cord 1143E is configured to mate with a battery 1147E that may be provided or placed within an enclosure 1120E (e.g., a refrigerator, a cabinet, a closet, a set of shelves), and may be configured to mate with the battery 1147E, e.g., by inserting a plug or other end of the cord 1143E into a receptacle provided on the battery 1147E, enabling the inventory monitoring device 1140E to receive electrical power from the battery 1147E, e.g., according to one or more USB standards, a PoE standard, or others, thereby permitting both electrical power to be transferred from the battery 1147E to the inventory monitoring device 1140E.

The inventory monitoring devices 1140C, 1140D, 1140E of FIGS. 11C through 11E provide a number of advantages, in that the devices 1140C, 1140D, 1140E need not require any ports or other connections that penetrate their respective housings, which may remain sealed (e.g., hermetically sealed). Additionally, the inventory monitoring devices 1140D, 1140E of FIGS. 11D and 11E may be installed within any enclosure, regardless of whether the enclosure includes a charging port, system or transmitter therein. The inventory monitoring devices 1140D may be periodically removed, as necessary, and recharged in the charging device 1122D or in a like system, e.g., in the same manner as a mobile device, before being returned to the interior of the enclosure. Likewise, when a battery charge or other power level of the inventory monitoring device 1140E is low, the battery 1147E may be placed within the enclosure 1120E and temporarily connected to the inventory monitoring device 1140E by way of the cord 1143E. When the battery charge or other power level of the inventory monitoring device 1140E is sufficiently high, the cord 1143E and/or the battery 1147E may be disconnected from the inventory monitoring device 1140E and removed from the enclosure 1120E, thereby ensuring that available space within the enclosure 1120E is limited by the presence of the battery 1147E only at times or for durations when the inventory monitoring device 1140E requires recharging.

Figure 12A:
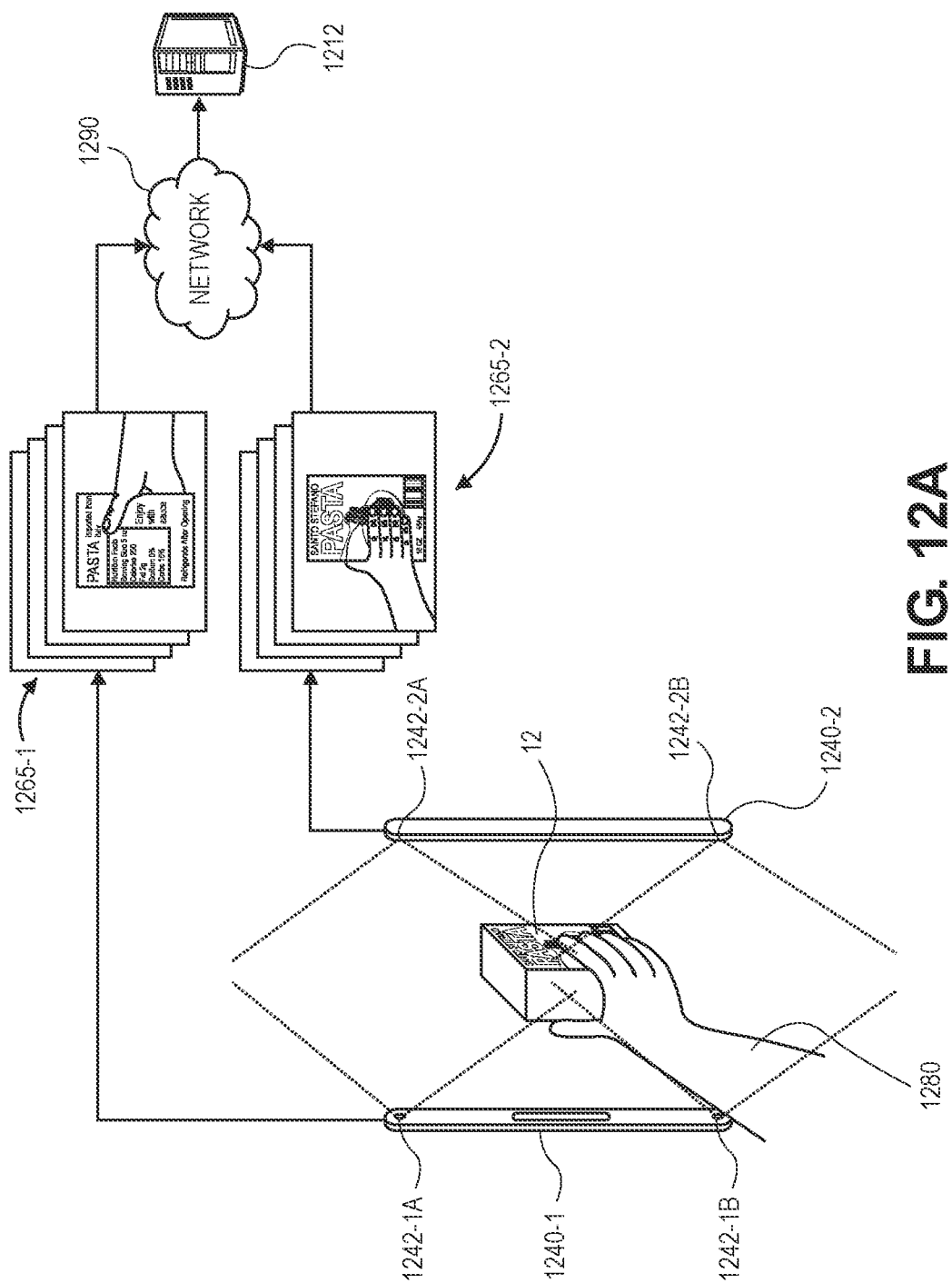
FIGS. 12A and 12B are views of aspects of one system for tracking inventory levels using an inventory monitoring device in accordance with implementations of the present disclosure.
Figure 12B:
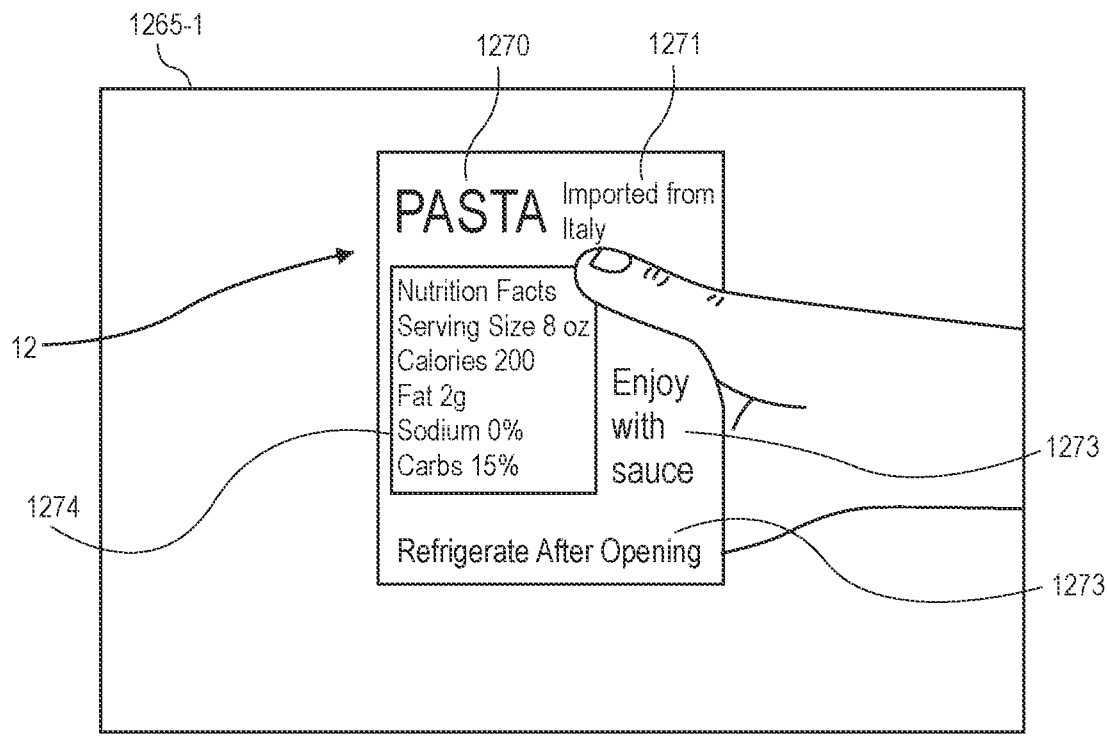
Figure 12B:
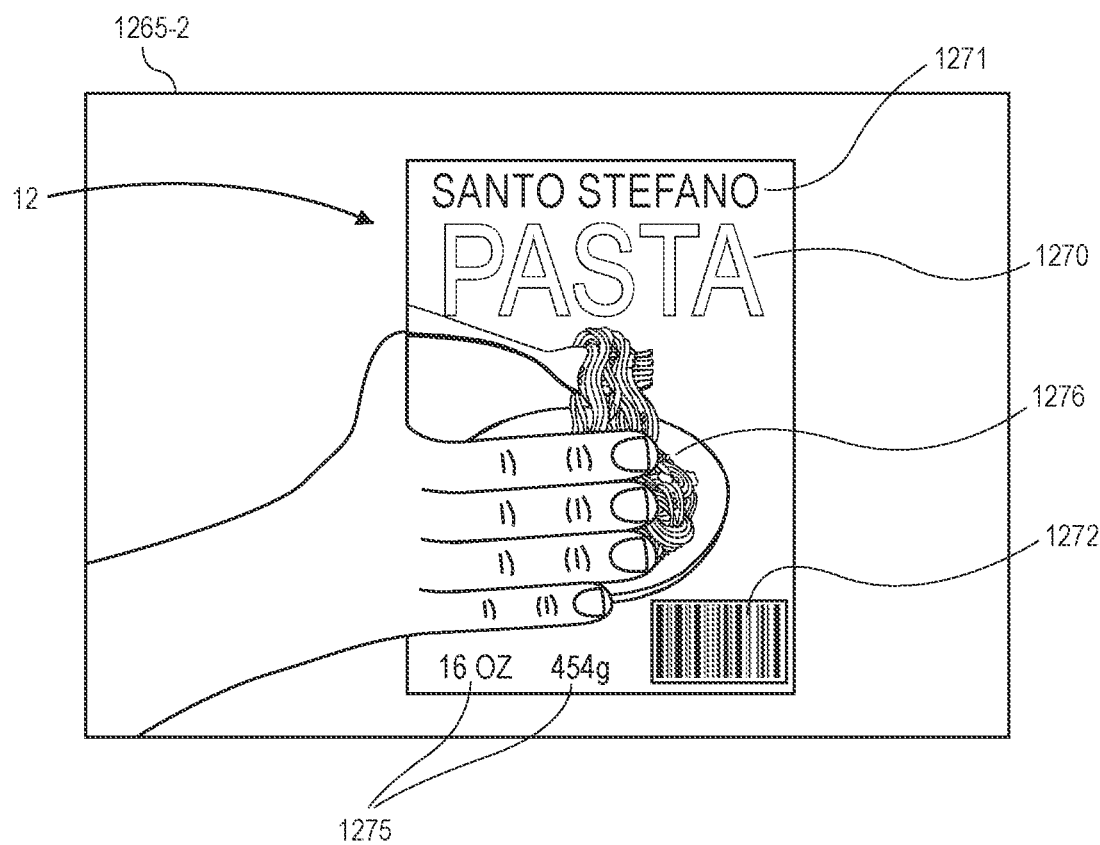

Imaging data captured by an inventory monitoring device of the present disclosure may be processed in any manner and utilized in identifying an item being transferred into or removed from an enclosure. Referring to FIGS. 12A and 12B, views of aspects of one system for tracking inventory levels using an inventory monitoring device in accordance with implementations of the present disclosure are shown. Except where otherwise noted, reference numerals preceded by the number "12" shown in FIGS. 12A and 12B indicate components or features that are similar to components or features having reference numerals preceded by the number "11" shown in FIGS. 11A through 11E, by the number "10" shown in FIGS. 10A through 10F, by the number "9" shown in FIG. 9, by the number "8" shown in FIGS. 8A through 8C, by the number "7" shown in FIG. 7, by the number "6" shown in FIG. 6, by the number "5" shown in FIGS. 5A through 5F, by the number "2" shown in FIG. 2 or by the number "1" shown in FIGS. 1A through 1K.

As is shown in FIG. 12A, an item 12 is extended between a pair of inventory monitoring devices 1240-1, 1240-2 by an actor 1280. The inventory monitoring device 1240-1 includes a pair of cameras 1242-1A, 1242-1B, and the inventory monitoring device 1240-2 includes a pair of cameras 1242-2A, 1242-2B. The inventory monitoring devices 1240-1, 1240-2 are aligned opposite one another, such that the cameras 1242-1A, 1242-1B and the cameras 1242-2A, 1242-2B are configured to capture imaging data as the item 12 passes therebetween. In some implementations, the inventory monitoring devices 1240-1, 1240-2 may be mounted in association with an access point or plane associated with an enclosure (not shown), such as a refrigerator, a cabinet, a closet, a set of shelves, or others.

Images 1265-1 captured by the cameras 1242-1A, 1242-1B of the inventory monitoring device 1240-1 and images 1265-2 captured by the cameras 1242-2A, 1242-2B of the inventory monitoring device 1240-2 are transmitted to a server 1212 over a network 1290. The capture of the images 1265-1, 1265-2 by the inventory monitoring devices 1240-1, 1240-2 may be triggered or otherwise initiated on any basis, such as in response to signals generated by light sensors, motion sensors, acoustic sensors or other sensors provided on the respective inventory monitoring devices 1240-1, 1240-2.

The images 1265-1, 1265-2 may be processed to detect information or data regarding items depicted therein, viz., the item 12. The information or data may be used to identify the items, and to update a record of inventory within an enclosure with which the inventory monitoring devices 1240-1, 1240-2 are associated. As is shown in FIG. 12B, representative ones of the images 1265-1, 1265-2 may be processed to detect various features of the item 12 that are depicted therein. For example, the server 1212 or one or more other computer devices or systems may process the images 1265-1, 1265-2 to detect and recognize a set 1270 of alphanumeric characters identifying a name, a title or a category of the item 12 (viz., pasta), as well as a set 1271 of alphanumeric characters identifying a location (e.g., a country or geographic region) of origin of the item 12. Alternatively, the server 1212 or one or more other computer devices or systems may detect a bar code 1272 (e.g., a one-dimensional or two-dimensional bar code, such as a "QR" code) that may be linked to one or more sources of information or data regarding the item 12. The bar code 1272 may be interpreted to access the sources of information or data and to identify the item 12 accordingly.

As is further shown in FIG. 12B, the images 1265-1, 1265-2 may be processed to detect and recognize a set 1273 of alphanumeric characters including or referencing instructions to be manually followed in preparing the item 12 for consumption, and the item 12 or a category of the item 12 may be identified based at least in part on such instructions. The images 1265-1, 1265-2 may be further processed to detect and recognize a set 1274 of alphanumeric characters indicating details regarding contents of the item 12 (viz., nutrition facts), or a set 1275 of alphanumeric characters identifying a mass or volume of the contents of the item 12, and the item 12 or a category of the item 12 may be identified based at least in part on such instructions based on such details, the mass or the volume. Finally, the images 1265-1, 1265-2 may be processed to detect and recognize an image 1276 of contents of the item 12 in a prepared form, or in an intended use of the item 12, and the item 12 or a category of the item 12 may be identified based at least in part on the image 1276.

Information or data determined from the various images 1265-1, 1265-2 captured by the inventory monitoring devices 1240-1, 1240-2 may be utilized to generally or specifically identify the item 12 in any manner and on any basis. For example, the information or data may be compared to a browsing history or a purchasing history of an actor associated with an enclosure into which the inventory monitoring devices 1240-1, 1240-2 are installed, to determine whether such information or data is consistent with any items that may have been previously evaluated by the actor, e.g., using one or more browsers or other applications, or any items that may have been previously purchased by the actor, e.g., via an electronic marketplace, or from one or more bricks-and-mortar stores. The information or data may also be compared to a set of items that are recommended to the actor, e.g., replacements, substitutes or complements for items previously owned, used or operated by the actor, including but not limited to items previously placed into the enclosure. The information or data may be further compared to a set of items associated with locations previously visited by the actor, e.g., cities, countries, hotels, malls, museums, restaurants, retail establishments, stadiums, or others. The item 12 may be identified based at least in part on any such comparisons.

Figure 13A:
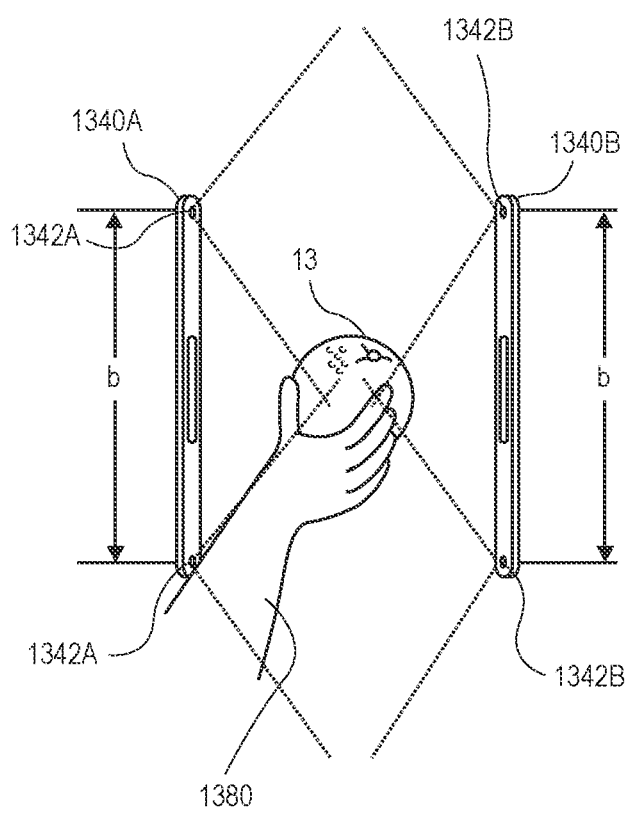
FIGS. 13A through 13C are views of aspects of one system for tracking inventory levels using an inventory monitoring device in accordance with implementations of the present disclosure.
Figure 13B:
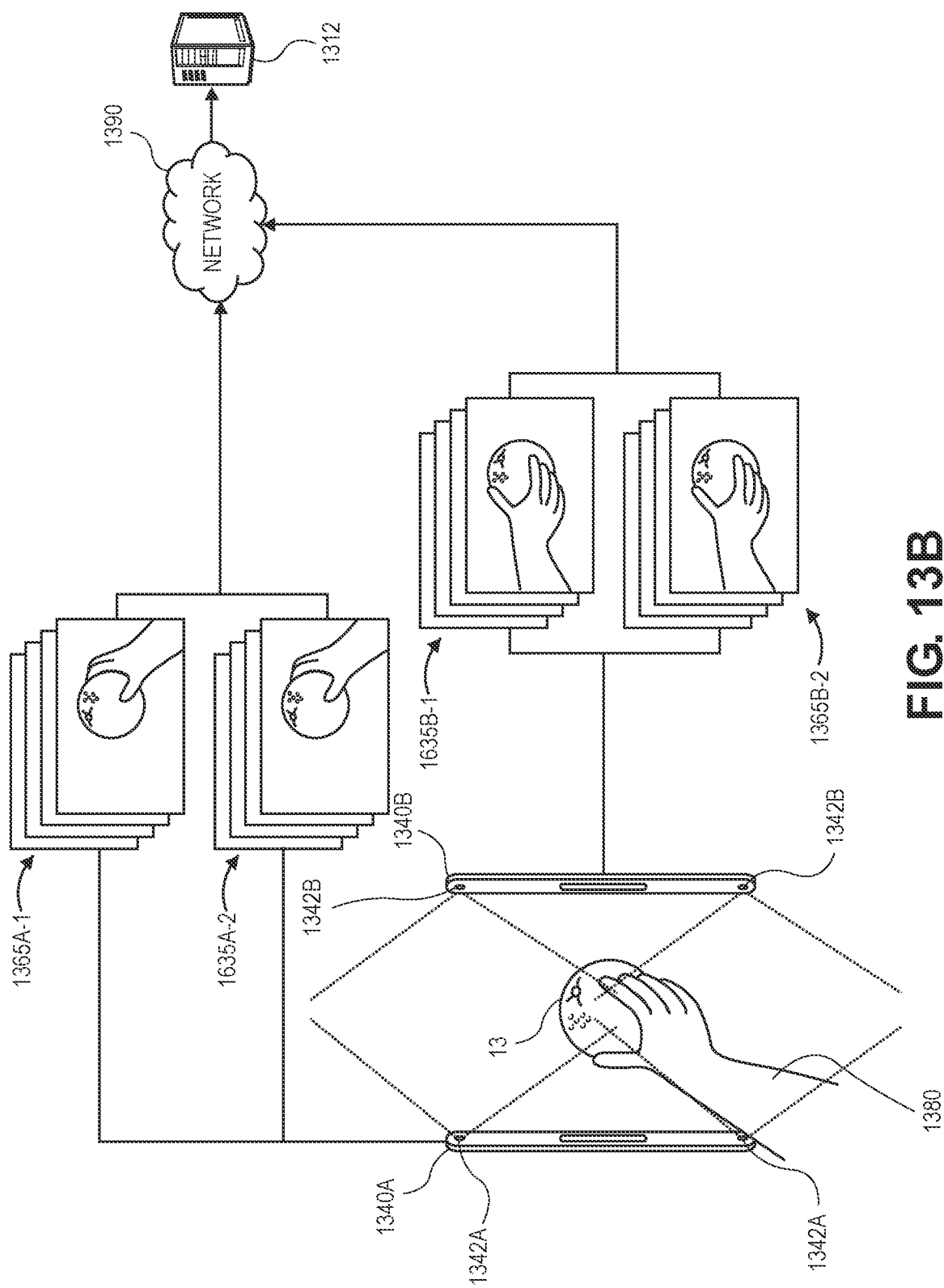
Figure 13C:
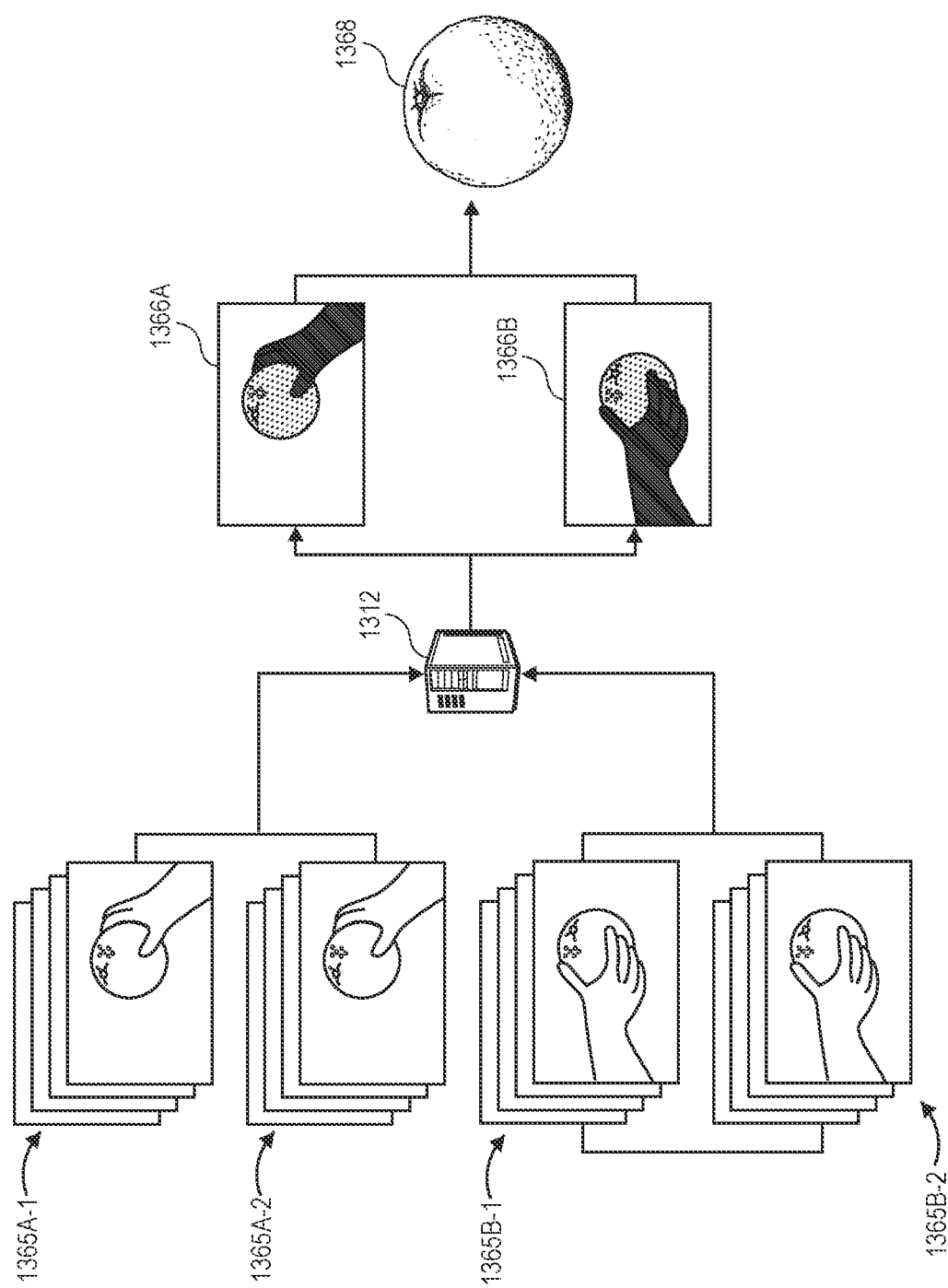

Imaging data captured by an inventory monitoring device of the present disclosure may be processed in any manner and utilized in identifying an item being transferred into or removed from an enclosure. Referring to FIGS. 13A through 13C, views of aspects of one system for tracking inventory levels using an inventory monitoring device in accordance with implementations of the present disclosure are shown. Except where otherwise noted, reference numerals preceded by the number "13" shown in FIGS. 13A through 13C indicate components or features that are similar to components or features having reference numerals preceded by the number "12" shown in FIGS. 12A and 12B, by the number "11" shown in FIGS. 11A through 11E, by the number "10" shown in FIGS. 10A through 10F, by the number "9" shown in FIG. 9, by the number "8" shown in FIGS. 8A through 8C, by the number "7" shown in FIG. 7, by the number "6" shown in FIG. 6, by the number "5" shown in FIGS. 5A through 5F, by the number "2" shown in FIG. 2 or by the number "1" shown in FIGS. 1A through 1K.

As is shown in FIG. 13A, an item 13 is extended between a pair of inventory monitoring devices 1340A, 1340B by an actor 1380. The inventory monitoring device 1340A includes a pair of cameras 1342A that are separated by a baseline distance b, and the inventory monitoring device 1340B includes a pair of cameras 1342B that are also separated by the baseline distance b. The inventory monitoring devices 1340A, 1340B are aligned opposite one another, such that the cameras 1342A and the cameras 1342B are configured to capture imaging data as the item 13 passes therebetween.

As is shown in FIG. 13B, sets of images 1365A-1, 1365A-2 captured by the respective cameras 1342A of the inventory monitoring device 1340A and sets of images 1365B-1, 1365B-2 captured by the respective cameras 1342B of the inventory monitoring device 1340B are transmitted to a server 1312 over a network 1390.

Because the respective pairs of cameras 1342A, 1342B are separated by the baseline distance b, images captured by the cameras 1342A, 1342B may be processed to generate a 3D model of the item 13, by determining disparities between corresponding pixels appearing within the set of images 1365A-1 and the set of images 1365A-2. For example, in some implementations, where a point appears in one of the images of the set of images 1365A-1 and in another of the images of the set of images 1365A-2 captured at approximately the same time, an optical flow algorithm that receives pairs of images captured by the cameras 1342A or the cameras 1342B as inputs may determine horizontal and/or vertical disparities between pixels depicting the point that appear within each of the images as outputs of the optical flow algorithm. A disparity image (or a displacement image or a parallax image) indicating disparities between the corresponding pixels may be generated for each of the times at which such images were captured. In some implementations, pairs of images captured by the cameras 1342A or the cameras 1342B may be processed according to a stereo matching algorithm that may determine displacements between corresponding pixels appearing within pairs of images, following one or more pre-processing (e.g., rectification) processes.

Maps of disparities between pixels corresponding to points appearing within a pair of images captured by the cameras 1342A or the cameras 1342B may be used to construct (or reconstruct) surfaces of the item 13 from either side of the item 13. For example, as is shown in FIG. 13C, surface maps 1366A, 1366B of either side of the item 13 may be constructed based on disparities of pixels appearing within corresponding visual images captured by the pair of cameras 1342A, or the pair of cameras 1342B at the same time, and also the baseline distance b between the cameras 1342A or the cameras 1342B, and focal lengths of the cameras 1342A or the cameras 1342B. Distances or ranges from the cameras 1342A or the cameras 1342B to points on the surfaces of the item 13 may be determined accordingly and used to construct the surface maps 1366A, 1366B. Additionally, as is further shown in FIG. 13C, a 3D model 1368 of the item 13 may be constructed based on the surface maps 1366A, 1366B, from which aspects of the actor 1380, e.g., a hand and/or wrist or arm of the actor 1380, may be subtracted or otherwise disregarded in constructing the model 1368.

The 3D model 1368 of the item 13 may be utilized to generally or specifically identify the item 13 in any manner and on any basis, such as by comparing the 3D model 1368 to shapes, sizes or textures of a set of items appearing within a browsing history or a purchasing history of the actor 1380, a set of items that are known or believed to be owned, possessed or used by the actor 1380, a set of items that are recommended to the actor 1380, a set of items associated with locations previously visited by the actor 1380, or any other items.

Although some of the implementations disclosed herein reference the use of inventory monitoring devices or systems (e.g., inventory bars) of the present disclosure in refrigerators provided within homes or for personal use, those of ordinary skill in the pertinent arts will recognize that the systems and methods disclosed herein are not so limited, and may be utilized in connection with enclosures or other spaces, containers or systems that are provided for any intended personal, industrial, commercial or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, such as the flow charts shown in FIG. 3 or 4A and 4B, orders in which such methods or processes are presented are not intended to be construed as any limitation on the claimed inventions, and any number of the method or process steps or boxes described herein can be combined in any order and/or in parallel to implement the methods or processes described herein. Those of ordinary skill in the pertinent arts will also recognize that the inventory monitoring systems disclosed herein may be assembled in any manner. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method comprising:
    capturing, at a first time, a first image by a first camera disposed within a first housing of a first monitoring unit, wherein at least a portion of a first field of view of the first camera is illuminated by a first illuminator disposed within the first housing at the first time, and wherein the first monitoring unit is mounted to an interior surface of an enclosure within a vicinity of a plane through which the enclosure is accessible;
    providing at least the first image as an input to an artificial neural network trained to detect at least one item within an image, wherein the artificial neural network is executed by at least one processor;
    receiving at least one output from the artificial neural network;
    detecting, by the at least one processor, a first item depicted within the first image based at least in part on the at least one output;
    identifying, by the at least one processor, the first item based at least in part on the first image; and
    storing, by the at least one processor, an indication that at least the first item has entered the enclosure or has departed from the enclosure in at least one of a first memory component disposed within the first monitoring unit or a computer system external to the first monitoring unit.

2. The method of claim 1, wherein the at least one processor is disposed within the first housing.

3. The method of claim 1, wherein the at least one processor is provided in the computer system external to the first monitoring unit,
    wherein the first monitoring unit further comprises a first transceiver disposed within the first housing, and
    wherein the method further comprises:
    transmitting, by the first transceiver, at least the first image to the computer system over at least one network,
    wherein the first item depicted within the first image is identified by the at least one processor provided in the computer system external to the first monitoring unit based at least in part on at least the first image.

4. The method of claim 1, wherein detecting the first item depicted within the first image comprises:
    detecting at least one visual feature of the first item within at least the first image, wherein the at least one visual feature comprises one of a contour, an outline, a color, a texture, a silhouette, a shape, an alphanumeric character or a bar code,
    wherein the first item is identified based at least in part on the at least one visual feature.

5. The method of claim 1, wherein the first monitoring unit further comprises:
    a cover slidably provided within a channel of at least a portion of the first housing,
    wherein the cover comprises an opening,
    wherein the cover is configured to travel within the channel between a first position and a second position,
    wherein the opening is provided over a lens of the first camera with the cover in the first position, and wherein the lens of the first camera is obscured with the cover in the second position.

6. The method of claim 1, wherein capturing the first image by the first camera comprises:

capturing a plurality of images by the first camera over a period of time, wherein the first image is one of the plurality of images, and wherein the period of time includes the first time and a second time;

detecting, by the at least one processor, the first item depicted within a second image, wherein the second image is one of the plurality of images, and wherein the second image was captured at the second time; and determining at least the first item has entered the enclosure or has departed from the enclosure based at least in part on a first location of the first item depicted within the first image and a second location of the first item depicted within the second image.

7. The method of claim 1, wherein the first monitoring unit further comprises a light sensor disposed within the first housing, and wherein the method further comprises:

detecting, by the light sensor, light within the enclosure prior to the first time, wherein the first camera is caused to capture the first image at the first time in response to detecting the light within the enclosure prior to the first time.

8. The method of claim 1, wherein the first monitoring unit further comprises a motion sensor disposed within the first housing, and wherein the method further comprises:

detecting, by the motion sensor, motion within the enclosure prior to the first time, wherein the first camera is caused to capture the first image at the first time in response to detecting the motion within the enclosure prior to the first time.

9. The method of claim 1, wherein each of the first camera and the first illuminator is configured to receive power from a power source, wherein the power source is one of:

a power source disposed within the first housing;

a power source associated with the enclosure, wherein the first monitoring unit is electrically coupled to the power source associated with the enclosure by at least a first cord having a first plug inserted into a first receptacle provided on the interior surface of the enclosure; or a power source external to the enclosure, wherein the first monitoring unit is electrically coupled to the power source external to the enclosure by at least a second cord having a second plug inserted into a second receptacle provided external to the enclosure.

10. The method of claim 1, wherein the first housing comprises:

an upper section, wherein the first field of view of the first camera extends through the upper section, and wherein the first illuminator is configured to emit light through at least a second opening in the upper section;

a lower section, wherein the upper section is coupled to the lower section; and at least one printed circuit board disposed between the upper section and the lower section, wherein the first camera, the first illuminator and the first memory component are coupled to the at least one printed circuit board, and wherein each of the upper section and the lower section is formed from a plastic comprising a polycarbonate and an acrylonitrile butadiene styrene.

11. The method of claim 1, wherein the enclosure is one of:

a cabinet;

a closet;

a freezer; or a refrigerator.

12. The method of claim 1, wherein the enclosure further comprises at least one door configured to move between a closed position and at least one open position, wherein access to an interior compartment of the enclosure defined at least in part by the interior surface is inhibited with the at least one door in the closed position, and wherein the plane through which the enclosure is accessible is substantially parallel to the at least one door in the closed position.

\* \* \* \* \*